United States Patent
Shao et al.

(10) Patent No.: US 10,314,028 B2
(45) Date of Patent: Jun. 4, 2019

(54) METHOD FOR TRANSMITTING DOWNLINK CONTROL CHANNEL AND DEVICE

(71) Applicant: HUAWEI TECHNOLOGIES CO., LTD., Shenzhen, Guangdong (CN)

(72) Inventors: Jiafeng Shao, Beijing (CN); Chuanfeng He, Beijing (CN); Wei Quan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 147 days.

(21) Appl. No.: 15/637,320

(22) Filed: Jun. 29, 2017

(65) Prior Publication Data

US 2017/0303250 A1     Oct. 19, 2017

Related U.S. Application Data

(63) Continuation of application No. PCT/CN2014/095893, filed on Dec. 31, 2014.

(51) Int. Cl.
*H04W 72/04* (2009.01)
*H04L 12/58* (2006.01)
*H04L 5/00* (2006.01)

(52) U.S. Cl.
CPC ......... *H04W 72/042* (2013.01); *H04L 5/0007* (2013.01); *H04L 51/00* (2013.01);
(Continued)

(58) Field of Classification Search
None
See application file for complete search history.

(56) References Cited

U.S. PATENT DOCUMENTS

2006/0034285 A1  2/2006 Pirskanen et al.
2008/0225802 A1  9/2008 Sun et al.
(Continued)

FOREIGN PATENT DOCUMENTS

CN       1905428 A    1/2007
CN     101431950 A    5/2009
(Continued)

OTHER PUBLICATIONS

International Search Report dated Sep. 18, 2015 in corresponding International Patent Application No. PCT/CN2014/095893.
(Continued)

*Primary Examiner* — Bunjob Jaroenchonwanit
(74) *Attorney, Agent, or Firm* — Staas & Halsey LLP

(57) ABSTRACT

The base station sends control area indication information of an $(N+1)^{th}$ timeslot to the user equipment by using a physical control channel of an $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot; and the base station sends, in the control area of the $(N+1)^{th}$ timeslot, a physical control channel of the $(N+1)^{th}$ timeslot to the user equipment.

14 Claims, 22 Drawing Sheets

---

A base station sends control area indication information of an $(N+1)^{th}$ timeslot to user equipment by using a physical control channel of an $N^{th}$ timeslot in a control area of the $N^{th}$ timeslot, where the control area indication information includes frequency domain control indication information and time domain control indication information — S101

The base station sends, on the control area of the $(N+1)^{th}$ timeslot, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where $k \geq 4$ — S102

(52) U.S. Cl.
CPC ............ *H04L 5/003* (2013.01); *H04L 5/0053* (2013.01); *H04W 72/0406* (2013.01)

(56) References Cited

U.S. PATENT DOCUMENTS

| | | |
|---|---|---|
| 2009/0245190 A1 | 10/2009 | Higuchi et al. |
| 2011/0002282 A1 | 1/2011 | Inoue et al. |
| 2011/0032894 A1 | 2/2011 | Miki et al. |
| 2012/0127938 A1* | 5/2012 | Lv .................... H04W 72/1205 370/329 |
| 2013/0182692 A1* | 7/2013 | Dai ...................... H04L 1/0026 370/336 |
| 2013/0201941 A1* | 8/2013 | Classon ................ H04L 5/0048 370/329 |
| 2014/0036802 A1 | 2/2014 | Chen et al. |
| 2014/0098799 A1 | 4/2014 | Kang et al. |
| 2014/0126531 A1 | 5/2014 | Kang et al. |
| 2014/0233537 A1* | 8/2014 | Wu ..................... H04W 72/042 370/336 |
| 2015/0085723 A1* | 3/2015 | Chen .................. H04W 72/042 370/280 |
| 2016/0128039 A1* | 5/2016 | Lim ..................... H04L 5/0053 370/330 |
| 2017/0026946 A1 | 1/2017 | Seo et al. |
| 2017/0150483 A1* | 5/2017 | Zhang .................. H04W 76/27 |
| 2017/0208589 A1* | 7/2017 | Majjigi ................. H04L 5/0005 |
| 2017/0245094 A1* | 8/2017 | Wong .................... H04L 5/0091 |
| 2018/0103488 A1* | 4/2018 | Marinier ............... H04B 7/0626 |
| 2018/0175987 A1* | 6/2018 | Shao ........................ H04L 5/005 |

FOREIGN PATENT DOCUMENTS

| | | |
|---|---|---|
| CN | 101729107 A | 6/2010 |
| CN | 103379628 A | 10/2013 |
| EP | 2056616 | 5/2009 |
| JP | 2008053864 A | 3/2008 |
| JP | 2014516234 A | 7/2014 |
| JP | 2014204254 A | 10/2014 |
| JP | 2014209736 A | 11/2014 |
| WO | 2009107451 A1 | 9/2009 |

OTHER PUBLICATIONS

Extended European Search Report, dated Dec. 18, 2017, in European Application No. 14909492.2 (7 pp.).
Huawei, et al., "Control signaling enhancements for short TTI," 3GPP TSG RAN WG1 Meeting #83, R1-156461, Anaheim, USA, Nov. 15-22, 2015 (6 pp.).
Official Notice of Rejection, dated Sep. 4, 2018, in Japanese Application No. 2017535404 (6 pp.).
International Search Report dated Sep. 18, 2015 in corresponding International Application No. PCT/CN2014/095893.

* cited by examiner

METHOD FOR TRANSMITTING DOWNLINK CONTROL CHANNEL AND DEVICE

CROSS-REFERENCE TO RELATED APPLICATIONS

This application is a continuation of International Application No. PCT/CN2014/095893, filed on Dec. 31, 2014, the disclosure of which is hereby incorporated by reference in its entirety.

TECHNICAL FIELD

The present invention relates to the field of communications technologies, and in particular, to a method for transmitting a downlink control channel and a device.

BACKGROUND

In Long Term Evolution (Long Term Evolution, LTE) standards, it is generally considered that a time length of one transmission time interval (Transmission Time Interval, TTI) is 1 ms, that is, a size of one subframe (subframe, SF) is 1 TTI=1 ms=1 SF. One SF includes two timeslots (Slot). As shown in FIG. 1, in a subframe used for downlink transmission in an LTE communications system, one TTI may be divided into a control area used to transmit a physical downlink control channel and a data area used to transmit a physical downlink data channel. The physical downlink control channel is used to carry control information of the physical downlink data channel.

To shorten a transmission round-trip time (Round-Trip Time, RTT) of data and a transmission delay of data, the industry proposes a solution in which it is set that TTI=0.5 ms and 1 TTI=1 ms are compatible to perform data transmission. That is, as shown in FIG. 2, one original normal TTI (N-TTI for short) is divided into two shortened TTIs (S-TTI for short) that respectively correspond to two timeslots (a timeslot 0 and a timeslot 1) in one SF. An RTT of data is a time that starts when a transmitter sends data, where during this time the transmitter then receives an acknowledgment indication of a receiver, and stops at a next moment when the transmitter sends data to the receiver again.

As shown in FIG. 2, an N-TTI may be divided into a control area (a shadowed part) and a data area (a non-shadowed part). In the foregoing solution in which TTI=0.5 ms and 1 TTI=1 ms are compatible to perform data transmission, an S-TTI (an S-TTI 0) corresponding to the timeslot 0 is overlapped with the control area of the N-TTI, and therefore, the control area of the N-TTI may be reused for the S-TTI 0, and is used as a control area of the S-TTI 0 to transmit a PDCCH in the S-TTI 0. However, an existing problem is that an S-TTI (an S-TTI 1) corresponding to the timeslot 1 is located in the data area of the N-TTI, and the part is originally used to transmit a physical downlink data channel in the N-TTI, but the control area of the N-TTI cannot be reused for an S-TTI-1. In this case, user equipment does not know from which control areas the user equipment is to receive a physical control channel of the S-TTI-1. Because a control area of the S-TTI-1 cannot be determined, a physical control channel of TTI-1 cannot be transmitted by using the control area of the S-TTI-1, and consequently, a physical data channel of the S-TTI-1 cannot be transmitted.

SUMMARY

Embodiments of the present invention provide a method for transmitting a downlink control channel and a device.

After a TTI of user equipment is set from 1 ms to 0.5 ms, a base station may indicate a control area of an S-TTI-1 to the user equipment whose S-TTI is 0.5 ms, so that a physical control channel of the S-TTI-1 may be transmitted by using the control area of the S-TTI-1, so as to transmit a physical data channel of the S-TTI-1. Moreover, impact of a control area of an $(N+1)^{th}$ timeslot on a physical data channel transmitted by using a 1-ms N-TTITTI on another frequency domain resource block of the $(N+1)^{th}$ timeslot may be avoided.

A first aspect of embodiments of the present invention provides a method for transmitting a downlink control channel, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the method includes:

sending, by a base station, control area indication information of the $(N+1)^{th}$ timeslot to user equipment by using a physical control channel of the $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot; and sending, by the base station in the control area of the $(N+1)^{th}$ timeslot, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4.

With reference to the first aspect, in a first possible implementation manner, the physical control channel of the $N^{th}$ timeslot is a physical downlink control channel PDCCH of the $N^{th}$ timeslot; and the sending, by a base station, control area indication information of the $(N+1)^{th}$ timeslot to user equipment by using a physical control channel of the $N^{th}$ timeslot in a control area of the $N^{th}$ timeslot includes:

sending, by the base station, the frequency domain control indication information and the time domain control indication information to the user equipment by using downlink control indicator DCI carried in the PDCCH of the $N^{th}$ timeslot in the control area of the $N^{th}$ timeslot.

With reference to the first aspect, in a second possible implementation manner, the physical control channel of the $N^{th}$ timeslot includes: a PDCCH of the $N^{th}$ timeslot and a physical control format indicator channel PCFICH of the $N^{th}$ timeslot; and the sending, by a base station, control area indication information of the $(N+1)^{th}$ timeslot to user equipment by using a physical control channel of the $N^{th}$ timeslot in a control area of the $N^{th}$ timeslot includes:

sending, by the base station, the frequency domain control indication information to the user equipment by using a DCI carried in the PDCCH of the $N^{th}$ timeslot in the control area of the $N^{th}$ timeslot; and sending, by the base station, the time domain control indication information to the user equipment by using a control format indicator CFI carried in the PCFICH of the $N^{th}$ timeslot in the control area of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot, and the time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot.

With reference to the first aspect, in a third possible implementation manner, the physical control channel of the $N^{th}$ timeslot includes: a PDCCH of the $N^{th}$ timeslot and a PCFICH of the $N^{th}$ timeslot; and the sending, by a base station, control area indication information of the $(N+1)^{th}$ timeslot to user equipment by using a physical control channel of the $N^{th}$ timeslot in a control area of the $N^{th}$ timeslot includes:

notifying, by the base station, the user equipment of the frequency domain control indication information by using a DCI carried in the PDCCH of the $N^{th}$ timeslot in the control area of the $N^{th}$ timeslot; and sending, by the base station, the time domain control indication information to the user equipment by using the DCI carried in the PDCCH of the $N^{th}$ timeslot in the control area of the $N^{th}$ timeslot and a CFI carried in the PCFICH of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot, a reference time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot, and the DCI carried in the PDCCH of the $N^{th}$ timeslot includes time unit area offset indication information of the control area of the $(N+1)^{th}$ timeslot, so that the user equipment determines the time domain time unit area of the control area of the $(N+1)^{th}$ timeslot according to the time unit area offset indication information of the control area of the $(N+1)^{th}$ timeslot and the reference time domain time unit area occupied by the control area of the $(N+1)^{th}$ timeslot in the $(N+1)^{th}$ timeslot.

With reference to the first aspect or any possible implementation manner in the foregoing, in a fourth possible implementation manner, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, where a resource block RB or a resource block group RBG is used as a unit for the length of the frequency domain resource block area.

With reference to any possible implementation manner of the first possible implementation manner to the third possible implementation manner, in a fifth possible implementation manner, the sending, by the base station, the frequency domain control indication information to the user equipment by using downlink control indicator DCI carried in the PDCCH of the $N^{th}$ timeslot in the control area of the $N^{th}$ timeslot includes:

sending, by the base station, the frequency domain control indication information to the user equipment by using a cell-radio network temporary identifier C-RNTI allocated to the user equipment and by using the DCI carried in the PDCCH of the $N^{th}$ timeslot in the control area of the $N^{th}$ timeslot.

With reference to the fifth possible implementation manner, in a sixth possible implementation manner, the sending, by the base station, the frequency domain control indication information to the user equipment by using a cell-radio network temporary identifier C-RNTI allocated to the user equipment and by using the DCI carried in the PDCCH of the $N^{th}$ timeslot in the control area of the $N^{th}$ timeslot includes:

sending, by the base station, the frequency domain control indication information to the user equipment by using one common Common C-RNTI allocated to different user equipments and by using the DCI that is transmitted in the control area of the $N^{th}$ timeslot and that is carried in the PDCCH of the $N^{th}$ timeslot in the control area.

A second aspect of embodiments of the present invention provides a method for transmitting a downlink control channel, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the method includes:

receiving, by user equipment, control area indication information of the $(N+1)^{th}$ timeslot by using a physical control channel of the $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot;

determining, by the user equipment, the control area of the $(N+1)^{th}$ timeslot according to the control area indication information of the $(N+1)^{th}$ timeslot; and receiving, by the user equipment in the control area of the $(N+1)^{th}$ timeslot, a physical control channel of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where $k \geq 4$.

With reference to the second aspect, in a first possible implementation manner, the physical control channel of the $N^{th}$ timeslot is a physical downlink control channel PDCCH of the $N^{th}$ timeslot; and the receiving, by user equipment, control area indication information of the $(N+1)^{th}$ timeslot by using a physical control channel of the $N^{th}$ timeslot in a control area of the $N^{th}$ timeslot includes:

receiving, by the user equipment, the frequency domain control indication information and the time domain control indication information by using downlink control indicator DCI carried in the PDCCH of the $N^{th}$ timeslot in the control area of the $N^{th}$ timeslot.

With reference to the second aspect, in a second possible implementation manner, the physical control channel of the $N^{th}$ timeslot includes: a PDCCH of the $N^{th}$ timeslot and a physical control format indicator channel PCFICH of the $N^{th}$ timeslot; and the receiving, by user equipment, control area indication information of the $(N+1)^{th}$ timeslot by using a physical control channel of the $N^{th}$ timeslot in a control area of the $N^{th}$ timeslot includes:

receiving, by the user equipment, the frequency domain control indication information by using a DCI carried in the PDCCH of the $N^{th}$ timeslot in the control area of the $N^{th}$ timeslot; and receiving, by the user equipment, the time domain control indication information by using a control format indicator CFI carried in the PCFICH of the $N^{th}$ timeslot in the control area of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot, and the time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot.

With reference to the second aspect, in a third possible implementation manner, the physical control channel of the $N^{th}$ timeslot includes: a PDCCH of the $N^{th}$ timeslot and a PCFICH of the $N^{th}$ timeslot; and the receiving, by user equipment, control area indication information of the $(N+1)^{th}$ timeslot by using a physical control channel of the $N^{th}$ timeslot in a control area of the $N^{th}$ timeslot includes:

receiving, by the user equipment, the frequency domain control indication information by using a DCI carried in the PDCCH of the $N^{th}$ timeslot in the control area of the $N^{th}$ timeslot; and receiving, by the user equipment, the time domain control indication information by using the DCI carried in the PDCCH of the $N^{th}$ timeslot in the control area of the $N^{th}$ timeslot and a CFI carried in the PCFICH of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot, a reference time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot, and the DCI carried in the PDCCH of the $N^{th}$ timeslot includes time unit area offset indication information of the control area of the $(N+1)^{th}$ timeslot.

With reference to the second aspect or any possible implementation manner in the foregoing, in a fourth possible implementation manner, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, where a resource block RB or a resource block group RBG is used as a unit for the length of the frequency domain resource block area.

With reference to the first possible implementation manner to the third possible implementation manner, in a fifth possible implementation manner, the receiving, by the user equipment, the frequency domain control indication information by using a DCI carried in the PDCCH of the $N^{th}$ timeslot in the control area of the $N^{th}$ timeslot includes:

receiving, by the user equipment, the frequency domain control indication information by using a common Common cell-radio network temporary identifier C-RNTI and by using the DCI carried in the PDCCH of the $N^{th}$ timeslot in the control area of the $N^{th}$ timeslot.

A third aspect of embodiments of the present invention provides a method for transmitting a downlink control channel, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the method includes:

sending, by a base station, a secondary-physical control format indicator channel S-PCFICH of the $(N+1)^{th}$ timeslot to user equipment, so that the user equipment determines control area indication information of the $(N+1)^{th}$ timeslot according to the S-PCFICH of the $(N+1)^{th}$ timeslot and resource element location information of the S-PCFICH of the $(N+1)^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the resource element location information is predefined or is sent by the base station to the user equipment by using high layer signaling; and sending, by the base station in the control area of the $(N+1)^{th}$ timeslot, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where $k \geq 4$.

With reference to the third aspect, in a first possible implementation manner, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, where a resource block RB or a resource block group RBG is used as a unit for the length of the frequency domain resource block area.

With reference to the third aspect or the first possible implementation manner, in a second possible implementation manner, the sending, by a base station, a secondary-physical control format indicator channel S-PCFICH of the $(N+1)^{th}$ timeslot to user equipment, so that the user equipment determines control area indication information of the $(N+1)^{th}$ timeslot according to the S-PCFICH of the $(N+1)^{th}$ timeslot and resource element location information of the S-PCFICH of the $(N+1)^{th}$ timeslot includes:

sending, by the base station, the S-PCFICH of the $(N+1)^{th}$ timeslot to the user equipment at a resource element location indicated by the resource element location information, where the S-PCFICH of the $(N+1)^{th}$ timeslot carries the time domain control indication information, where the resource element location information includes a start frequency domain resource block location of a frequency domain resource block area occupied by the S-PCFICH of the $(N+1)^{th}$ timeslot in the $(N+1)^{th}$ timeslot and a length of the frequency domain resource block area occupied by the S-PCFICH of the $(N+1)^{th}$ timeslot in the $(N+1)^{th}$ timeslot, where the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot, the length of the frequency domain resource block area occupied by the control area of the $(N+1)^{th}$ timeslot in the $(N+1)^{th}$ timeslot is equal to L plus a length of the frequency domain resource block area in the $(N+1)^{th}$ timeslot at which the S-PCFICH of the $(N+1)^{th}$ timeslot is located, and L is an integer greater than or equal to 0.

With reference to the first possible implementation manner, in a third possible implementation manner, the sending, by a base station, a secondary-physical control format indicator channel S-PCFICH of the $(N+1)^{th}$ timeslot to user equipment, so that the user equipment determines control area indication information of the $(N+1)^{th}$ timeslot according to the S-PCFICH of the $(N+1)^{th}$ timeslot and resource element location information of the S-PCFICH of the $(N+1)^{th}$ timeslot includes:

sending, by the base station, the S-PCFICH of the $(N+1)^{th}$ timeslot to the user equipment at a resource element location indicated by the resource element location information, where the S-PCFICH of the $(N+1)^{th}$ timeslot carries frequency domain resource length information and the time domain control indication information, where the frequency domain resource length information is used to indicate the length of the frequency domain resource block area occupied by the control area of the $(N+1)^{th}$ timeslot in the $(N+1)^{th}$ timeslot, the resource element location information includes a start frequency domain resource block location of the S-PCFICH of the $(N+1)^{th}$ timeslot in the $(N+1)^{th}$ timeslot, and the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot.

A fourth aspect of embodiments of the present invention provides a method for transmitting a downlink control channel, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the method includes:

determining, by user equipment, resource element location information of a secondary-physical control format indicator channel S-PCFICH of the $(N+1)^{th}$ timeslot by using high layer signaling or a predefined manner;

receiving, by the user equipment at a resource element location indicated by the resource element location information of the S-PCFICH of the $(N+1)^{th}$ timeslot, the S-PCFICH channel of the $(N+1)^{th}$ timeslot;

determining, by the user equipment, control area indication information of the $(N+1)^{th}$ timeslot according to the resource element location information of the S-PCFICH of the $(N+1)^{th}$ timeslot and the S-PCFICH of the $(N+1)^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot;

determining, by the user equipment, the control area of the $(N+1)^{th}$ timeslot according to the control area indication information of the $(N+1)^{th}$ timeslot; and receiving, by the user equipment in the control area of the $(N+1)^{th}$ timeslot, a physical control channel of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where k≥4.

With reference to fourth aspect, in a first possible implementation manner, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, where a resource block RB or a resource block group RBG is used as a unit for the length of the frequency domain resource block area.

With reference to the fourth aspect or the first possible implementation manner, in a second possible implementation manner, the determining, by the user equipment, control area indication information of the $(N+1)^{th}$ timeslot according to the resource element location information of the S-PCFICH of the $(N+1)^{th}$ timeslot and the S-PCFICH of the $(N+1)^{th}$ timeslot includes:

determining, by the user equipment, the frequency domain control indication information according to the resource element location information, where the resource element location information includes a start frequency domain resource block location of a frequency domain resource block area occupied by the S-PCFICH of the $(N+1)^{th}$ timeslot in the $(N+1)^{th}$ timeslot and a length of the frequency domain resource block area occupied by the S-PCFICH of the $(N+1)^{th}$ timeslot in the $(N+1)^{th}$ timeslot, the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot, the length of the frequency domain resource block area occupied by the control area of the $(N+1)^{th}$ timeslot in the $(N+1)^{th}$ timeslot is equal to L plus a length of the frequency domain resource block area in the $(N+1)^{th}$ timeslot at which the S-PCFICH of the $(N+1)^{th}$ timeslot is located, and L is an integer greater than or equal to 0; and determining, by the user equipment, the time domain control indication information according to secondary-control format indicator information S-CFI carried in the S-PCFICH of the $(N+1)^{th}$ timeslot.

With reference to the first possible implementation manner, in a third possible implementation manner, the determining, by the user equipment, control area indication information of the $(N+1)^{th}$ timeslot according to the resource element location information of the S-PCFICH of the $(N+1)^{th}$ timeslot and the S-PCFICH of the $(N+1)^{th}$ timeslot includes:

determining, by the user equipment according to the resource element location information, the start frequency domain resource block location of the frequency domain resource block area occupied by the control area of the $(N+1)^{th}$ timeslot in the $(N+1)^{th}$ timeslot, where the resource element location information includes a start frequency domain resource block location of the S-PCFICH of the $(N+1)^{th}$ timeslot in the $(N+1)^{th}$ timeslot, and the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot; and determining, by the user equipment according to an S-CFI carried in the S-PCFICH of the $(N+1)^{th}$ timeslot, the length of the frequency domain resource block area occupied by the control area of the $(N+1)^{th}$ timeslot in the $(N+1)^{th}$ timeslot and the time domain control indication information.

A fifth aspect of embodiments of the present invention provides a method for transmitting a downlink control channel, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the method includes:

sending, by a base station, control area indication information of the $(N+1)^{th}$ timeslot to user equipment by using high layer signaling or high layer signaling and a physical control channel of the $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the control area of the $(N+1)^{th}$ timeslot is used to transmit a physical control channel of the $(N+1)^{th}$ timeslot; and sending, by the base station in the control area of the $(N+1)^{th}$ timeslot, the physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4, where the high layer signaling is radio resource control RRC configuration signaling or media access control MAC layer configuration signaling.

A sixth aspect of embodiments of the present invention provides a method for transmitting a downlink control channel, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the method includes:

receiving, by user equipment, control area indication information of the $(N+1)^{th}$ timeslot sent, by using high layer signaling or high layer signaling and a physical control channel of the $N^{th}$ timeslot in a control area of the $N^{th}$ timeslot, by a base station, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the control area of the $(N+1)^{th}$ timeslot is used to transmit a physical control channel of the $(N+1)^{th}$ timeslot;

determining, by the user equipment, the control area of the $(N+1)^{th}$ timeslot according to the control area indication information of the $(N+1)^{th}$ timeslot; and receiving, by the user equipment in the control area of the $(N+1)^{th}$ timeslot, the physical control channel of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where k≥4, where the high layer signaling is radio resource control RRC configuration signaling or media access control MAC layer configuration signaling.

A seventh aspect of embodiments of the present invention provides a base station, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the base station includes:

a first sending unit, configured to send control area indication information of the $(N+1)^{th}$ timeslot to user equipment by using a physical control channel of the $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot; and a second sending unit, further configured to send, in the control area of the $(N+1)^{th}$ timeslot indicated by the control area indication information of the $(N+1)^{th}$ timeslot sent by the first sending unit, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4.

With reference to the seventh aspect, in a first possible implementation manner, the physical control channel of the $N^{th}$ timeslot is a physical downlink control channel PDCCH of the $N^{th}$ timeslot; and the first sending unit is specifically configured to send the frequency domain control indication information and the time domain control indication information to the user equipment by using downlink control indicator DCI carried in the PDCCH of the $N^{th}$ timeslot in the control area of the $N^{th}$ timeslot.

With reference to the seventh aspect, in a second possible implementation manner, the physical control channel of the $N^{th}$ timeslot includes: a PDCCH of the $N^{th}$ timeslot and a physical control format indicator channel PCFICH of the $N^{th}$ timeslot; and the first sending unit is specifically configured to:

send the frequency domain control indication information to the user equipment by using a DCI carried in the PDCCH of the $N^{th}$ timeslot in the control area of the $N^{th}$ timeslot; and send the time domain control indication information to the user equipment by using a control format indicator CFI carried in the PCFICH of the $N^{th}$ timeslot in the control area of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot, and the time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot.

With reference to the seventh aspect, in a third possible implementation manner, the physical control channel of the $N^{th}$ timeslot includes: a PDCCH of the $N^{th}$ timeslot and a PCFICH of the $N^{th}$ timeslot; and the first sending unit is specifically configured to:

notify the user equipment of the frequency domain control indication information by using a DCI carried in the PDCCH of the $N^{th}$ timeslot in the control area of the $N^{th}$ timeslot; and send the time domain control indication information to the user equipment by using the DCI carried in the PDCCH of the $N^{th}$ timeslot in the control area of the $N^{th}$ timeslot and a CFI carried in the PCFICH of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot, a reference time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot, and the DCI carried in the PDCCH of the $N^{th}$ timeslot includes time unit area offset indication information of the control area of the $(N+1)^{th}$ timeslot, so that the user equipment determines the time domain time unit area of the control area of the $(N+1)^{th}$ timeslot according to the time unit area offset indication information of the control area of the $(N+1)^{th}$ timeslot and the reference time domain time unit area occupied by the control area of the $(N+1)^{th}$ timeslot in the $(N+1)^{th}$ timeslot.

With reference to the seventh aspect or any possible implementation manner in the foregoing, in a fourth possible implementation manner, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, where a resource block RB or a resource block group RBG is used as a unit for the length of the frequency domain resource block area.

With reference to any possible implementation manner of the first possible implementation manner to the third possible implementation manner, in a fifth possible implementation manner, the first sending unit is specifically configured to send the frequency domain control indication information to the user equipment by using a cell-radio network temporary identifier C-RNTI allocated to the user equipment and by using the DCI carried in the PDCCH of the $N^{th}$ timeslot in the control area of the $N^{th}$ timeslot.

With reference to the fifth possible implementation manner, in a sixth possible implementation manner, the first sending unit is specifically configured to send the frequency domain control indication information to the user equipment by using one common Common C-RNTI allocated to different user equipments and by using the DCI that is transmitted in the control area of the $N^{th}$ timeslot and that is carried in the PDCCH of the $N^{th}$ timeslot in the control area.

An eighth aspect of embodiments of the present invention provides user equipment, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the user equipment includes:

a first receiving unit, configured to receive control area indication information of the $(N+1)^{th}$ timeslot by using a physical control channel of the $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot;

a determining unit, configured to determine the control area of the $(N+1)^{th}$ timeslot according to the control area indication information of the $(N+1)^{th}$ timeslot received by the first receiving unit; and a second receiving unit, configured to receive, in the control area of the $(N+1)^{th}$ timeslot determined by the determining unit, a physical control channel of the $(N+1)^{th}$ timeslot, so as to determine a physical data channel of the $(N+1)^{th}$ timeslot or a physical data channel of an $(N+1+k+)^{th}$ timeslot according to the physical control channel of the $(N+1)^{th}$ timeslot, where $k \geq 4$.

With reference to the eighth aspect, in a first possible implementation manner, the physical control channel of the $N^{th}$ timeslot is a physical downlink control channel PDCCH of the $N^{th}$ timeslot; and the first receiving unit is specifically configured to receive the frequency domain control indication information and the time domain control indication information by using downlink control indicator DCI carried in the PDCCH of the $N^{th}$ timeslot in the control area of the $N^{th}$ timeslot.

With reference to the eighth aspect, in a second possible implementation manner, the physical control channel of the $N^{th}$ timeslot includes: a PDCCH of the $N^{th}$ timeslot and a physical control format indicator channel PCFICH of the $N^{th}$ timeslot; and the first receiving unit is specifically configured to:

receive the frequency domain control indication information by using a DCI carried in the PDCCH of the $N^{th}$ timeslot in the control area of the $N^{th}$ timeslot; and receive the time domain control indication information by using a control format indicator CFI carried in the PCFICH of the $N^{th}$ timeslot in the control area of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot, and the time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot.

With reference to the eighth aspect, in a third possible implementation manner, the physical control channel of the $N^{th}$ timeslot includes: a PDCCH of the $N^{th}$ timeslot and a PCFICH of the $N^{th}$ timeslot; and the first receiving unit is specifically configured to:

receive the frequency domain control indication information by using a DCI carried in the PDCCH of the $N^{th}$ timeslot in the control area of the $N^{th}$ timeslot; and receive the time domain control indication information by using the DCI carried in the PDCCH of the $N^{th}$ timeslot in the control area of the $N^{th}$ timeslot and a CFI carried in the PCFICH of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot, a reference time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot, and the DCI carried in the PDCCH of the $N^{th}$ timeslot includes time unit area offset indication information of the control area of the $(N+1)^{th}$ timeslot.

With reference to the eighth aspect or any possible implementation manner in the foregoing, in a fourth possible implementation manner, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, where a resource block RB or a resource block group RBG is used as a unit for the length of the frequency domain resource block area.

With reference to the first possible implementation manner to the third possible implementation manner, in a fifth possible implementation manner, the first receiving unit is specifically configured to receive the frequency domain control indication information by using a common Common cell-radio network temporary identifier C-RNTI and by using the DCI carried in the PDCCH of the $N^{th}$ timeslot in the control area of the $N^{th}$ timeslot.

A ninth aspect of embodiments of the present invention provides a base station, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the base station includes:

a first sending unit, configured to send a secondary-physical control format indicator channel S-PCFICH of the $(N+1)^{th}$ timeslot to user equipment, so that the user equipment determines control area indication information of the $(N+1)^{th}$ timeslot according to the S-PCFICH of the $(N+1)^{th}$ timeslot and resource element location information of the S-PCFICH of the $(N+1)^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the resource element location information is predefined or is sent by the base station to the user equipment by using high layer signaling; and a second sending unit, configured to send, in the control area of the $(N+1)^{th}$ timeslot indicated by the control area indication information sent by the first sending unit, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4.

With reference to the ninth aspect, in a first possible implementation manner, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, where a resource block RB or a resource block group RBG is used as a unit for the length of the frequency domain resource block area.

With reference to the ninth aspect or the first possible implementation manner, in a second possible implementation manner, the first sending unit is specifically configured to send the S-PCFICH of the $(N+1)^{th}$ timeslot to the user equipment at a resource element location indicated by the resource element location information, where the S-PCFICH of the $(N+1)^{th}$ timeslot carries the time domain control indication information, where the resource element location information includes a start frequency domain resource block location of a frequency domain resource block area occupied by the S-PCFICH of the $(N+1)^{th}$ timeslot in the $(N+1)^{th}$ timeslot and a length of the frequency domain resource block area occupied by the S-PCFICH of the $(N+1)^{th}$ timeslot in the $(N+1)^{th}$ timeslot, where the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot, the length of the frequency domain resource block area occupied by the control area of the $(N+1)^{th}$ timeslot in the $(N+1)^{th}$ timeslot is equal to L plus a length of the frequency domain resource block area in the $(N+1)^{th}$ timeslot at which the S-PCFICH of the $(N+1)^{th}$ timeslot is located, and L is an integer greater than or equal to 0.

With reference to the first possible implementation manner, in a third possible implementation manner, the first sending unit is specifically configured to send the S-PCFICH of the $(N+1)^{th}$ timeslot to the user equipment at a resource element location indicated by the resource element location information, where the S-PCFICH of the $(N+1)^{th}$ timeslot carries frequency domain resource length information and the time domain control indication information, where the frequency domain resource length information is used to indicate the length of the frequency domain resource block area occupied by the control area of the $(N+1)^{th}$ timeslot in the $(N+1)^{th}$ timeslot, the resource element location information includes a start frequency domain resource block location of the S-PCFICH of the $(N+1)^{th}$ timeslot in the $(N+1)^{th}$ timeslot, and the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot.

A tenth aspect of embodiments of the present invention provides user equipment, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the user equipment includes:

a first determining unit, configured to determine resource element location information of a secondary-physical control format indicator channel S-PCFICH of the $(N+1)^{th}$ timeslot by using high layer signaling or a predefined manner;

a first receiving unit, configured to receive, at a resource element location indicated by the resource element location information of the S-PCFICH of the $(N+1)^{th}$ timeslot determined by the first determining unit, the S-PCFICH channel of the $(N+1)^{th}$ timeslot;

a second determining unit, configured to determine control area indication information of the $(N+1)^{th}$ timeslot according to the resource element location information of the S-PCFICH of the $(N+1)^{th}$ timeslot determined by the first determining unit and the S-PCFICH of the $(N+1)^{th}$ timeslot received by the first receiving unit, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot;

a third determining unit, configured to determine the control area of the $(N+1)^{th}$ timeslot according to the control area indication information of the $(N+1)^{th}$ timeslot determined by the second determining unit; and a second receiving unit, configured to receive, in the control area of the $(N+1)^{th}$ timeslot determined by the third determining unit, a physical control channel of the $(N+1)^{th}$ timeslot, so as to determine a physical data channel of the $(N+1)^{th}$ timeslot or a physical data channel of an $(N+1+k+)^{th}$ timeslot according to the physical control channel of the $(N+1)^{th}$ timeslot, where $k \geq 4$.

With reference to the tenth aspect, in a first possible implementation manner, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, where a resource block RB or a resource block group RBG is used as a unit for the length of the frequency domain resource block area.

With reference to the tenth aspect or the first possible implementation manner, in a second possible implementation manner, the second determining unit is specifically configured to:

determine the frequency domain control indication information according to the resource element location information, where the resource element location information includes a start frequency domain resource block location of a frequency domain resource block area occupied by the S-PCFICH of the $(N+1)^{th}$ timeslot in the $(N+1)^{th}$ timeslot and a length of the frequency domain resource block area occupied by the S-PCFICH of the $(N+1)^{th}$ timeslot in the $(N+1)^{th}$ timeslot, the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot, the length of the frequency domain resource block area occupied by the control area of the $(N+1)^{th}$ timeslot in the $(N+1)^{th}$ timeslot is equal to L plus a length of the frequency domain resource block area in the $(N+1)^{th}$ timeslot at which the S-PCFICH of the $(N+1)^{th}$ timeslot is located, and L is an integer greater than or equal to 0; and determine the time domain control indication information according to secondary-control format indicator information S-CFI carried in the S-PCFICH of the $(N+1)^{th}$ timeslot.

With reference to the first possible implementation manner, in a third possible implementation manner, the second determining unit is specifically configured to:

determine, according to the resource element location information, the start frequency domain resource block location of the frequency domain resource block area occupied by the control area of the $(N+1)^{th}$ timeslot in the $(N+1)^{th}$ timeslot, where the resource element location information includes a start frequency domain resource block location of the S-PCFICH of the $(N+1)^{th}$ timeslot in the $(N+1)^{th}$ timeslot, and the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot; and determine, according to an S-CFI carried in the S-PCFICH of the $(N+1)^{th}$ timeslot, the length of the frequency domain resource block area occupied by the control area of the $(N+1)^{th}$ timeslot in the $(N+1)^{th}$ timeslot and the time domain control indication information.

An eleventh aspect of embodiments of the present invention provides a base station, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the base station includes:

a first sending unit, configured to send control area indication information of the $(N+1)^{th}$ timeslot to user equipment by using high layer signaling or high layer signaling and a physical control channel of the $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the control area of the $(N+1)^{th}$ timeslot is used to transmit a physical control channel of the $(N+1)^{th}$ timeslot; and a second sending unit, configured to send, in the control area of the $(N+1)^{th}$ timeslot indicated by the control area indication information sent by the first sending unit, the physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where $k \geq 4$, where the high layer signaling is radio resource control RRC configuration signaling or media access control MAC layer configuration signaling.

A twelfth aspect of embodiments of the present invention provides user equipment, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the user equipment includes:

a first receiving unit, configured to receive control area indication information of the $(N+1)^{th}$ timeslot sent, by using high layer signaling or high layer signaling and a physical control channel of the $N^{th}$ timeslot in a control area of the $N^{th}$ timeslot, by a base station, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the control area of the $(N+1)^{th}$ timeslot is used to transmit a physical control channel of the $(N+1)^{th}$ timeslot;

a determining unit, configured to determine the control area of the $(N+1)^{th}$ timeslot according to the control area indication information of the $(N+1)^{th}$ timeslot received by the first receiving unit; and a second receiving unit, configured to receive, in the control area of the $(N+1)^{th}$ timeslot determined by the determining unit, the physical control channel of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where k≥4, where the high layer signaling is radio resource control RRC configuration signaling or media access control MAC layer configuration signaling.

A thirteenth aspect of embodiments of the present invention provides a base station, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the base station includes:

a memory, configured to store a group of program code, where the memory is a computer storage medium of the base station, and the computer storage medium includes: a non-volatile storage medium; and a transmitter, configured to perform the following operations according to the program code stored in the memory:

sending control area indication information of the $(N+1)^{th}$ timeslot to user equipment by using a physical control channel of the $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot; and sending, in the control area of the $(N+1)^{th}$ timeslot, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4.

With reference to the thirteenth aspect, in a first possible implementation manner, the physical control channel of the $N^{th}$ timeslot is a physical downlink control channel PDCCH of the $N^{th}$ timeslot; and the transmitter is specifically configured to send the frequency domain control indication information and the time domain control indication information to the user equipment by using downlink control indicator DCI carried in the PDCCH of the $N^{th}$ timeslot in the control area of the $N^{th}$ timeslot.

With reference to the thirteenth aspect, in a second possible implementation manner, the physical control channel of the $N^{th}$ timeslot includes: a PDCCH of the $N^{th}$ timeslot and a physical control format indicator channel PCFICH of the $N^{th}$ timeslot; and the transmitter is specifically configured to:

send the frequency domain control indication information to the user equipment by using a DCI carried in the PDCCH of the $N^{th}$ timeslot in the control area of the $N^{th}$ timeslot; and send the time domain control indication information to the user equipment by using a control format indicator CFI carried in the PCFICH of the $N^{th}$ timeslot in the control area of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot, and the time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot.

With reference to the thirteenth aspect, in a third possible implementation manner, the physical control channel of the $N^{th}$ timeslot includes: a PDCCH of the $N^{th}$ timeslot and a PCFICH of the $N^{th}$ timeslot; and the transmitter is specifically configured to:

notify the user equipment of the frequency domain control indication information by using a DCI carried in the PDCCH of the $N^{th}$ timeslot in the control area of the $N^{th}$ timeslot; and send the time domain control indication information to the user equipment by using the DCI carried in the PDCCH of the $N^{th}$ timeslot in the control area of the $N^{th}$ timeslot and a CFI carried in the PCFICH of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot, a reference time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot, and the DCI carried in the PDCCH of the $N^{th}$ timeslot includes time unit area offset indication information of the control area of the $(N+1)^{th}$ timeslot, so that the user equipment determines the time domain time unit area of the control area of the $(N+1)^{th}$ timeslot according to the time unit area offset indication information of the control area of the $(N+1)^{th}$ timeslot and the reference time domain time unit area occupied by the control area of the $(N+1)^{th}$ timeslot in the $(N+1)^{th}$ timeslot.

With reference to the thirteenth aspect or any possible implementation manner in the foregoing, in a fourth possible implementation manner, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, where a resource block RB or a resource block group RBG is used as a unit for the length of the frequency domain resource block area.

With reference to any possible implementation manner of the first possible implementation manner to the third possible implementation manner, in a fifth possible implementation manner, the transmitter is specifically configured to send the frequency domain control indication information to the user equipment by using a cell-radio network temporary identifier C-RNTI allocated to the user equipment and by using the DCI carried in the PDCCH of the $N^{th}$ timeslot in the control area of the $N^{th}$ timeslot.

With reference to fifth possible implementation manner, in a sixth possible implementation manner, the transmitter is specifically configured to send the frequency domain control indication information to the user equipment by using one common Common C-RNTI allocated to different user equipments and by using the DCI that is transmitted in the control area of the $N^{th}$ timeslot and that is carried in the PDCCH of the $N^{th}$ timeslot in the control area.

A fourteenth aspect of embodiments of the present invention provides user equipment, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the user equipment includes:

a receiver, configured to receive control area indication information of the $(N+1)^{th}$ timeslot by using a physical control channel of the $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot; and a processor, configured to determine the control area of the $(N+1)^{th}$ timeslot according to the control area indication information of the $(N+1)^{th}$ timeslot received by the receiver, where the receiver is further configured to receive, in the control area of the $(N+1)^{th}$ timeslot determined by the processor, a physical control channel of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where $k \geq 4$.

With reference to the fourteenth aspect, in a first possible implementation manner, the physical control channel of the $N^{th}$ timeslot is a physical downlink control channel PDCCH of the $N^{th}$ timeslot; and the receiver is further configured to receive the frequency domain control indication information and the time domain control indication information by using downlink control indicator DCI carried in the PDCCH of the $N^{th}$ timeslot in the control area of the $N^{th}$ timeslot.

With reference to the fourteenth aspect, in a second possible implementation manner, the physical control channel of the $N^{th}$ timeslot includes: a PDCCH of the $N^{th}$ timeslot and a physical control format indicator channel PCFICH of the $N^{th}$ timeslot; and the receiver is further configured to: receive the frequency domain control indication information by using a DCI carried in the PDCCH of the $N^{th}$ timeslot in the control area of the $N^{th}$ timeslot; and receive the time domain control indication information by using a control format indicator CFI carried in the PCFICH of the $N^{th}$ timeslot in the control area of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot, and the time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot.

With reference to the fourteenth aspect, in a third possible implementation manner, the physical control channel of the $N^{th}$ timeslot includes: a PDCCH of the $N^{th}$ timeslot and a PCFICH of the $N^{th}$ timeslot;

the receiver is further configured to: receive the frequency domain control indication information by using a DCI carried in the PDCCH of the $N^{th}$ timeslot in the control area of the $N^{th}$ timeslot; and receive the time domain control indication information by using the DCI carried in the PDCCH of the $N^{th}$ timeslot in the control area of the $N^{th}$ timeslot and a CFI carried in the PCFICH of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot; and the processor is further configured to determine the time domain time unit area of the control area of the $(N+1)^{th}$ timeslot according to the time domain control indication information received by the receiver, where a reference time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot, and the DCI carried in the PDCCH of the $N^{th}$ timeslot includes time unit area offset indication information of the control area of the $(N+1)^{th}$ timeslot.

With reference to any possible implementation manner of the first possible implementation manner to the third possible implementation manner, in a fourth possible implementation manner, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, where a resource block RB or a resource block group RBG is used as a unit for the length of the frequency domain resource block area.

With reference to any possible implementation manner in the foregoing, in a fifth possible implementation manner, the receiver is further configured to receive the frequency domain control indication information by using a common Common cell-radio network temporary identifier C-RNTI and by using the DCI carried in the PDCCH of the $N^{th}$ timeslot in the control area of the $N^{th}$ timeslot.

A fifteenth aspect of embodiments of the present invention provides a base station, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the base station includes:

a memory, configured to store a group of program code, where the memory is a computer storage medium of the base station, and the computer storage medium includes: a non-volatile storage medium; and a transmitter, configured to perform the following operations according to the program code stored in the memory:

sending a secondary-physical control format indicator channel S-PCFICH of the $(N+1)^{th}$ timeslot to user equipment, so that the user equipment determines control area indication information of the $(N+1)^{th}$ timeslot according to the S-PCFICH of the $(N+1)^{th}$ timeslot and resource element location information of the S-PCFICH of the $(N+1)^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the resource element location information is predefined or is sent by the base station to the user equipment by using high layer signaling; and sending, in the control area of the $(N+1)^{th}$ timeslot, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4.

With reference to the fifteenth aspect, in a first possible implementation manner, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, where a resource block RB or a resource block group RBG is used as a unit for the length of the frequency domain resource block area.

With reference to the fifteenth aspect or the first possible implementation manner, in a second possible implementation manner, the transmitter is further configured to send the S-PCFICH of the $(N+1)^{th}$ timeslot to the user equipment at a resource element location indicated by the resource element location information, where the S-PCFICH of the $(N+1)^{th}$ timeslot carries the time domain control indication information, where the resource element location information includes a start frequency domain resource block location of a frequency domain resource block area occupied by the S-PCFICH of the $(N+1)^{th}$ timeslot in the $(N+1)^{th}$ timeslot and a length of the frequency domain resource block area occupied by the S-PCFICH of the $(N+1)^{th}$ timeslot in the $(N+1)^{th}$ timeslot, where the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot, the length of the frequency domain resource block area occupied by the control area of the $(N+1)^{th}$ timeslot in the $(N+1)^{th}$ timeslot is equal to L plus a length of the frequency domain resource block area in the $(N+1)^{th}$ timeslot at which the S-PCFICH of the $(N+1)^{th}$ timeslot is located, and L is an integer greater than or equal to 0.

With reference to the fifteenth aspect or the first possible implementation manner, in a third possible implementation manner, the transmitter is further configured to send the S-PCFICH of the $(N+1)^{th}$ timeslot to the user equipment at a resource element location indicated by the resource element location information, where the S-PCFICH of the $(N+1)^{th}$ timeslot carries frequency domain resource length information and the time domain control indication information, where the frequency domain resource length information is used to indicate the length of the frequency domain resource block area occupied by the control area of the $(N+1)^{th}$ timeslot in the $(N+1)^{th}$ timeslot, the resource element location information includes a start frequency domain resource block location of the S-PCFICH of the $(N+1)^{th}$ timeslot in the $(N+1)^{th}$ timeslot, and the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot.

A sixteenth aspect of embodiments of the present invention provides user equipment, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the user equipment includes:

a processor, configured to determine resource element location information of a secondary-physical control format indicator channel S-PCFICH of the $(N+1)^{th}$ timeslot by using high layer signaling or a predefined manner; and a receiver, configured to determine, according to the resource element location information of the S-PCFICH of the $(N+1)^{th}$ timeslot determined by the processor and the S-PCFICH of the $(N+1)^{th}$ timeslot, control area indication information of the $(N+1)^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot, where the processor is further configured to determine the control area of the $(N+1)^{th}$ timeslot according to the control area indication information of the $(N+1)^{th}$ timeslot received by the receiver; and the receiver is further configured to receive, in the control area of the $(N+1)^{th}$ timeslot determined by the processor, a physical control channel of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where k≥4.

With reference to the sixteenth aspect, in a first possible implementation manner, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, where a resource block RB or a resource block group RBG is used as a unit for the length of the frequency domain resource block area.

With reference to the sixteenth aspect or the first possible implementation manner, in a second possible implementation manner, the processor is further configured to:

determine the frequency domain control indication information according to the resource element location information, where the resource element location information includes a start frequency domain resource block location of a frequency domain resource block area occupied by the S-PCFICH of the $(N+1)^{th}$ timeslot in the $(N+1)^{th}$ timeslot and a length of the frequency domain resource block area occupied by the S-PCFICH of the $(N+1)^{th}$ timeslot in the $(N+1)^{th}$ timeslot, the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot, the length of the frequency domain resource block area occupied by the control area of the $(N+1)^{th}$ timeslot in the $(N+1)^{th}$ timeslot is equal to L plus a length of the frequency domain resource block area in the $(N+1)^{th}$ timeslot at which the S-PCFICH of the $(N+1)^{th}$ timeslot is located, and L is an integer greater than or equal to 0; and determine the time domain control indication information according to secondary-control format indicator information S-CFI carried in the S-PCFICH of the $(N+1)^{th}$ timeslot.

With reference to the sixteenth aspect or the first possible implementation manner, in a third possible implementation manner, the processor is further configured to:

determine, according to the resource element location information, the start frequency domain resource block location of the frequency domain resource block area occupied by the control area of the $(N+1)^{th}$ timeslot in the $(N+1)^{th}$ timeslot, where the resource element location information includes a start frequency domain resource block location of the S-PCFICH of the $(N+1)^{th}$ timeslot in the $(N+1)^{th}$ timeslot, and the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot; and determine, according to an S-CFI carried in the S-PCFICH of the $(N+1)^{th}$ timeslot, the length of the frequency domain resource block area occupied by the control area of the $(N+1)^{th}$ timeslot in the $(N+1)^{th}$ timeslot and the time domain control indication information.

A seventeenth aspect of embodiments of the present invention provides a base station, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the base station includes:

a memory, configured to store a group of program code, where the memory is a computer storage medium of the base station, and the computer storage medium includes: a non-volatile storage medium; and a transmitter, configured to perform the following operations according to the program code stored in the memory:

sending control area indication information of the $(N+1)^{th}$ timeslot to user equipment by using high layer signaling or high layer signaling and a physical control channel of the $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the control area of the $(N+1)^{th}$ timeslot is used to transmit a physical control channel of the $(N+1)^{th}$ timeslot;

sending, in the control area of the $(N+1)^{th}$ timeslot, the physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4, where the high layer signaling is radio resource control RRC configuration signaling or media access control MAC layer configuration signaling.

An eighteenth aspect of embodiments of the present invention provides user equipment, where a subframe includes an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the user equipment includes:

a receiver, configured to receive control area indication information of the $(N+1)^{th}$ timeslot sent, by using high layer signaling or high layer signaling and a physical control channel of the $N^{th}$ timeslot in a control area of the $N^{th}$ timeslot, by a base station, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the control area of the $(N+1)^{th}$ timeslot is used to transmit a physical control channel of the $(N+1)^{th}$ timeslot; and a processor, configured to determine the control area of the $(N+1)^{th}$ timeslot according to the control area indication information of the $(N+1)^{th}$ timeslot received by the receiver, where the receiver is further configured to receive, in the control area of the $(N+1)^{th}$ timeslot determined by the processor, the physical control channel of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where k≥4, where the high layer signaling is radio resource control RRC configuration signaling or media access control MAC layer configuration signaling.

For the method for transmitting a downlink control channel and the device provided in the embodiments of the present invention, compared with the prior art, in this solution, a base station may send control area indication information of an $(N+1)^{th}$ timeslot to user equipment by using a physical control channel of an $N^{th}$ timeslot in a control area of the $N^{th}$ timeslot, where the control area indication information of the $(N+1)^{th}$ timeslot is used to indicate a time domain resource and a frequency domain resource that are occupied by a control area of the $(N+1)^{th}$ timeslot in the $(N+1)^{th}$ timeslot, that is, the control area of the $N^{th}$ timeslot is used to indicate, to the user equipment, the time domain resource and the frequency domain resource that are occupied by the control area of the $(N+1)^{th}$ timeslot in the $(N+1)^{th}$ timeslot, and then send, in the control area indicated by the control area indication information of the $(N+1)^{th}$ timeslot, a physical control channel of the $(N+1)^{th}$ timeslot to the user equipment. The user equipment may then determine, from the control area of the $N^{th}$ timeslot, the time domain resource and the frequency domain resource that are occupied by the control area of the $(N+1)^{th}$ timeslot in the $(N+1)^{th}$ timeslot, and receive the physical control channel of the $(N+1)^{th}$ timeslot on the determined time domain resource and frequency domain resource. That is, the base station may indicate, to the user equipment, the control area of the $(N+1)^{th}$ timeslot (a timeslot corresponding to an S-TTI-1), so that the physical control channel of the $(N+1)^{th}$ timeslot may be transmitted by using the control area of the $(N+1)^{th}$ timeslot, so as to transmit a physical data channel of the $(N+1)^{th}$ timeslot.

Moreover, in this solution, the control area of the $N^{th}$ timeslot (a timeslot corresponding to a first TTI, that is, a timeslot corresponding to an S-TTI-0) is a control area of an N-TTI, that is, the control area of the N-TTI is still reused for the first TTI. That is, in this solution, the base station may indicate, to the user equipment, the $(N+1)^{th}$ timeslot (a timeslot corresponding to a second TTI, that is, a timeslot corresponding to a control area of the S-TTI-1) by using the control area of the N-TTI. That is, by means of this solution, compatibility between a 1-ms N-TTI and a 0.5-ms S-TTI can be implemented, and impact of transmission of the control area of the $(N+1)^{th}$ timeslot on transmission of a physical data channel of the 1-ms N-TTI can be avoided.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
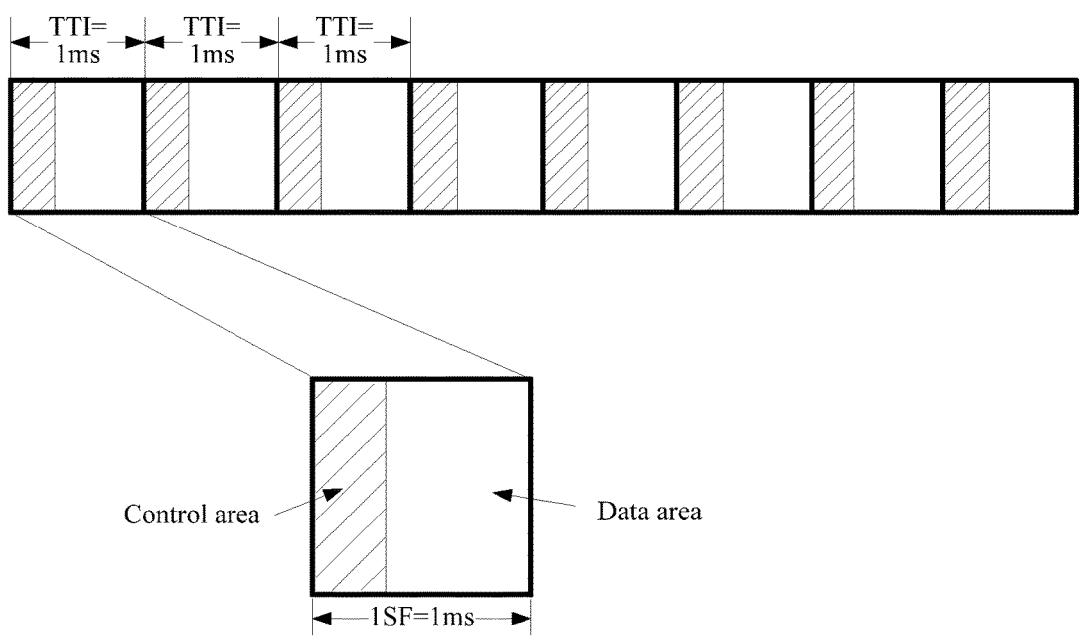
FIG. 1 is a schematic structural diagram of division of areas of a transmission time interval TTI.
Figure 2:
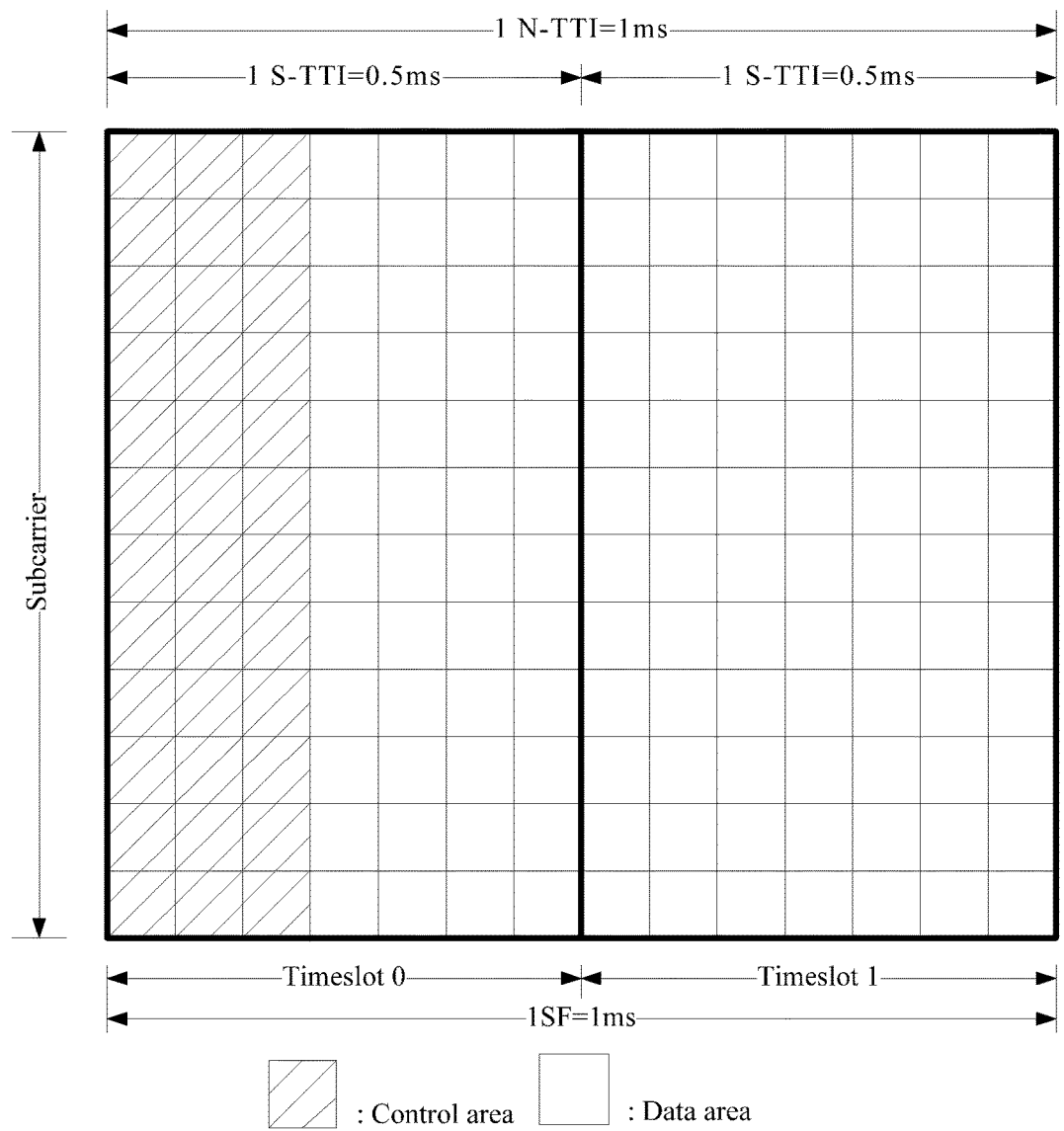
FIG. 2 is a schematic structural diagram of a transmission time interval TTI provided in the background.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Various technologies described herein may be used in a Long Term Evolution (LTE, Long Term Evolution) system and another communications system of this type.

Various aspects are described in this specification with reference to a terminal and/or a base station and/or a base station controller.

User equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be called a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User device), or user equipment (User Equipment).

The base station (for example, an access point) may refer to a device in communication with a wireless terminal via one or more sectors at an air interface in an access network. The base station may be configured to mutually convert a received over-the-air frame and an IP packet and serve as a router between the wireless terminal and other parts of the access network. The other parts of the access network may include an Internet protocol (IP) network. The base station may coordinate attribute management of the air interface. For example, the base station may be an evolved node B (NodeB or eNB or e-NodeB, evolved Node B) in the LTE, but the present invention is not limited thereto.

Figure 3A:
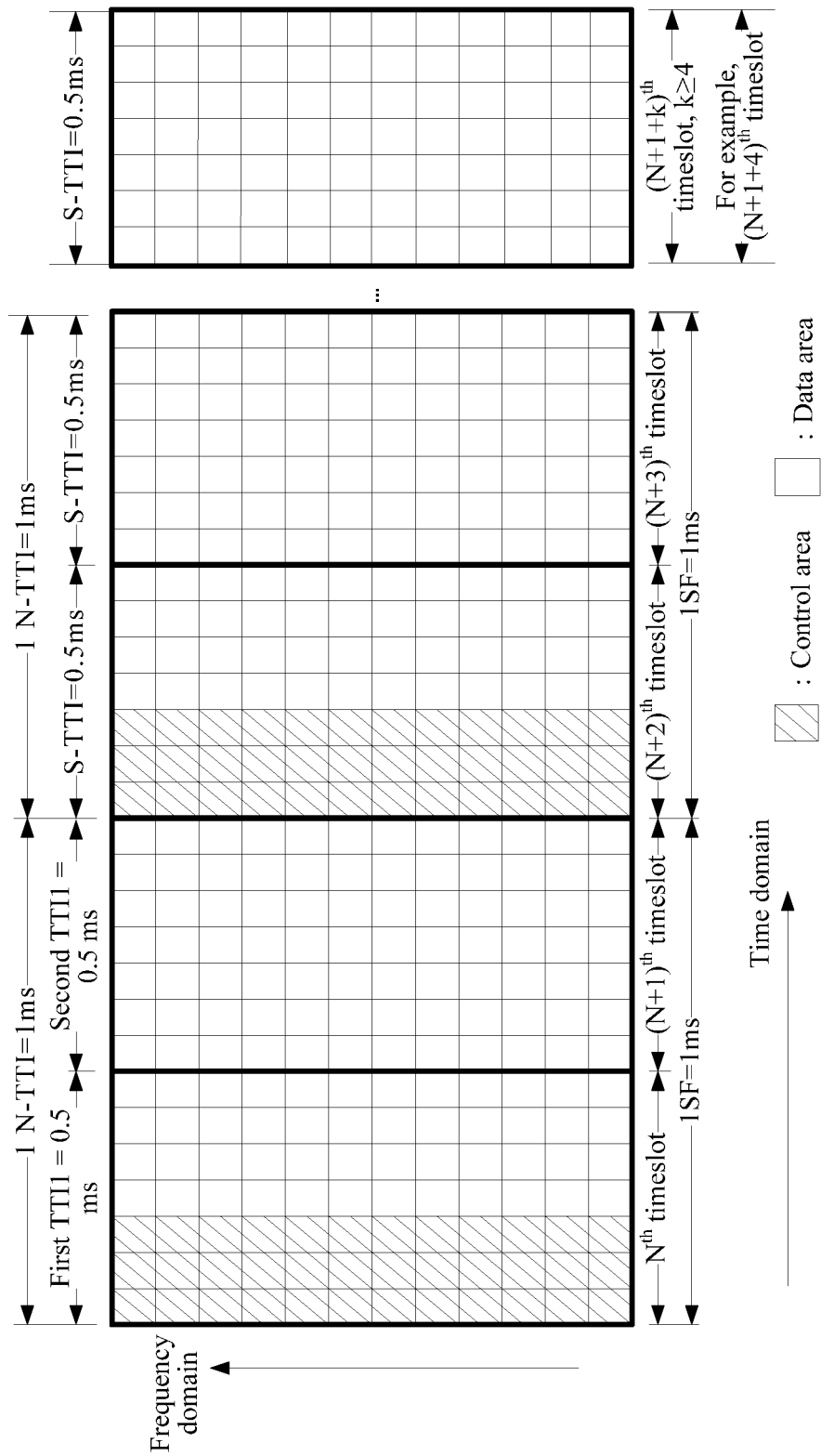
FIG. 3a is a schematic structural diagram of a transmission time interval TTI according to an embodiment of the present invention.
Figure 3B:
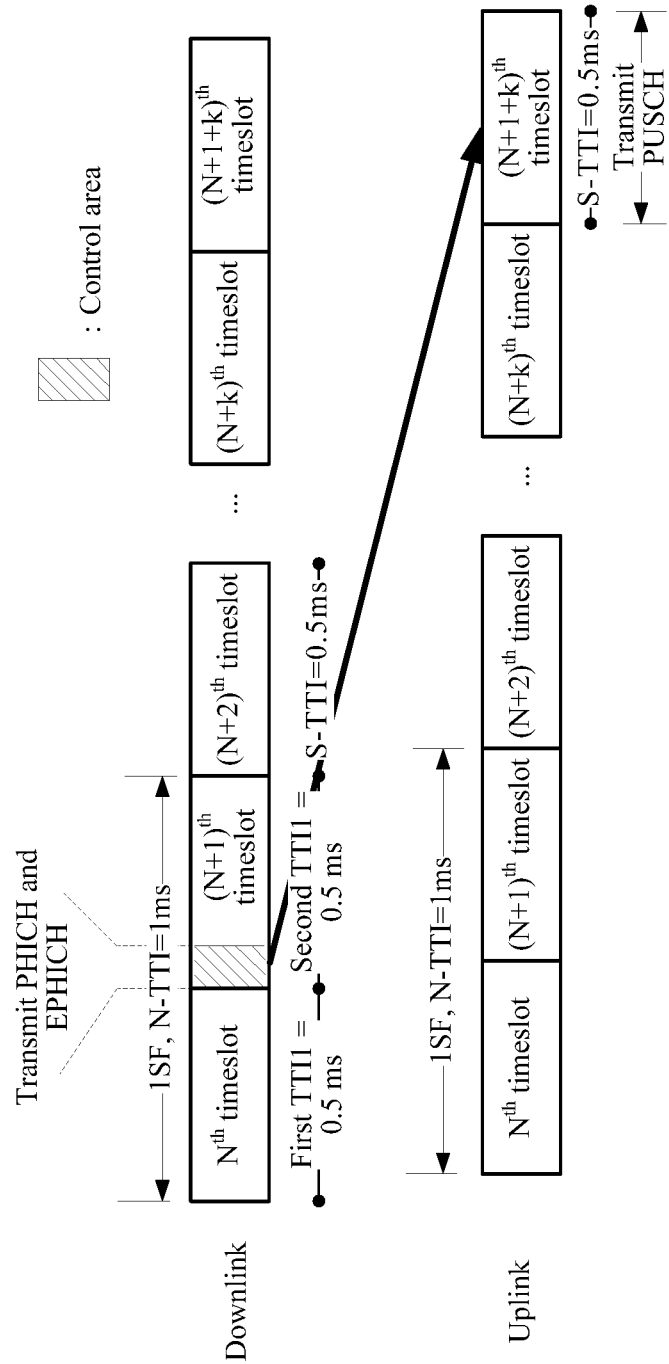
FIG. 3b is a schematic structural diagram of another transmission time interval TTI according to an embodiment of the present invention.

As shown in FIG. 3a or FIG. 3b, in an embodiment of the present invention, one original normal transmission time interval (Transmission Time Interval, TTI) (N-TTI for short, the N-TTI=1 ms) is divided into two shortened TTIs (S-TTI for short, the S-TTI=0.5 ms: a first TTI and a second TTI. One subframe (SubFrame, SF) includes two timeslots (Timeslot): an $N^{th}$ timeslot and an $(N+1)^{th}$ timeslot. The first TTI corresponds to the $N^{th}$ timeslot, and the second TTI corresponds to the $(N+1)^{th}$ timeslot. That is, the first TTI and the second TTI respectively are S-TTIs that belong to a same SF. The first TTI=0.5 ms, and the second TTI=0.5 ms.

Figure 4:
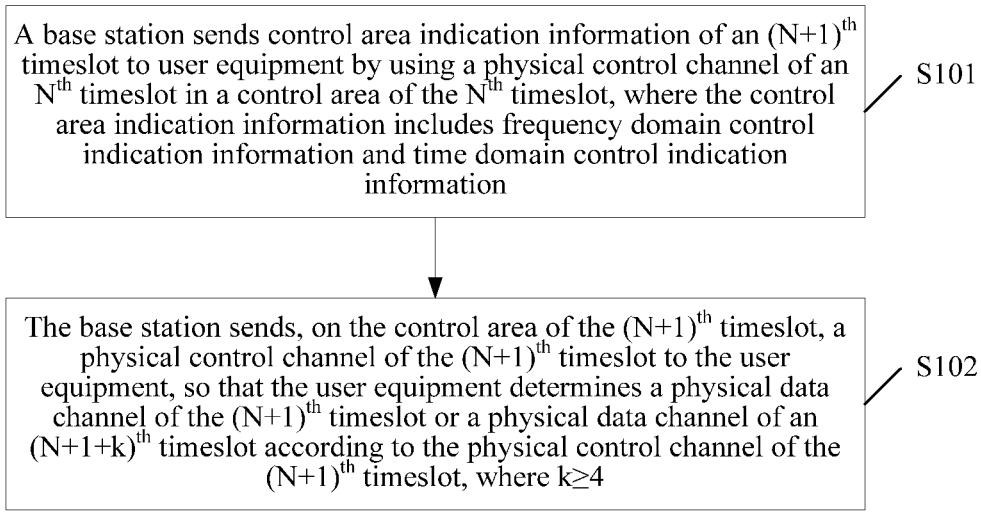
FIG. 4 is a flowchart of a method for transmitting a downlink control channel according to an embodiment of the present invention.

An embodiment of the present invention provides a method for transmitting a downlink control channel. In the method for transmitting a downlink control channel, as shown in FIG. 3a or FIG. 3b, a subframe includes an $N^{th}$ timeslot and an $(N+1)^{th}$ timeslot, the $N^{th}$ timeslot corresponds to a first TTI, and the $(N+1)^{th}$ timeslot corresponds to a second TTI. As shown in FIG. 4, the method for transmitting a downlink control channel includes:

S101: A base station sends control area indication information of the $(N+1)^{th}$ timeslot to user equipment by using a physical control channel of the $N^{th}$ timeslot in a control area of the $N^{th}$ timeslot, where the control area indication information includes frequency domain control indication information and time domain control indication information.

The frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot. The control area of the $(N+1)^{th}$ timeslot is used to transmit a physical control channel of the $(N+1)^{th}$ timeslot. For example, the physical control channel of the $N^{th}$ timeslot is a physical downlink control channel (Physical downlink Control Channel, PDCCH) of the $N^{th}$ timeslot; or the physical control channel of the $N^{th}$ timeslot includes: a PDCCH of the $N^{th}$ timeslot and a physical control format indicator channel (Physical Control Format Indicator Channel, PCFICH) of the $N^{th}$ timeslot.

It should be noted that, in this embodiment, N is a positive integer greater than or equal to zero. One subframe includes two timeslots, that is, the $N^{th}$ timeslot and the $(N+1)^{th}$ timeslot are two timeslots in a same subframe. "ns mod 2" operation may be performed on a timeslot number ns of each timeslot. In this way, two timeslots in each subframe may be respectively set to a timeslot 0 and a timeslot 1. For example, a timeslot number ns of the $N^{th}$ timeslot=N, and a timeslot number ns of the $(N+1)^{th}$ timeslot=N+1. It is assumed that after the "ns mod 2=N mod 2=0" operation, the $N^{th}$ timeslot may be determined as the timeslot 0, and after the "ns mod 2=(N+1) mod 2=1" operation, the $N^{th}$ timeslot may be determined as the timeslot 1.

It should be noted that, in this embodiment, the control area of the $N^{th}$ timeslot (that is, a timeslot corresponding to the first TTI) is a control area of a 1-ms TTI (that is, an N-TTI) in the prior art. In the frequency domain resource block area, the control area of the 1-ms TTI occupies all RBs in a current carrier. A time domain time unit area of the control area of the 1-ms TTI is indicated according to a PCFICH channel of the control area of the 1-ms TTI, and may be one single-carrier frequency division multiple access (Signle-Carrier Frequency Division Multiple Access, SC-FDMA) symbol to three SC-FDMA symbols.

S102: The base station sends, in the control area of the $(N+1)^{th}$ timeslot, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4.

In this embodiment of the present invention, the frequency domain control indication information includes a start frequency domain resource block location of a frequency domain resource block area occupied by the control area of the $(N+1)^{th}$ timeslot in the $(N+1)^{th}$ timeslot and a length (Size) of a frequency domain resource block area occupied by the control area of the $(N+1)^{th}$ timeslot in the $(N+1)^{th}$ timeslot. A resource block (Resource Block, RB) or a resource block group (Resource Block Group, RBG) is used as a unit for the length of the frequency domain resource block area. The start frequency domain resource block location is an index number of an RB or an index number of an RBG.

In this embodiment of the present invention, the time domain control indication information is used to indicate a time domain time unit area occupied by the control area of the $(N+1)^{th}$ timeslot in the $(N+1)^{th}$ timeslot. The time domain time unit area may be duration for which a single-carrier frequency division multiple access SC-FDMA symbol is used as a unit, or duration for which a symbol that occupies a shorter time is used as a unit.

For example, the physical control channel of the $(N+1)^{th}$ timeslot may be a PDCCH of the $(N+1)^{th}$ timeslot; or, the physical control channel of the $(N+1)^{th}$ timeslot may be a physical HARQ indicator channel (Physical Hybrid ARQ Indicator Channel, PHICH) of the $(N+1)^{th}$ timeslot; or, the physical control channel of the $(N+1)^{th}$ timeslot may include a PDCCH of the $(N+1)^{th}$ timeslot and a PHICH of the $(N+1)^{th}$ timeslot. HARQ (Hybrid Automatic Repeat reQuest, Chinese: hybrid automatic repeat request).

For example, the physical data channel of the $(N+1)^{th}$ timeslot may be a physical downlink shared channel (Physical downlink Shared Channel, PDSCH) of the $(N+1)^{th}$ timeslot; or, the physical data channel of the $(N+1)^{th}$ timeslot may be a physical uplink shared channel (Physical uplink Shared Channel, PUSCH); or, the physical data channel of the $(N+1)^{th}$ timeslot may include a PDSCH of the $(N+1)^{th}$ timeslot and a PUSCH of the $(N+1)^{th}$ timeslot. The PDCCH of the $(N+1)^{th}$ timeslot carries control information used to demodulate the PDSCH of the $(N+1)^{th}$ timeslot, or carries repeat indication HARQ information used to indicate a PUSCH of a second timeslot. A PHICH of the $(N+1)^{th}$ timeslot is used to carry repeat indication HARQ information used to indicate the PUSCH of the $(N+1)^{th}$ timeslot.

Correspondingly, the physical data channel of the $(N+1+k)^{th}$ timeslot may be a PDSCH of the $(N+1+k)^{th}$ timeslot; or, the physical data channel of the $(N+1+k)^{th}$ timeslot may be a PUSCH of the $(N+1+k)^{th}$ timeslot; or, the physical data channel of the $(N+1+k)^{th}$ timeslot may include a PDSCH of the $(N+1+k)^{th}$ timeslot and a PUSCH of the $(N+1+k)^{th}$ timeslot, where k is an integer greater than or equal to 4.

As shown in FIG. 3a, the PDCCH of the $(N+1)^{th}$ timeslot may carry control information used to indicate the PDSCH of the $(N+1+k)^{th}$ timeslot; or, the PDCCH of the $(N+1)^{th}$ timeslot may carry repeat indication HARQ information used to indicate the PUSCH of the $(N+1+k)^{th}$ timeslot. As shown in FIG. 3b, the PHICH of the $(N+1+k)^{th}$ timeslot may be used to carry repeat indication HARQ information used to indicate the PUSCH of the $(N+1+k)^{th}$ timeslot. For example, as shown in FIG. 3a or FIG. 3b, the $(N+1+k)^{th}$ timeslot is a $k^{th}$ S-TTI that starts from a next N-TTI of an N-TTI at which the $(N+1)^{th}$ timeslot is located, where k is an integer greater than or equal to 4.

For the method for transmitting a downlink control channel according to this embodiment of the present invention, compared with the prior art, in this solution, a base station may send control area indication information of an $(N+1)^{th}$ timeslot to user equipment by using a physical control channel of an $N^{th}$ timeslot in a control area of the $N^{th}$ timeslot, where the control area indication information of the $(N+1)^{th}$ timeslot is used to indicate a time domain resource and a frequency domain resource that are occupied by a control area of the $(N+1)^{th}$ timeslot in the $(N+1)^{th}$ timeslot, that is, the control area of the $N^{th}$ timeslot is used to indicate, to the user equipment, the time domain resource and the frequency domain resource that are occupied by the control area of the $(N+1)^{th}$ timeslot in the $(N+1)^{th}$ timeslot, and then send, in the control area indicated by the control area indication information of the $(N+1)^{th}$ timeslot, a physical control channel of the $(N+1)^{th}$ timeslot to the user equipment. That is, the base station may indicate, to the user equipment, the control area of the $(N+1)^{th}$ timeslot (a timeslot corresponding to an S-TTI-1), and may further send the physical control channel of the $(N+1)^{th}$ timeslot to the user equipment by using the control area of the $(N+1)^{th}$ timeslot, so that a physical data channel of the $(N+1)^{th}$ timeslot can be transmitted.

Figure 5:
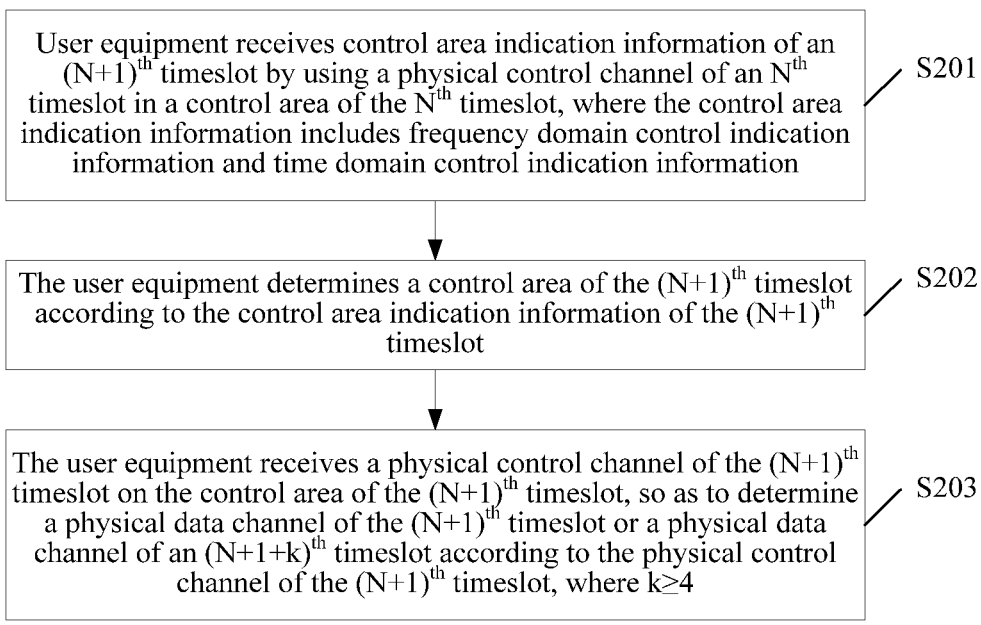
FIG. 5 is a flowchart of a method for transmitting a downlink control channel according to an embodiment of the present invention.

An embodiment of the present invention provides a method for transmitting a downlink control channel. In the method for transmitting a downlink control channel, as shown in FIG. 3a or FIG. 3b, a subframe includes an $N^{th}$ timeslot and an $(N+1)^{th}$ timeslot, the $N^{th}$ timeslot corresponds to a first TTI, and the $(N+1)^{th}$ timeslot corresponds to a second TTI. As shown in FIG. 5, the method for transmitting a downlink control channel includes:

S201: User equipment receives control area indication information of the $(N+1)^{th}$ timeslot by using a physical control channel of the $N^{th}$ timeslot in a control area of the $N^{th}$ timeslot, where the control area indication information includes frequency domain control indication information and time domain control indication information.

S202: The user equipment determines a control area of the $(N+1)^{th}$ timeslot according to the control area indication information of the $(N+1)^{th}$ timeslot.

The control area indication information of the $(N+1)^{th}$ timeslot includes the frequency domain control indication information and the time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot. Therefore, the user equipment may determine the control area of the $(N+1)^{th}$ timeslot according to indications of the frequency domain control indication information and the time domain control indication information.

S203: The user equipment receives a physical control channel of the $(N+1)^{th}$ timeslot in the control area of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where k≥4.

It should be noted that, for specific content of the physical control channel of the $N^{th}$ timeslot, the physical control channel of the $(N+1)^{th}$ timeslot, the physical data channel of the $(N+1)^{th}$ timeslot, and the physical data channel of the $(N+1+k)^{th}$ timeslot (k≥4) in this embodiment, reference may be made to related description in another embodiment of the present invention, and details are no longer described here in this embodiment.

It should be noted that, for specific description of the $N^{th}$ timeslot, the $(N+1)^{th}$ timeslot, and N in this embodiment of the present invention, reference may be made to related content in another embodiment of the present invention, and details are no longer described here in this embodiment.

It should be noted that, for specific content of the frequency domain resource block area and the time domain time unit area of the $(N+1)^{th}$ timeslot in this embodiment, reference may be made to related description in another embodiment of the present invention, and details are no longer described here in this embodiment.

For the method for transmitting a downlink control channel according to this embodiment of the present invention, compared with the prior art, in this solution, user equipment may determine, from a control area of an $N^{th}$ timeslot, a time domain resource and a frequency domain resource that are occupied in a control area of an $(N+1)^{th}$ timeslot in the $(N+1)^{th}$ timeslot, and receive, on the determined time domain resource and frequency domain resource, a physical control channel of the $(N+1)^{th}$ timeslot. That is, the user equipment may determine the control area of the $(N+1)^{th}$ timeslot (a timeslot corresponding to an S-TTI-1) according to an indication of a base station, and may receive the physical control channel of the $(N+1)^{th}$ timeslot sent, by using the control area of the $(N+1)^{th}$ timeslot, by the base station, so that a physical data channel of the $(N+1)^{th}$ timeslot can be transmitted.

Figure 6:
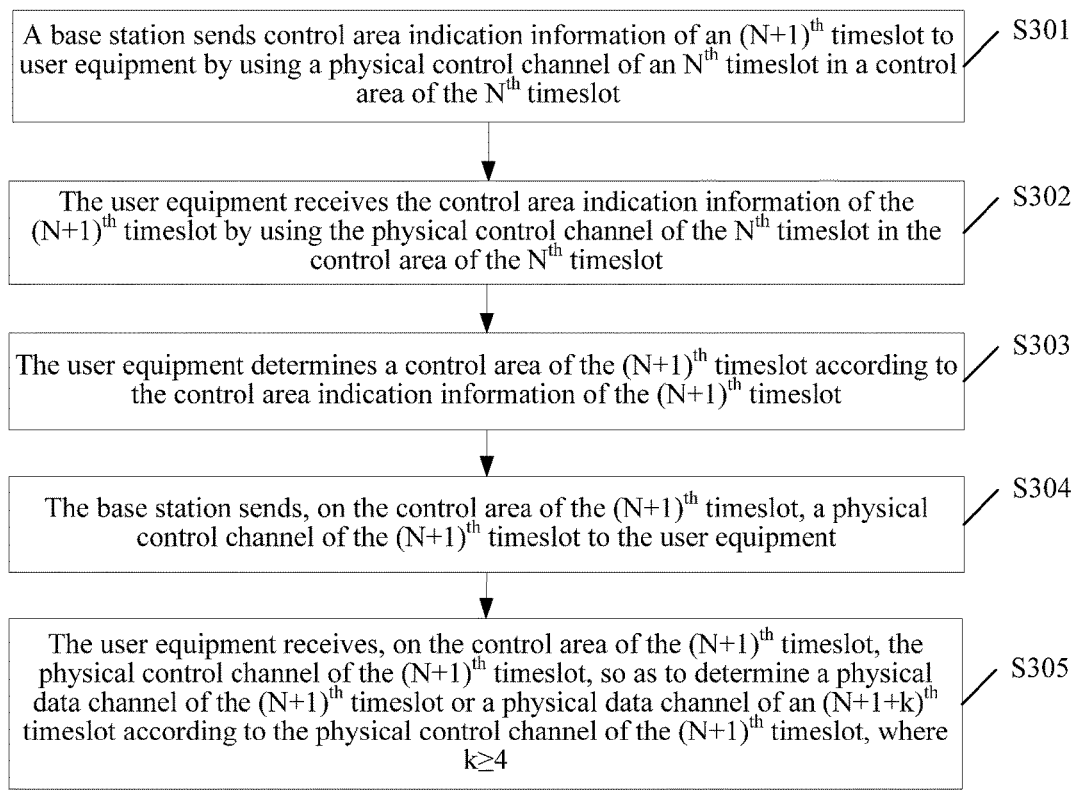
FIG. 6 is a flowchart of a method for transmitting a downlink control channel according to an embodiment of the present invention.

An embodiment of the present invention provides a method for transmitting a downlink control channel. In the method for transmitting a downlink control channel, as shown in FIG. 3a or FIG. 3b, a subframe includes an $N^{th}$ timeslot and an $(N+1)^{th}$ timeslot, the $N^{th}$ timeslot corresponds to a first TTI, and the $(N+1)^{th}$ timeslot corresponds to a second TTI. As shown in FIG. 6, the method for transmitting a downlink control channel includes:

S301: A base station sends control area indication information of the $(N+1)^{th}$ timeslot to user equipment by using a physical control channel of the $N^{th}$ timeslot in a control area of the $N^{th}$ timeslot.

S302: The user equipment receives the control area indication information of the $(N+1)^{th}$ timeslot by using the physical control channel of the $N^{th}$ timeslot in the control area of the $N^{th}$ timeslot.

S303: The user equipment determines a control area of the $(N+1)^{th}$ timeslot according to the control area indication information of the $(N+1)^{th}$ timeslot.

S304: The base station sends, in the control area of the $(N+1)^{th}$ timeslot, a physical control channel of the $(N+1)^{th}$ timeslot to the user equipment.

S305: The user equipment receives, in the control area of the $(N+1)^{th}$ timeslot, the physical control channel of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where $k \geq 4$.

Optionally, in a first application scenario of this embodiment, the physical control channel of the $N^{th}$ timeslot may be a PDCCH of the $N^{th}$ timeslot.

Figure 7:
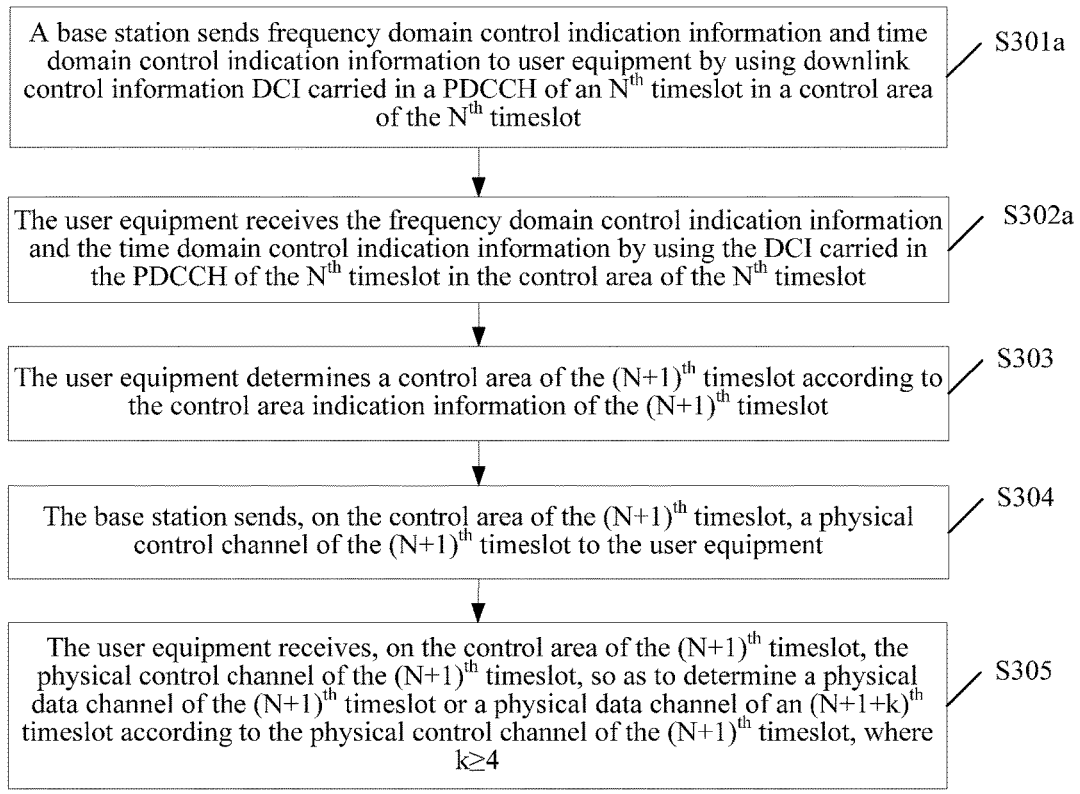
FIG. 7 is a flowchart of a method for transmitting a downlink control channel according to an embodiment of the present invention.

In the first application scenario, as shown in FIG. 7, S301 may be replaced with S301a, and S302 may be replaced with S302a:

S301a: The base station sends frequency domain control indication information and time domain control indication information to the user equipment by using downlink control indicator DCI carried in a PDCCH of the $N^{th}$ timeslot in the control area of the $N^{th}$ timeslot.

The frequency domain control indication information includes a start frequency domain resource block location of a frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, where an RB or an RBG is used as a unit for the length of the frequency domain resource block area.

Figure 10A:
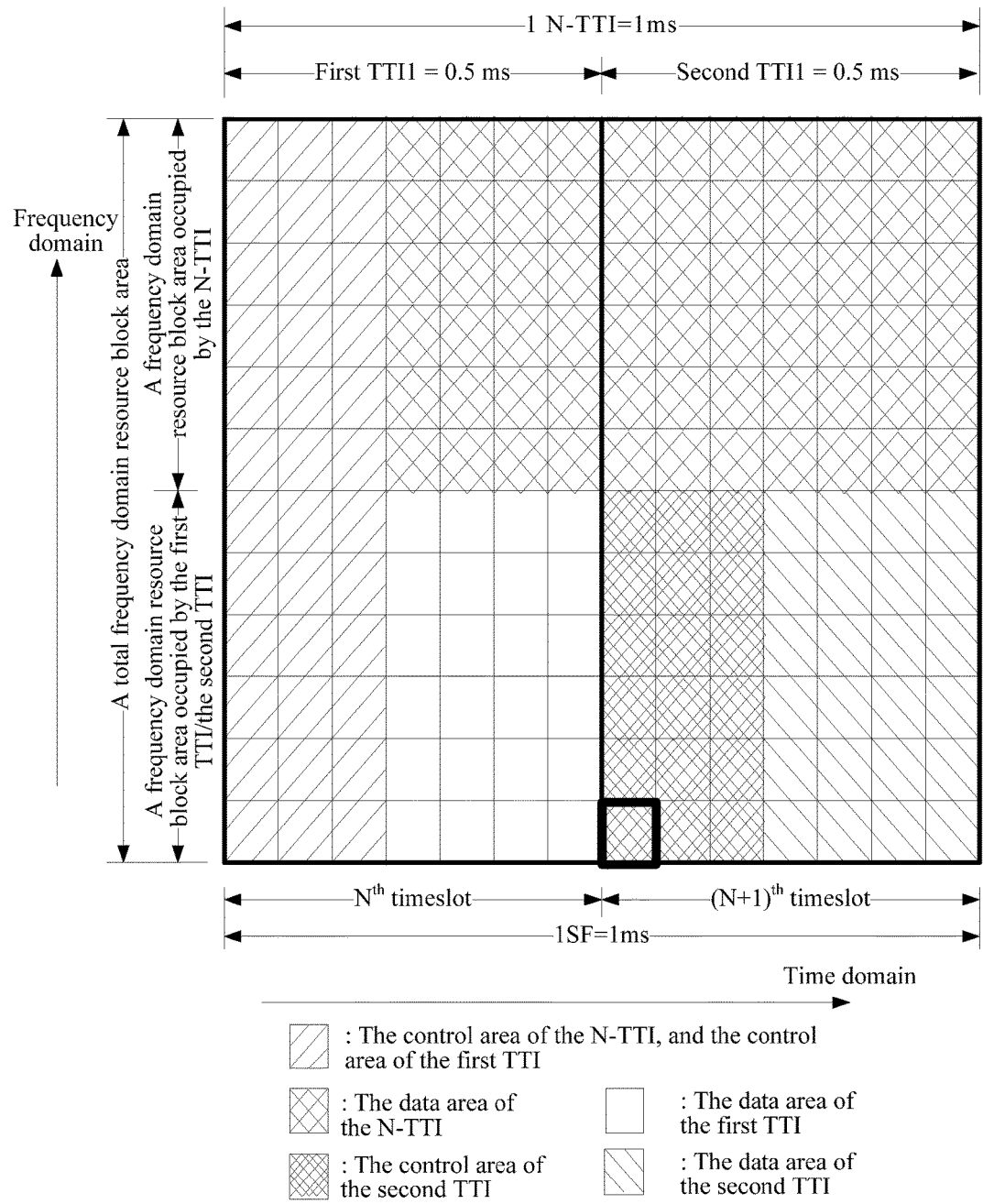
FIG. 10a is a schematic structural diagram of a transmission time interval TTI according to an embodiment of the present invention.

For example, it is assumed that an RB is used as a unit for the length of the frequency domain resource block area. As shown in FIG. 10a, one cell in a frequency domain in FIG. 10a is used as an RB, so that the frequency domain control indication information indicates that the start frequency domain resource block location of the frequency domain resource block area occupied by the control area of the $(N+1)^{th}$ timeslot in the $(N+1)^{th}$ timeslot may be an RB represented by a bold cell. The length of the frequency domain resource block area occupied by the control area of the $(N+1)^{th}$ timeslot in the $(N+1)^{th}$ timeslot may be have six RBs (that is, six cells). A time domain time unit area occupied by the control area of the $(N+1)^{th}$ timeslot in the $(N+1)^{th}$ timeslot is a time domain time of three SC-FDMA symbols represented by three cells in a time domain shown in FIG. 10a.

S302a: The user equipment receives frequency domain control indication information and time domain control indication information by using a (Downlink Control Indicator, DCI) carried in a PDCCH of the $N^{th}$ timeslot in the control area of the $N^{th}$ timeslot.

It should be noted that, in the first application scenario, the base station may send the frequency domain control indication information and the time domain control indication information to the user equipment by using the DCI carried in the PDCCH of the $N^{th}$ timeslot in the control area of the $N^{th}$ timeslot.

Optionally, in a second application scenario of this embodiment, the physical control channel of the $N^{th}$ timeslot may include: a PDCCH of the $N^{th}$ timeslot and a physical control format indicator channel (Physical Control Format Indicator Channel, PCFICH) of the $N^{th}$ timeslot.

Figure 8:
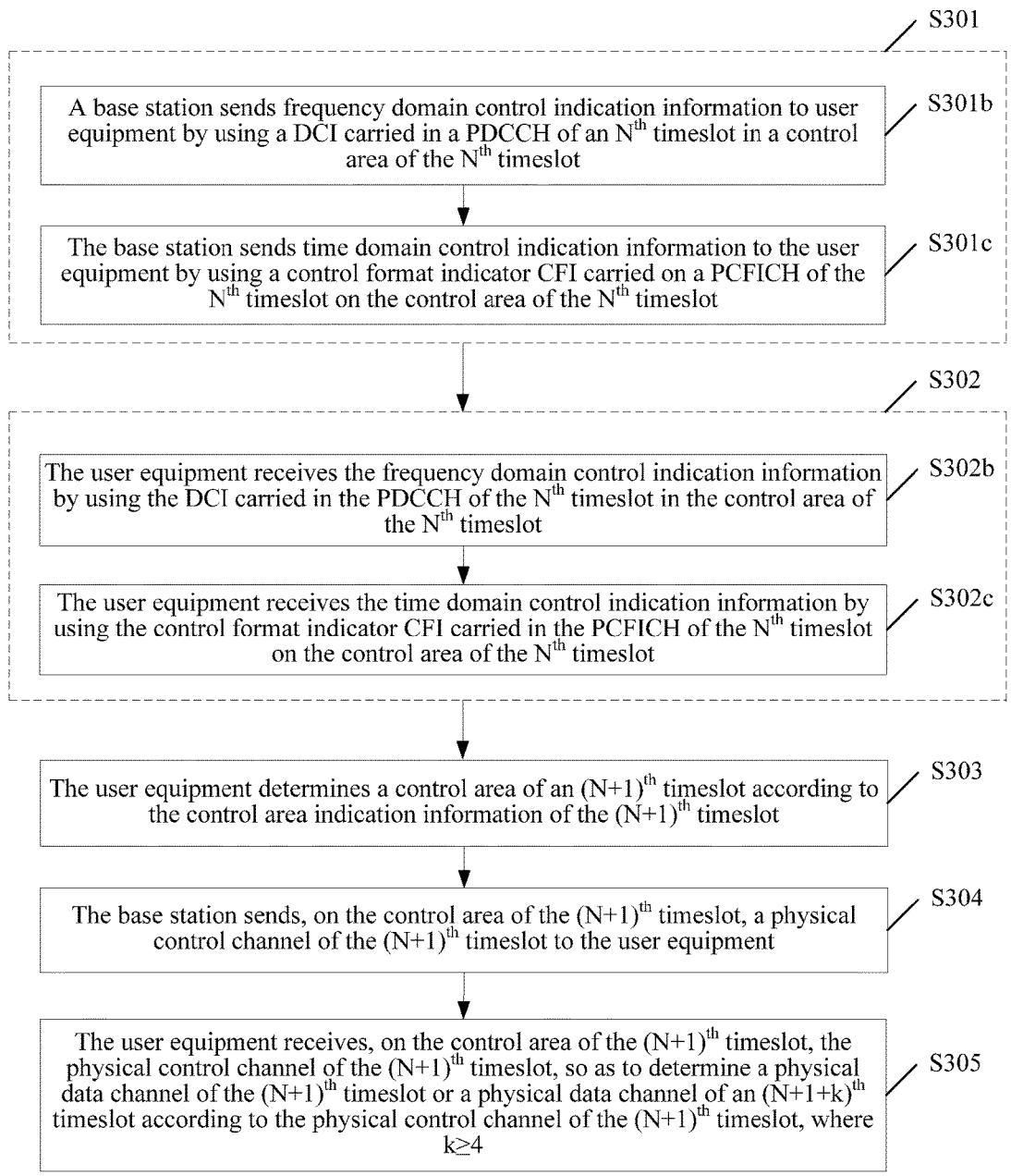
FIG. 8 is a flowchart of a method for transmitting a downlink control channel according to an embodiment of the present invention.

In the second application scenario, as shown in FIG. 8, S301 may include S301b and S301c, and S302 may include S302b and S302c:

S301b: The base station sends frequency domain control indication information to the user equipment by using a DCI carried in a PDCCH of the $N^{th}$ timeslot in the control area of the $N^{th}$ timeslot.

S301c: The base station sends time domain control indication information to the user equipment by using a control format indicator CFI carried in a PCFICH of the $N^{th}$ timeslot in the control area of the $N^{th}$ timeslot.

The CFI carried in the PCFICH of the $N^{th}$ timeslot includes indication information indicating a time domain time unit area occupied by the control area of the $N^{th}$ timeslot in the $N^{th}$ timeslot, and the time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot.

For example, a time domain time unit occupied by the control area of the $N^{th}$ timeslot in the $N^{th}$ timeslot is a time domain time from an SC-FDMA symbol index 0 to an SC-FDMA symbol index 2 represented by three cells in a time domain shown in FIG. 10a. In this case, the time domain time unit area occupied by the control area of the $(N+1)^{th}$ timeslot in the $(N+1)^{th}$ timeslot is also the time domain time from the SC-FDMA symbol index 0 to the SC-FDMA symbol index 2 represented by three cells in the time domain shown in FIG. 10a.

S302b: The user equipment receives frequency domain control indication information by using a DCI carried in a PDCCH of the $N^{th}$ timeslot in the control area of the $N^{th}$ timeslot.

S302c: The user equipment receives time domain control indication information by using a control format indicator (Control Format Indicator, CFI) carried in a PCFICH of the $N^{th}$ timeslot in the control area of the $N^{th}$ timeslot.

It should be noted that, in the second application scenario, the base station may send the frequency domain control indication information to the user equipment by using the DCI carried in the PDCCH of the $N^{th}$ timeslot in the control area of the $N^{th}$ timeslot, and send the time domain control indication information to the user equipment by using the CFI carried in the PCFICH of the $N^{th}$ timeslot in the control area of the $N^{th}$ timeslot.

Optionally, in a third application scenario of this embodiment, the physical control channel of the $N^{th}$ timeslot may include: a PDCCH of the $N^{th}$ timeslot and a PCFICH of the $N^{th}$ timeslot.

Figure 9:
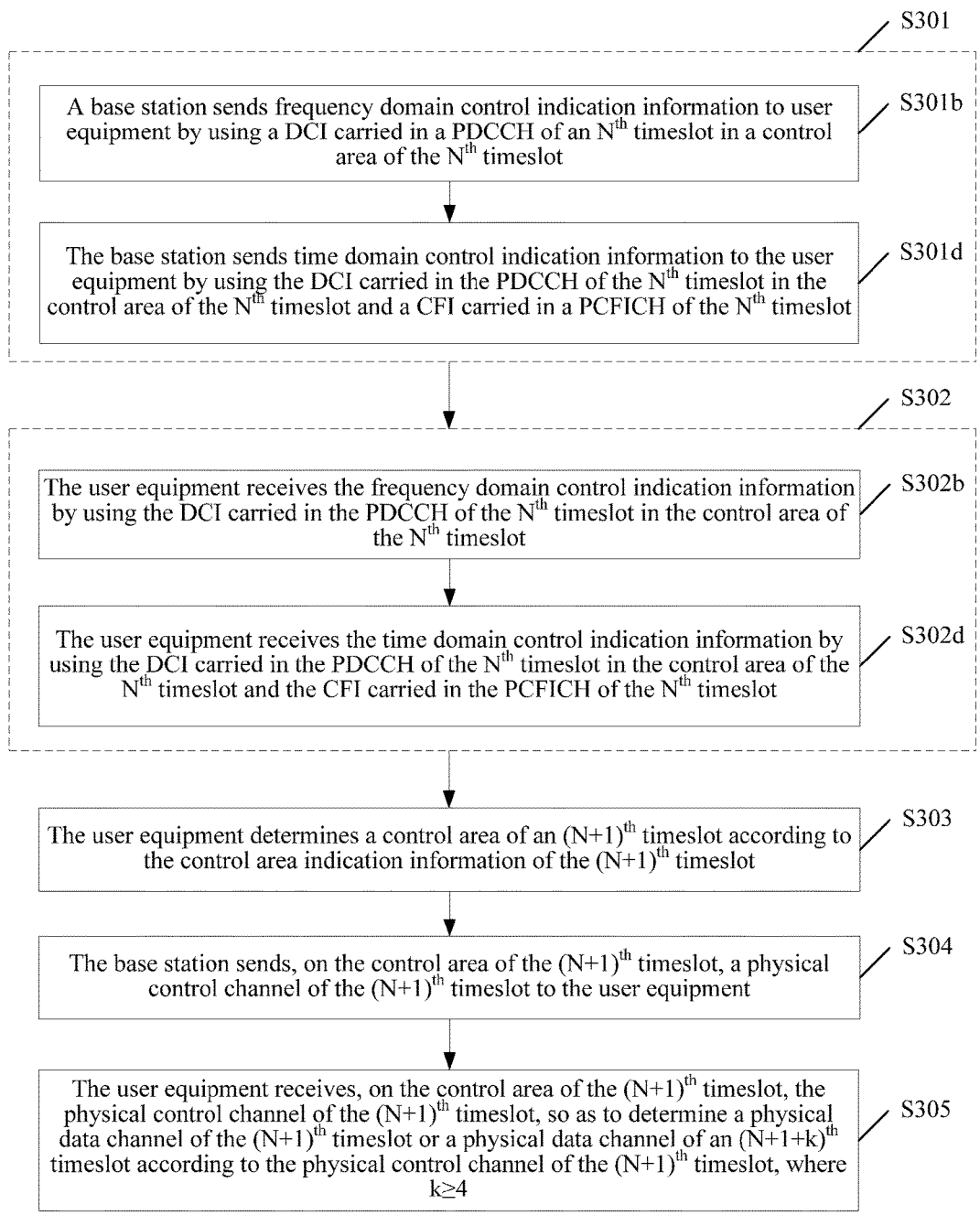
FIG. 9 is a flowchart of a method for transmitting a downlink control channel according to an embodiment of the present invention.

In the third application scenario, as shown in FIG. 9, S301 may include S301b and S301d, and S302 may include S302b and S302d:

S301b: The base station sends frequency domain control indication information to the user equipment by using a DCI carried in a PDCCH of the $N^{th}$ timeslot in the control area of the $N^{th}$ timeslot.

S301d: The base station sends time domain control indication information to the user equipment by using the DCI carried in the PDCCH of the $N^{th}$ timeslot in the control area of the $N^{th}$ timeslot and a CFI carried in a PCFICH of the $N^{th}$ timeslot.

The CFI carried in the PCFICH of the $N^{th}$ timeslot includes indication information indicating a time domain time unit area occupied by the control area of the $N^{th}$ timeslot in the $N^{th}$ timeslot, and a reference time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot.

Figure 10B:
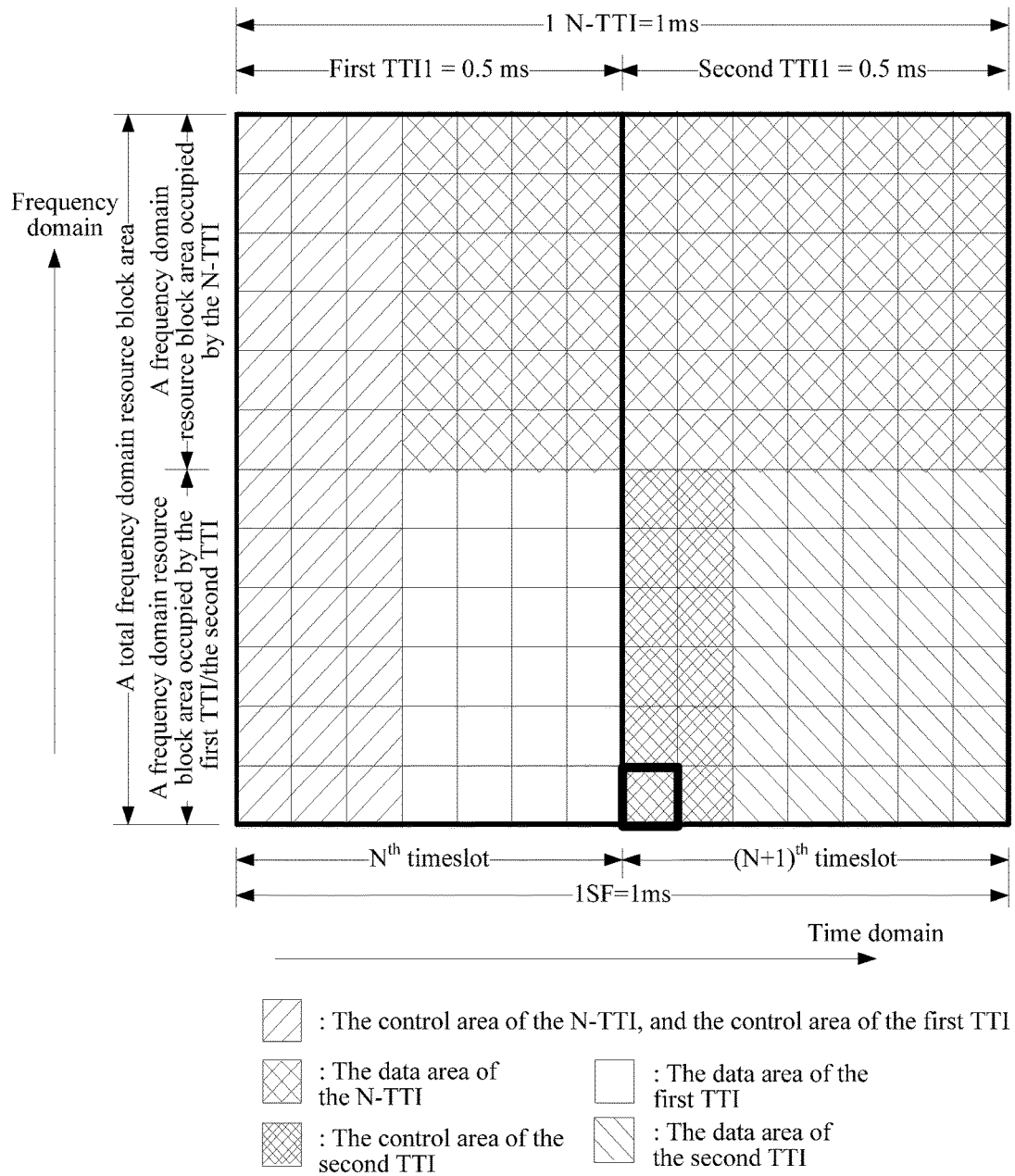
FIG. 10b is a schematic structural diagram of a transmission time interval TTI according to an embodiment of the present invention.

It should be noted that, it is assumed that one cell in a time domain shown in FIG. 10b is used as a unit time of the time domain time unit area. The time domain time unit area occupied by the control area of the $(N+1)^{th}$ timeslot in the $(N+1)^{th}$ timeslot may fluctuate by one or more cells on the basis of the time domain time unit area occupied by the control area of the $N^{th}$ timeslot in the $N^{th}$ timeslot, that is, the reference time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot. Therefore, the time domain time unit area occupied by the control area of the $(N+1)^{th}$ timeslot in the $(N+1)^{th}$ timeslot may fluctuate by one or more cells in the reference time domain time unit area occupied by the control area of the $(N+1)^{th}$ timeslot in the $(N+1)^{th}$ timeslot, where a start location of the time domain time unit area occupied by the control area of the $(N+1)^{th}$ timeslot is the first symbol of this $(N+1)^{th}$ timeslot.

For example, as shown in FIG. 10b, a time domain time unit occupied by the control area of the $N^{th}$ timeslot in the $N^{th}$ timeslot is a time domain time from an SC-FDMA symbol index 0 to an SC-FDMA symbol index 2 represented by three cells in a time domain shown in FIG. 10a, that is, the reference time domain time unit area occupied by the control area of the $(N+1)^{th}$ timeslot in the $(N+1)^{th}$ timeslot is the time domain time from the SC-FDMA symbol index 0 to the SC-FDMA symbol index 2 represented by three cells in the time domain shown in FIG. 10a. The time domain time unit area occupied by the control area of the $(N+1)^{th}$ timeslot in the $(N+1)^{th}$ timeslot may have one or more cells fewer than the reference time domain time unit area occupied by the control area of the $(N+1)^{th}$ timeslot in the $(N+1)^{th}$ timeslot, or may have one or more cells more than the reference time domain time unit area occupied by the control area of the $(N+1)^{th}$ timeslot in the $(N+1)^{th}$ timeslot. As shown in FIG. 10b, the time domain time unit area occupied by the control area of the $(N+1)^{th}$ timeslot in the $(N+1)^{th}$ timeslot has one cell fewer than the reference time domain time unit area occupied by the control area of the $(N+1)^{th}$ timeslot in the $(N+1)^{th}$ timeslot, that is, the time domain time unit area occupied by the control area of the $(N+1)^{th}$ timeslot in the $(N+1)^{th}$ timeslot is a time domain time from the SC-FDMA symbol index 0 to the SC-FDMA symbol index 1 represented by two cells in a time domain shown in FIG. 10b.

The DCI carried in the PDCCH of the $N^{th}$ timeslot includes time unit area offset indication information of the control area of the $(N+1)^{th}$ timeslot. The time unit area offset indication information of the control area of the $(N+1)^{th}$ timeslot may be indication information having 1 bit or multiple bits. 1-bit information is used as an example. When the time unit area offset indication information of the control area of the $(N+1)^{th}$ timeslot having one bit is 0, the time unit area offset indication information is used to indicate that the time domain time unit area occupied by the control area of the $(N+1)^{th}$ timeslot in the $(N+1)^{th}$ timeslot has one cell fewer than the reference time domain time unit area occupied by the control area of the $(N+1)^{th}$ timeslot in the $(N+1)^{th}$ timeslot; or, when the time unit area offset indication information of the control area of the $(N+1)^{th}$ timeslot having one bit is 1, the time unit area offset indication information is used to indicate that the time domain time unit area occupied by the control area of the $(N+1)^{th}$ timeslot in the $(N+1)^{th}$ timeslot has one cell more than the reference time domain time unit area occupied by the control area of the $(N+1)^{th}$ timeslot in the $(N+1)^{th}$ timeslot.

For example, in the following, the time unit area offset indication information (offset indication information for short) of the control area of the $(N+1)^{th}$ timeslot is 2-bit information and 3-bit information are used as examples to describe a relationship between "the time domain time unit area occupied by the control area of the $(N+1)^{th}$ timeslot in the $(N+1)^{th}$ timeslot" and "the reference time domain time unit area occupied by the control area of the $(N+1)^{th}$ timeslot in the $(N+1)^{th}$ timeslot".

When the offset indication information is 2-bit information, the offset indication information may be any one of 00, 01, 10 or 11. In the following, the relationship between "the time domain time unit area occupied by the control area of the $(N+1)^{th}$ timeslot in the $(N+1)^{th}$ timeslot" and "the reference time domain time unit area occupied by the control area of the $(N+1)^{th}$ timeslot in the $(N+1)^{th}$ timeslot" that is indicated when the offset indication information is respectively 00, 01, 10, or 11 is given in a manner of a table (Table 1):

TABLE 1

| Offset indication information having 2 bits | Meaning of the offset indication information having 2 bits |
| --- | --- |
| 00 | "the time domain time unit area occupied by the control area of the $(N + 1)^{th}$ timeslot in the $(N + 1)^{th}$ timeslot" is the same as "the reference time domain time unit area occupied by the control area of the $(N + 1)^{th}$ timeslot in the $(N + 1)^{th}$ timeslot" |
| 01 | "the time domain time unit area occupied by the control area of the $(N + 1)^{th}$ timeslot in the $(N + 1)^{th}$ timeslot" has one cell fewer than "the reference time domain time unit area occupied by the control area of the $(N + 1)^{th}$ timeslot in the $(N + 1)^{th}$ timeslot" |
| 10 | "the time domain time unit area occupied by the control area of the $(N + 1)^{th}$ timeslot in the $(N + 1)^{th}$ timeslot" has one cell more than "the reference time domain time unit area occupied by the control area of the $(N + 1)^{th}$ timeslot in the $(N + 1)^{th}$ timeslot" |
| 11 | "the time domain time unit area occupied by the control area of the $(N + 1)^{th}$ timeslot in the $(N + 1)^{th}$ timeslot" has two cells more than "the reference time domain time unit area occupied by the control area of the $(N + 1)^{th}$ timeslot in the $(N + 1)^{th}$ timeslot" |

When the offset indication information is 3-bit information, the offset indication information may be any one of 000, 001, 010, 011, 100, 101, 110 or 111. In the following, the relationship between "the time domain time unit area occupied by the control area of the $(N+1)^{th}$ timeslot in the $(N+1)^{th}$ timeslot" and "the reference time domain time unit area occupied by the control area of the $(N+1)^{th}$ timeslot in the $(N+1)^{th}$ timeslot" that is indicated when the offset indication information is respectively 000, 001, 010, 011, 100, 101, 110 or 111 is given in a manner of a table (Table 2):

TABLE 2

| Offset indication information having 3 bits | Meaning of the offset indication information having 3 bits |
|---|---|
| 000 | "the time domain time unit area occupied by the control area of the $(N + 1)^{th}$ timeslot in the $(N + 1)^{th}$ timeslot" is the same as "the reference time domain time unit area occupied by the control area of the $(N + 1)^{th}$ timeslot in the $(N + 1)^{th}$ timeslot" |
| 001 | "the time domain time unit area occupied by the control area of the $(N + 1)^{th}$ timeslot in the $(N + 1)^{th}$ timeslot" has one cell fewer than "the reference time domain time unit area occupied by the control area of the $(N + 1)^{th}$ timeslot in the $(N + 1)^{th}$ timeslot" |
| 010 | "the time domain time unit area occupied by the control area of the $(N + 1)^{th}$ timeslot in the $(N + 1)^{th}$ timeslot" has two cells fewer than "the reference time domain time unit area occupied by the control area of the $(N + 1)^{th}$ timeslot in the $(N + 1)^{th}$ timeslot" |
| 011 | "the time domain time unit area occupied by the control area of the $(N + 1)^{th}$ timeslot in the $(N + 1)^{th}$ timeslot" has one cell more than "the reference time domain time unit area occupied by the control area of the $(N + 1)^{th}$ timeslot in the $(N + 1)^{th}$ timeslot" |
| 100 | "the time domain time unit area occupied by the control area of the $(N + 1)^{th}$ timeslot in the $(N + 1)^{th}$ timeslot" has two cells more than "the reference time domain time unit area occupied by the control area of the $(N + 1)^{th}$ timeslot in the $(N + 1)^{th}$ timeslot" |
| 101 | "the time domain time unit area occupied by the control area of the $(N + 1)^{th}$ timeslot in the $(N + 1)^{th}$ timeslot" has three cells more than "the reference time domain time unit area occupied by the control area of the $(N + 1)^{th}$ timeslot in the $(N + 1)^{th}$ timeslot" |
| 110 | "the time domain time unit area occupied by the control area of the $(N + 1)^{th}$ timeslot in the $(N + 1)^{th}$ timeslot" has four cells more than "the reference time domain time unit area occupied by the control area of the $(N + 1)^{th}$ timeslot in the $(N + 1)^{th}$ timeslot" |
| 111 | "the time domain time unit area occupied by the control area of the $(N + 1)^{th}$ timeslot in the $(N + 1)^{th}$ timeslot" includes an SC-FDMA symbol index 0 to an SC-FDMA symbol index 7 |

S302b: The user equipment receives frequency domain control indication information by using a DCI carried in a PDCCH of the $N^{th}$ timeslot in the control area of the $N^{th}$ timeslot.

S302d: The user equipment receives time domain control indication information by using the DCI carried in the PDCCH of the $N^{th}$ timeslot in the control area of the $N^{th}$ timeslot and a CFI carried in a PCFICH of the $N^{th}$ timeslot.

Because the reference time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot, after the user equipment receives, by using the CFI carried in the PCFICH of the $N^{th}$ timeslot, indication information of the time domain time unit area occupied by the control area of the $N^{th}$ timeslot in the $N^{th}$ timeslot, the reference time domain time unit area occupied by the control area of the $(N+1)^{th}$ timeslot in the $(N+1)^{th}$ timeslot (a time domain time represented by three cells in a time domain shown in FIG. 10b) may be determined. The user equipment receives, by using the DCI carried in the PDCCH of the $N^{th}$ timeslot in the control area of the $N^{th}$ timeslot, the time unit area offset indication information (assumed to be "0") of the control area of the $(N+1)^{th}$ timeslot. The user equipment may determine, according to the reference time domain time unit area occupied by the control area of the $(N+1)^{th}$ timeslot in the $(N+1)^{th}$ timeslot and the time unit area offset indication information of the control area of the $(N+1)^{th}$ timeslot, the time domain time unit area (a time domain time represented by two cells in a time domain shown in FIG. 10b) occupied by the control area of the $(N+1)^{th}$ timeslot in the $(N+1)^{th}$ timeslot.

In the foregoing three application scenarios, the base station may use a cell-radio network temporary identifier (Cell-Radio Network Temporary Identifier, C-RNTI) allocated to the user equipment, and send the frequency domain control indication information to the user equipment by using the DCI carried in the PDCCH of the $N^{th}$ timeslot in the control area of the $N^{th}$ timeslot.

Correspondingly, the user equipment may detect, from the control area of the $N^{th}$ timeslot by using the C-RNTI allocated by the base station to the user equipment, the PDCCH of the $N^{th}$ timeslot sent by the base station to the user equipment, to acquire the DCI carried in the PDCCH of the $N^{th}$ timeslot, and acquire the frequency domain control indication information from the DCI carried in the PDCCH of the $N^{th}$ timeslot.

Preferably, the base station may allocate one common Common C-RNTI to multiple user equipments, and send the frequency domain control indication information to the user equipments by using the Common C-RNTI and by using a downlink control indicator (Downlink Control Indicator, DCI) carried in the PDCCH of the $N^{th}$ timeslot.

Correspondingly, the user equipment may detect, from the control area of the $N^{th}$ timeslot by using the Common C-RNTI allocated by the base station, the PDCCH of the $N^{th}$ timeslot sent by the base station, to acquire the DCI carried in the PDCCH of the $N^{th}$ timeslot, and acquire the frequency domain control indication information from the DCI carried in the PDCCH of the $N^{th}$ timeslot.

It should be noted that, if the base station allocates one common C-RNTI to multiple user equipments, in this case, for user equipments of one 0.5-ms TTI, two C-RNTIs may be configured at the same time, where one is a dedicated C-RNTI, and the other is a common C-RNTI. The user equipments detect a first PDCCH of the $N^{th}$ timeslot by using the dedicated C-RNTI, where the first PDCCH carries indication information used to demodulate a PDSCH of the $N^{th}$ timeslot or repeat indication HARQ information used to indicate a PUSCH of a kth timeslot after the $N^{th}$ timeslot. At the same time, the user equipments detect a second PDCCH of the $N^{th}$ timeslot by using the common C-RNTI, where the second PDCCH carries the control area indication information of the $(N+1)^{th}$ timeslot described in this embodiment.

It should be noted that, for specific content of the physical control channel of the $(N+1)^{th}$ timeslot, the physical data channel of the $(N+1)^{th}$ timeslot, and the physical data channel of the $(N+1+k)^{th}$ timeslot (k≥4) in this embodiment, reference may be made to related description in another embodiment of the present invention, and details are no longer described here in this embodiment.

It should be noted that, for specific description of the $N^{th}$ timeslot, the $(N+1)^{th}$ timeslot, and N in this embodiment of the present invention, reference may be made to related content in another embodiment of the present invention, and details are no longer described here in this embodiment.

For the method for transmitting a downlink control channel according to this embodiment of the present invention, compared with the prior art, in this solution, a base station may send control area indication information of an $(N+1)^{th}$ timeslot to user equipment by using a physical control channel of an $N^{th}$ timeslot in a control area of the $N^{th}$ timeslot, where the control area indication information of the $(N+1)^{th}$ timeslot is used to indicate a time domain resource and a frequency domain resource that are occupied by a control area of the $(N+1)^{th}$ timeslot in the $(N+1)^{th}$ timeslot, that is, the control area of the $N^{th}$ timeslot is used to indicate, to the user equipment, the time domain resource and the frequency domain resource that are occupied by the control area of the $(N+1)^{th}$ timeslot in the $(N+1)^{th}$ timeslot, and then send, in the control area indicated by the control area indication information of the $(N+1)^{th}$ timeslot, a physical control channel of the $(N+1)^{th}$ timeslot to the user equipment. The user equipment may then determine, from the control area of the $N^{th}$ timeslot, the time domain resource and the frequency domain resource that are occupied by the control area of the $(N+1)^{th}$ timeslot in the $(N+1)^{th}$ timeslot, and receive the physical control channel of the $(N+1)^{th}$ timeslot on the determined time domain resource and frequency domain resource. That is, the base station may indicate, to the user equipment, the control area of the $(N+1)^{th}$ timeslot (a timeslot corresponding to an S-TTI-1), so that the physical control channel of the $(N+1)^{th}$ timeslot may be transmitted by using the control area of the $(N+1)^{th}$ timeslot, so as to transmit a physical data channel of the $(N+1)^{th}$ timeslot.

Moreover, in this solution, the control area of the $N^{th}$ timeslot (a timeslot corresponding to a first TTI, that is, a timeslot corresponding to an S-TTI-0) is a control area of an N-TTI, that is, the control area of the N-TTI is still reused for the first TTI. That is, in this solution, the base station may indicate, to the user equipment, the $(N+1)^{th}$ timeslot (a timeslot corresponding to a second TTI, that is, a timeslot corresponding to a control area of the S-TTI-1) by using the control area of the N-TTI. That is, by means of this solution, compatibility between a 1-ms N-TTI and a 0.5-ms S-TTI can be implemented, and impact of transmission of the control area of the $(N+1)^{th}$ timeslot on transmission of a physical data channel of the 1-ms N-TTI can be avoided.

Figure 11:
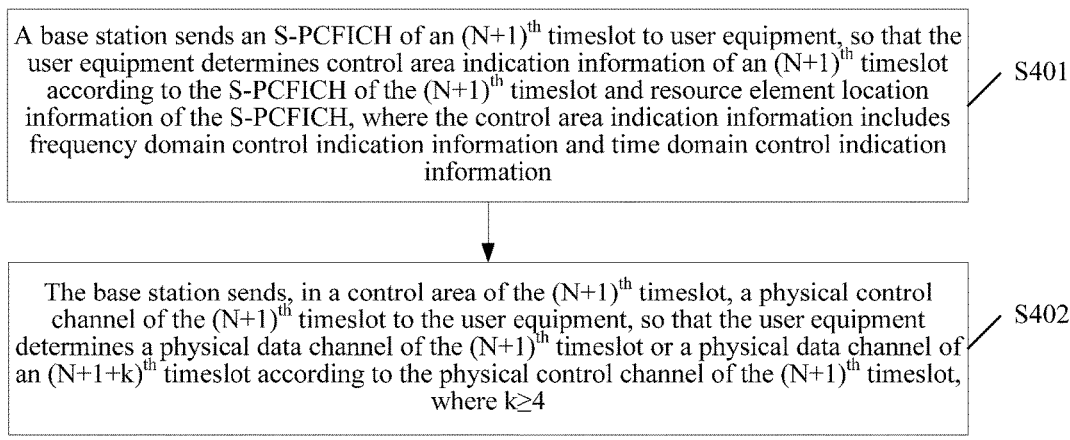
FIG. 11 is a flowchart of a method for transmitting a downlink control channel according to an embodiment of the present invention.

An embodiment of the present invention provides a method for transmitting a downlink control channel. In the method for transmitting a downlink control channel, as shown in FIG. 3a or FIG. 3b, a subframe includes an $N^{th}$ timeslot and an $(N+1)^{th}$ timeslot, the $N^{th}$ timeslot corresponds to a first TTI, and the $(N+1)^{th}$ timeslot corresponds to a second TTI. As shown in FIG. 11, the method for transmitting a downlink control channel includes:

S401: A base station sends a secondary-physical control format indicator channel (Secondary-Physical Control Format Indicator Channel, S-PCFICH) of the $(N+1)^{th}$ timeslot to user equipment, so that the user equipment determines control area indication information of the $(N+1)^{th}$ timeslot according to the S-PCFICH of the $(N+1)^{th}$ timeslot and resource element location information of the S-PCFICH, where the control area indication information includes frequency domain control indication information and time domain control indication information.

The frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the resource element location information is predefined or is sent by the base station to the user equipment by using high layer signaling.

S402: The base station sends, in the control area of the $(N+1)^{th}$ timeslot, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4.

It should be noted that, for specific content of the physical control channel of the $(N+1)^{th}$ timeslot, the physical data channel of the $(N+1)^{th}$ timeslot, the physical data channel of the $(N+1+k)^{th}$ timeslot (k≥4), the $N^{th}$ timeslot, the $(N+1)^{th}$ timeslot, and N in this embodiment, reference may be made to related description in another embodiment of the present invention, and details are no longer described here in this embodiment.

For the method for transmitting a downlink control channel according to this embodiment of the present invention, compared with the prior art, in this solution, a base station may indicate, to user equipment by using an S-PCFICH of an $(N+1)^{th}$ timeslot and resource element location information of the S-PCFICH of the $(N+1)^{th}$ timeslot, control area indication information of the $(N+1)^{th}$ timeslot of a time domain resource and a frequency domain resource that are occupied by a control area of the $(N+1)^{th}$ timeslot in the $(N+1)^{th}$ timeslot; and then send, in the control area indicated by the control area indication information of the $(N+1)^{th}$ timeslot, a physical control channel of the $(N+1)^{th}$ timeslot to the user equipment. That is, the base station may indicate, to the user equipment, the control area of the $(N+1)^{th}$ timeslot (a timeslot corresponding to an S-TTI-1), and may further send the physical control channel of the $(N+1)^{th}$ timeslot to the user equipment by using the control area of the $(N+1)^{th}$ timeslot, so that a physical data channel of the $(N+1)^{th}$ timeslot can be transmitted.

Figure 12:
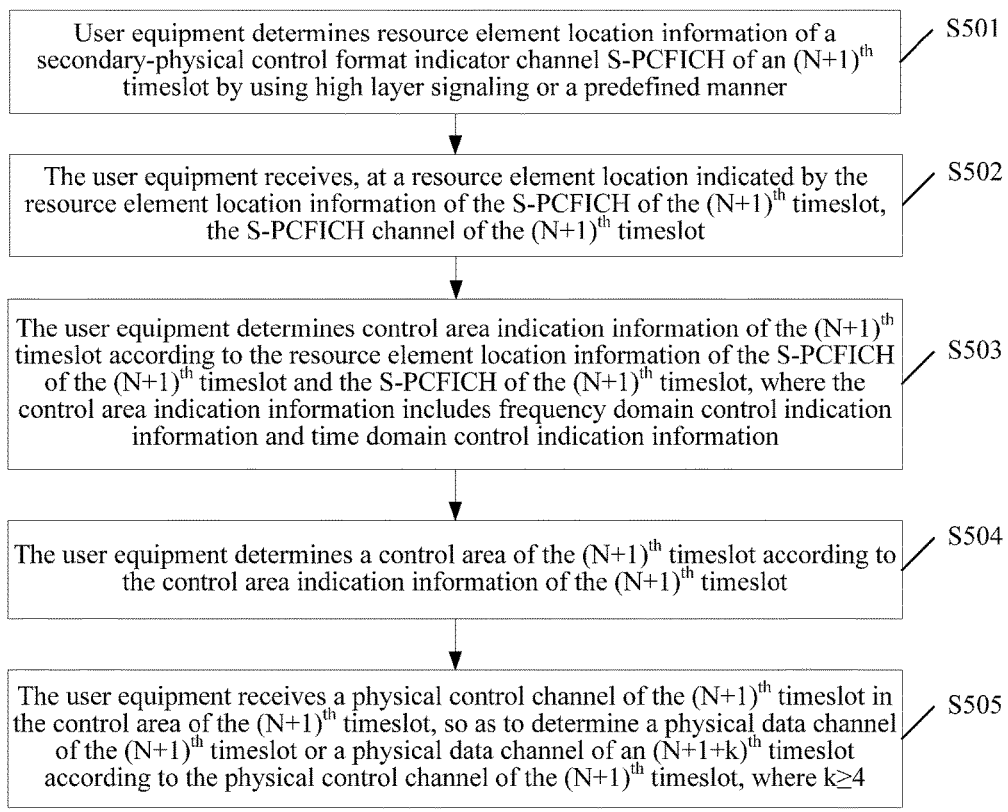
FIG. 12 is a flowchart of a method for transmitting a downlink control channel according to an embodiment of the present invention.

Another embodiment of the present invention provides a method for transmitting a downlink control channel. In the method for transmitting a downlink control channel, as shown in FIG. 3a or FIG. 3b, a subframe includes an $N^{th}$ timeslot and an $(N+1)^{th}$ timeslot, the $N^{th}$ timeslot corresponds to a first TTI, and the $(N+1)^{th}$ timeslot corresponds to a second TTI. As shown in FIG. 12, the method for transmitting a downlink control channel includes:

S501: User equipment determines resource element location information of a secondary-physical control format indicator channel S-PCFICH of the $(N+1)^{th}$ timeslot by using high layer signaling or a predefined manner.

S502: The user equipment receives, at a resource element location indicated by the resource element location information of the S-PCFICH of the $(N+1)^{th}$ timeslot, the S-PCFICH channel of the $(N+1)^{th}$ timeslot.

S503: The user equipment determines control area indication information of the $(N+1)^{th}$ timeslot according to the resource element location information of the S-PCFICH of the $(N+1)^{th}$ timeslot and the S-PCFICH of the $(N+1)^{th}$ timeslot, where the control area indication information includes frequency domain control indication information and time domain control indication information.

S504: The user equipment determines a control area of the $(N+1)^{th}$ timeslot according to the control area indication information of the $(N+1)^{t1}$ timeslot.

S505: The user equipment receives a physical control channel of the $(N+1)^{th}$ timeslot in the control area of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where $k \geq 4$.

It should be noted that, for specific content of the physical control channel of the $(N+1)^{th}$ timeslot, the physical data channel of the $(N+1)^{th}$ timeslot, the physical data channel of the $(N+1+k)^{th}$ timeslot ($k \geq 4$), the $N^{th}$ timeslot, the $(N+1)^{th}$ timeslot, and N in this embodiment, reference may be made to related description in another embodiment of the present invention, and details are no longer described here in this embodiment.

For the method for transmitting a downlink control channel according to this embodiment of the present invention, compared with the prior art, in this solution, user equipment may receive, at a resource element location indicated by resource element location information of an S-PCFICH of an $(N+1)^{th}$ timeslot, the S-PCFICH channel of the $(N+1)^{th}$ timeslot, determine control area indication information of the $(N+1)^{th}$ timeslot according to the resource element location information of the S-PCFICH of the $(N+1)^{th}$ timeslot and the S-PCFICH of the $(N+1)^{th}$ timeslot, then determine a control area of the $(N+1)^{th}$ timeslot according to the control area indication information of the $(N+1)^{th}$ timeslot, and receive a physical control channel of the $(N+1)^{th}$ timeslot in the control area of the $(N+1)^{th}$ timeslot. That is, the user equipment may determine the control area of the $(N+1)^{th}$ timeslot (a timeslot corresponding to an S-TTI-1) according to an indication of a base station, and may receive the physical control channel of the $(N+1)^{th}$ timeslot sent, by using the control area of the $(N+1)^{th}$ timeslot, by the base station, so that a physical data channel of the $(N+1)^{th}$ timeslot can be transmitted.

Figure 13:
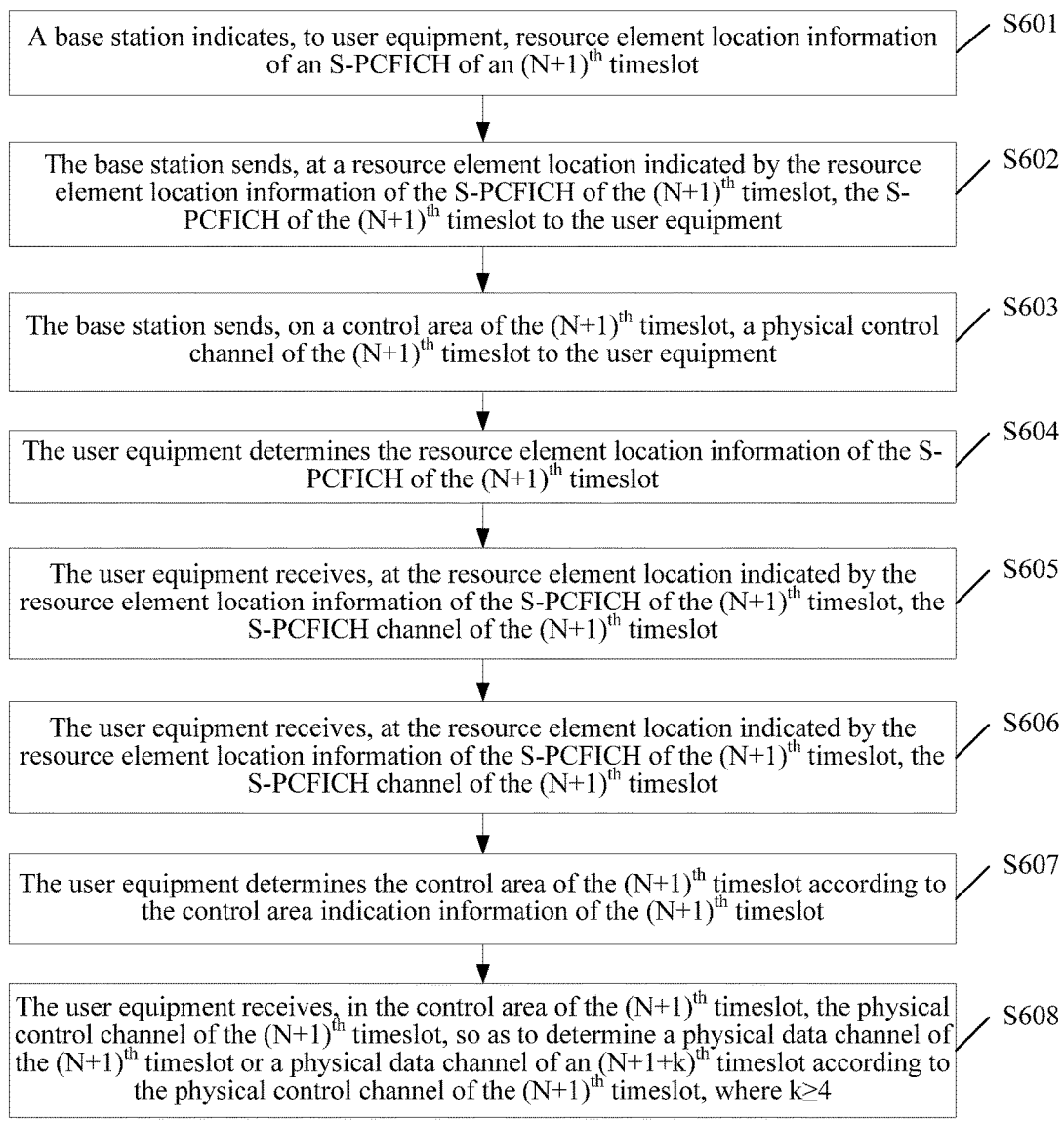
FIG. 13 is a flowchart of a method for transmitting a downlink control channel according to an embodiment of the present invention.

Another embodiment of the present invention provides a method for transmitting a downlink control channel. In the method for transmitting a downlink control channel, as shown in FIG. 3a or FIG. 3b, a subframe includes an $N^{th}$ timeslot and an $(N+1)^{th}$ timeslot, the $N^{th}$ timeslot corresponds to a first TTI, and the $(N+1)^{th}$ timeslot corresponds to a second TTI. As shown in FIG. 13, the method for transmitting a downlink control channel includes:

S601: A base station indicates, to user equipment, resource element location information of the S-PCFICH of the $(N+1)^{th}$ timeslot.

For example, in this embodiment of the present invention, the base station may send the resource element location information of the S-PCFICH of the $(N+1)^{th}$ timeslot to the user equipment by using high layer signaling.

The high layer signaling in this embodiment of the present invention may be radio resource control (Radio Resource Control, RRC) configuration signaling or media access control (Medium Access Control, MAC) layer configuration signaling.

S602: The base station sends, at a resource element location indicated by the resource element location information of the S-PCFICH of the $(N+1)^{th}$ timeslot, the S-PCFICH of the $(N+1)^{th}$ timeslot to the user equipment.

The resource element location information of the S-PCFICH of the $(N+1)^{th}$ timeslot may be location information that indicates a resource element used to transmit the S-PCFICH of the $(N+1)^{th}$ timeslot. For example, the resource element location information may include a start frequency domain resource block location of a frequency domain resource block area occupied by the S-PCFICH of the $(N+1)^{th}$ timeslot in the $(N+1)^{th}$ timeslot, a length of the frequency domain resource block area occupied by the S-PCFICH of the $(N+1)^{th}$ timeslot in the $(N+1)^{th}$ timeslot, and a time domain time unit area occupied by the S-PCFICH of the $(N+1)^{th}$ timeslot in the $(N+1)^{th}$ timeslot.

Optionally, in a first application scenario of this embodiment, the S-PCFICH of the $(N+1)^{th}$ timeslot carries time domain control indication information.

Further optionally, in a second application scenario of this embodiment, the S-PCFICH of the $(N+1)^{th}$ timeslot carries frequency domain resource length information and the time domain control indication information. The frequency domain resource length information is used to indicate a length of a frequency domain resource block area occupied by a control area of the $(N+1)^{th}$ timeslot in the $(N+1)^{th}$ timeslot.

S603: The base station sends, a control area of the $(N+1)^{th}$ timeslot, a physical control channel of the $(N+1)^{th}$ timeslot to the user equipment.

S604: The user equipment determines the resource element location information of the S-PCFICH of the $(N+1)^{th}$ timeslot.

For example, in this embodiment of the present invention, the user equipment may determine, by using high layer signaling or a predefined manner, the resource element location information of the S-PCFICH of the $(N+1)^{th}$ timeslot.

When the user equipment determines the resource element location information of the S-PCFICH of the $(N+1)^{th}$ timeslot by using a predefined manner, that is, the resource element location information of the S-PCFICH of the $(N+1)^{th}$ timeslot is predefined in the user equipment, S601 may be skipped. That is, the base station may directly send, at a resource element location indicated by the resource element location information of the S-PCFICH of the $(N+1)^{th}$ timeslot, the S-PCFICH of the $(N+1)^{th}$ timeslot to the user equipment (that is, S602 is directly executed).

S605: The user equipment receives, at a resource element location indicated by the resource element location information of the S-PCFICH of the $(N+1)^{th}$ timeslot, the S-PCFICH channel of the $(N+1)^{th}$ timeslot.

S606: The user equipment determines control area indication information of the $(N+1)^{th}$ timeslot according to the resource element location information of the S-PCFICH of the $(N+1)^{th}$ timeslot and the S-PCFICH of the $(N+1)^{th}$ timeslot.

The control area indication information includes frequency domain control indication information and time domain control indication information, the frequency domain control indication information is used to indicate a frequency domain resource block area occupied by the control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot.

For example, the frequency domain control indication information may include a start frequency domain resource block location of a frequency domain resource block area occupied by the control area of the $(N+1)^{th}$ timeslot in the $(N+1)^{th}$ timeslot and a length of a frequency domain resource block area occupied by the control area of the $(N+1)^{th}$ timeslot in the $(N+1)^{th}$ timeslot, where an RB or an RBG is used as a unit for the length of the frequency domain resource block area.

Figure 14:
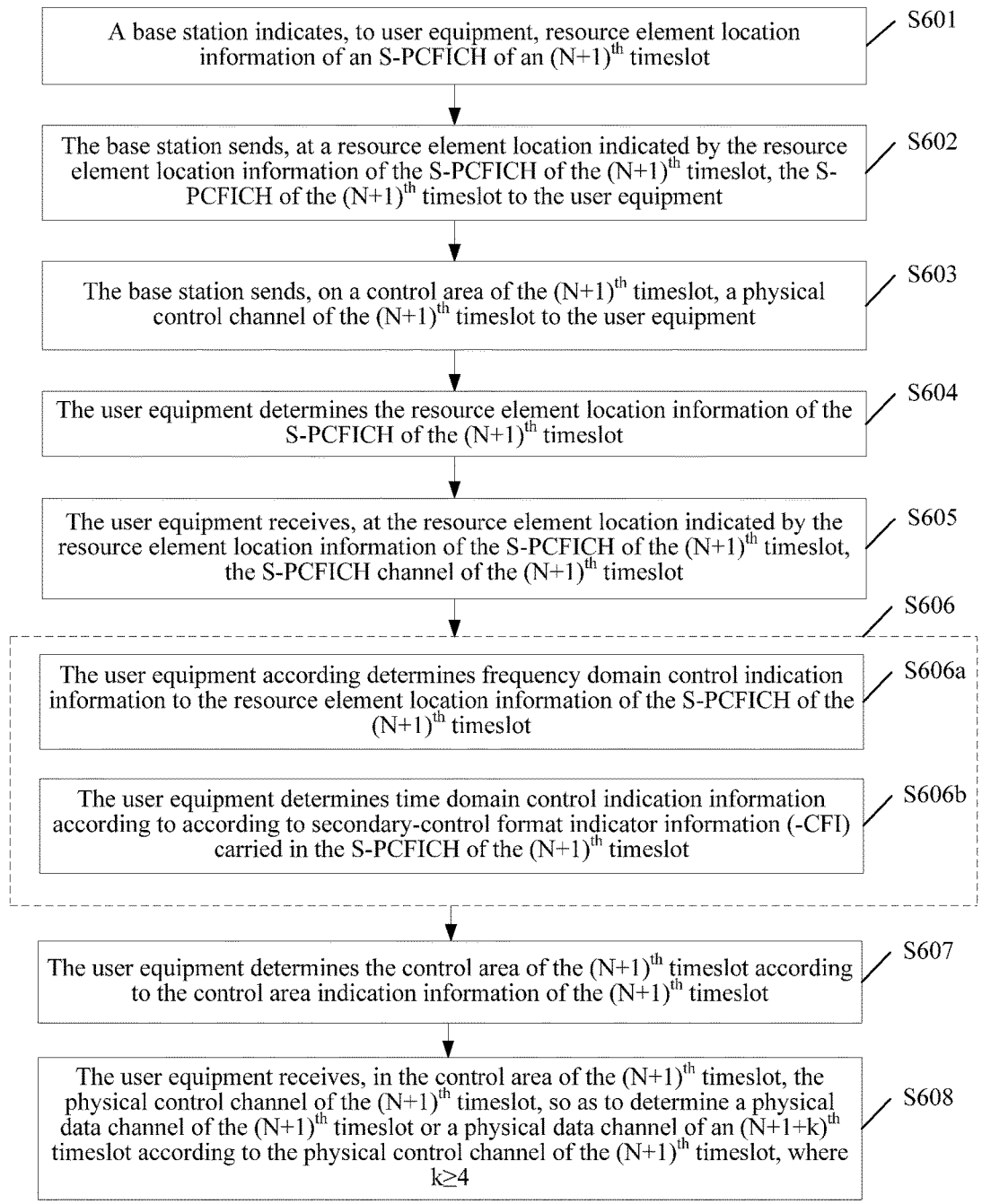
FIG. 14 is a flowchart of a method for transmitting a downlink control channel according to an embodiment of the present invention.

In the first application scenario of this embodiment, the start frequency domain resource block location of a frequency domain resource block area occupied by the control area of the $(N+1)^{th}$ timeslot in the $(N+1)^{th}$ timeslot is the same as the start frequency domain resource block location of a frequency domain resource block area occupied by the S-PCFICH of the $(N+1)^{th}$ timeslot in the $(N+1)^{th}$ timeslot. The length of the frequency domain resource block area occupied by the control area of the $(N+1)^{th}$ timeslot in the $(N+1)^{th}$ timeslot is equal to L plus a length of the frequency domain resource block area in the $(N+1)^{th}$ timeslot at which the S-PCFICH of the $(N+1)^{th}$ timeslot is located, and L is an integer greater than or equal to 0. The S-PCFICH of the $(N+1)^{th}$ timeslot carries the time domain control indication information. As shown in FIG. 14, in the first application scenario, S606 may include S606a and S606b:

S606a: The user equipment determines frequency domain control indication information according to the resource element location information of the S-PCFICH of the (N+1)$^{th}$ timeslot.

Specifically, the user equipment may determine, according to a start frequency domain resource block location that is of a frequency domain resource block area occupied by the S-PCFICH of the $(N+1)^{th}$ timeslot in the $(N+1)^{th}$ timeslot and that is included in the resource element location information, a start frequency domain resource block location of a frequency domain resource block area occupied by the control area of the $(N+1)^{th}$ timeslot in the $(N+1)^{th}$ timeslot, where the start frequency domain resource block location of a frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot.

Figure 16:
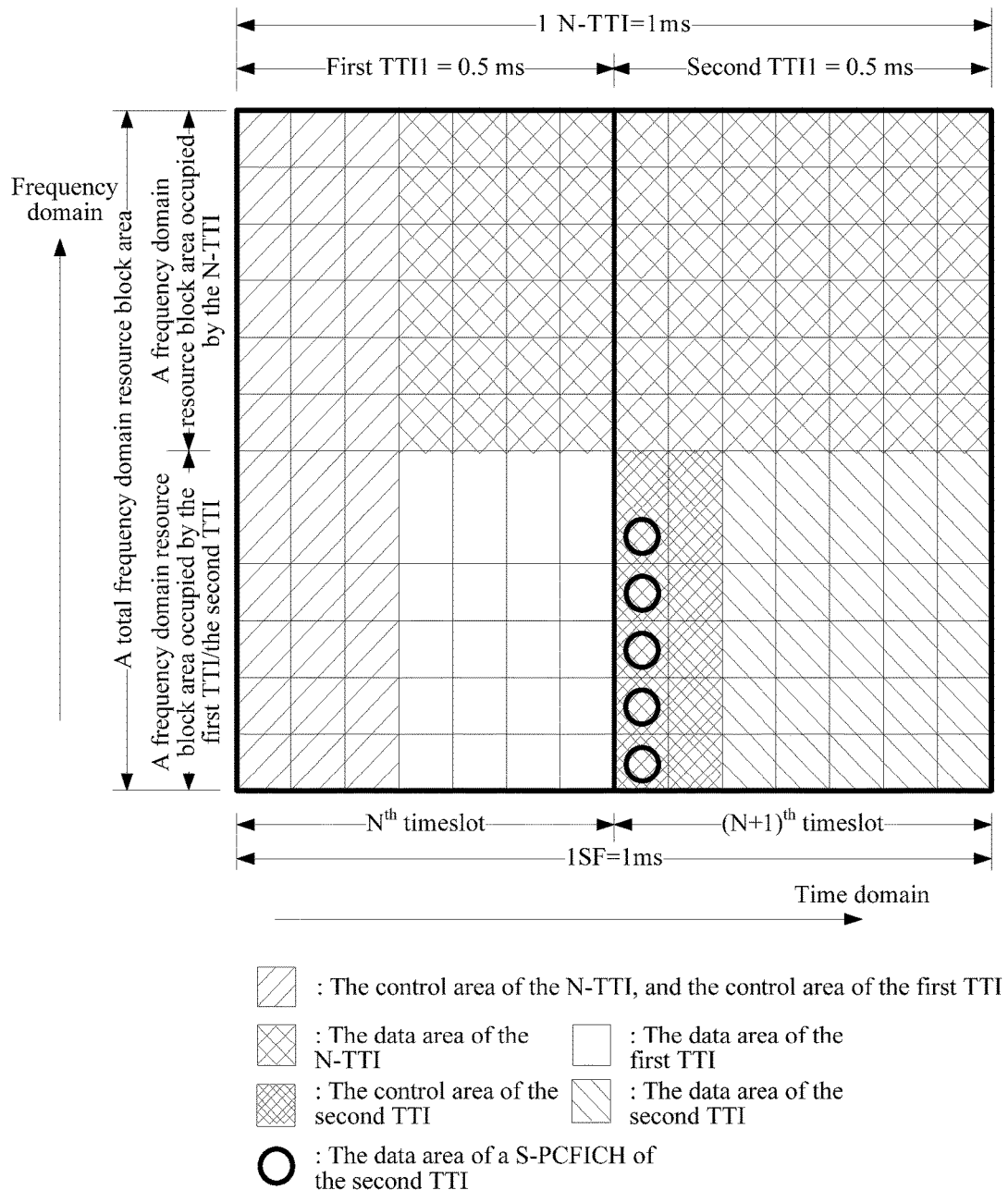
FIG. 16 is a schematic structural diagram of a transmission time interval TTI according to an embodiment of the present invention.

For example, it is assumed that an RB is used as a unit for the length of the frequency domain resource block area. As shown in FIG. 16, for example, one cell in a frequency domain in FIG. 16 is used as an RB. If the frequency domain control indication information indicates that a start frequency domain resource block location of the frequency domain resource block area occupied by the S-PCFICH of the $(N+1)^{th}$ timeslot in the $(N+1)^{th}$ timeslot is an RB represented by a bold cell, because the start frequency domain resource block location of a frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot, the start frequency domain resource block location of the frequency domain resource block area occupied by the control area of the $(N+1)^{th}$ timeslot in the $(N+1)^{th}$ timeslot is also an RB represented by a bold cell.

The user equipment may determine, according to the length of the frequency domain resource block area in the $(N+1)^{th}$ timeslot at which the S-PCFICH of the $(N+1)^{th}$ timeslot is located, a length of a frequency domain resource block area occupied by the control area of the $(N+1)^{th}$ timeslot in the $(N+1)^{th}$ timeslot, where the length of the frequency domain resource block area occupied by the control area of the $(N+1)^{th}$ timeslot in the $(N+1)^{th}$ timeslot is equal to L plus the length of the frequency domain resource block area in the $(N+1)^{th}$ timeslot at which the S-PCFICH of the $(N+1)^{th}$ timeslot is located, and L is an integer greater than or equal to 0.

For example, as shown in FIG. 16, it may be known that the length of the frequency domain resource block area in the $(N+1)^{th}$ timeslot at which the S-PCFICH of the $(N+1)^{th}$ timeslot is located is five RBs (a length of the frequency domain resource block area represented by five cells, that is, a frequency domain resource block area shown by a bold circle in FIG. 16). The length of the frequency domain resource block area occupied by the control area of the $(N+1)^{th}$ timeslot in the $(N+1)^{th}$ timeslot is equal to L plus the length of the frequency domain resource block area in the $(N+1)^{th}$ timeslot at which the S-PCFICH of the $(N+1)^{th}$ timeslot is located, where L≥0. Therefore, the length of the frequency domain resource block area occupied by the control area of the $(N+1)^{th}$ timeslot in the $(N+1)^{th}$ timeslot may be at least five RBs (that is, a length of the frequency domain resource block area represented by six cells).

S606b: The user equipment determines time domain control indication information according to according to secondary-control format indicator information (Secondary-Control Format Indicator, S-CFI) carried in the S-PCFICH of the $(N+1)^{th}$ timeslot.

The S-CFI carried in the S-PCFICH of the $(N+1)^{th}$ timeslot may include time domain control indication information used to indicate a time domain time unit area occupied by the control area of the $(N+1)^{th}$ timeslot in the $(N+1)^{th}$ timeslot.

Figure 15:
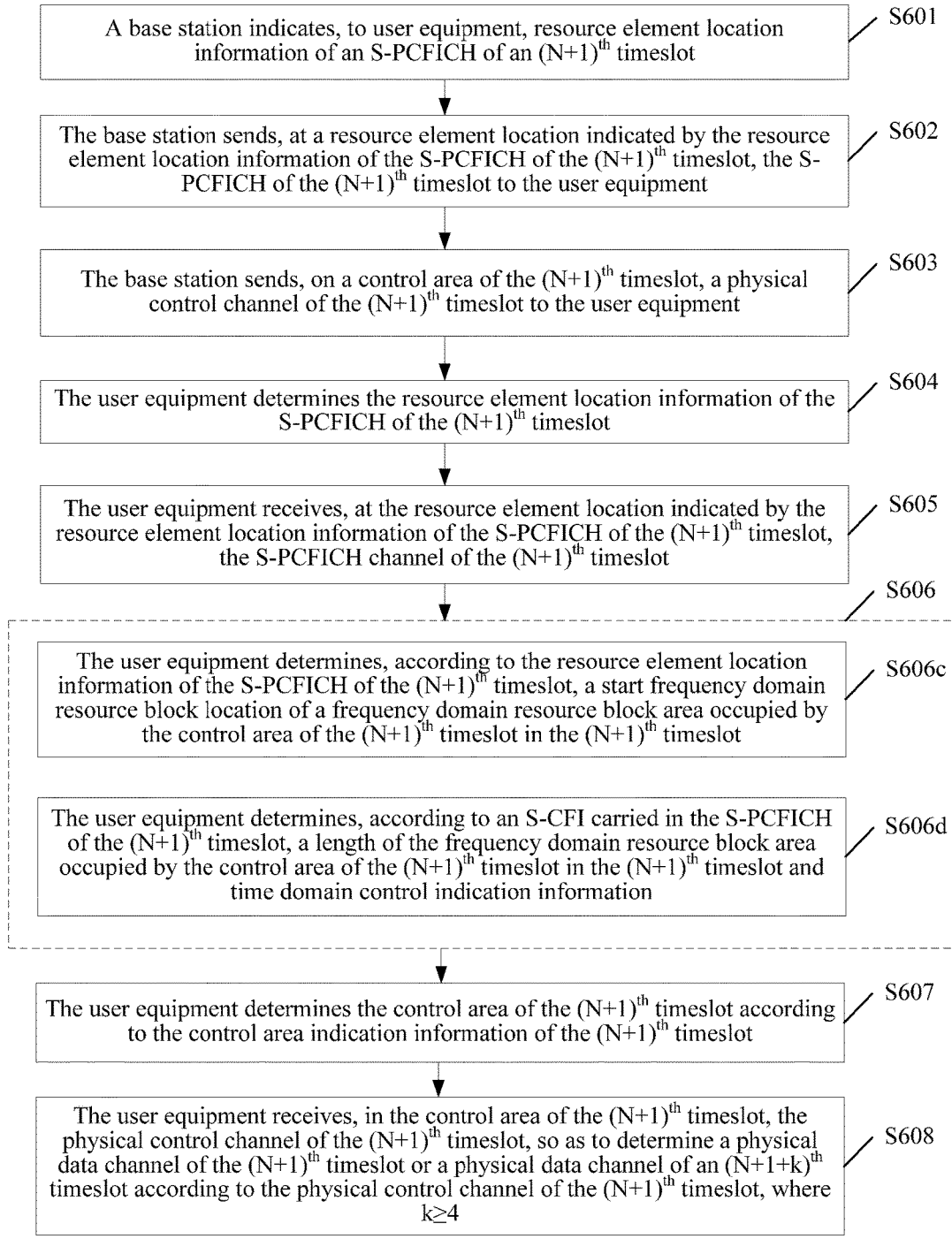
FIG. 15 is a flowchart of a method for transmitting a downlink control channel according to an embodiment of the present invention.

In the second application scenario in this embodiment, the start frequency domain resource block location of the frequency domain resource block area occupied by the control area of the $(N+1)^{th}$ timeslot in the $(N+1)^{th}$ timeslot is the same as a start frequency domain resource block location of a frequency domain resource block area occupied by the S-PCFICH of the $(N+1)^{th}$ timeslot in the $(N+1)^{th}$ timeslot. However, a difference from the first application scenario of this embodiment lies in that the base station indicates, to the user equipment by using frequency domain resource length information carried in the S-PCFICH of the $(N+1)^{th}$ timeslot, the length of the frequency domain resource block area occupied by the control area of the $(N+1)^{th}$ timeslot in the $(N+1)^{th}$ timeslot. In the second application scenario, as shown in FIG. 15, S606 may include S606c:

S606c: The user equipment determines, according to the resource element location information of the S-PCFICH of the $(N+1)^{th}$ timeslot, a start frequency domain resource block location of a frequency domain resource block area occupied by the control area of the $(N+1)^{th}$ timeslot in the $(N+1)^{th}$ timeslot.

The start frequency domain resource block location of a frequency domain resource block area occupied by the control area of the $(N+1)^{th}$ timeslot in the $(N+1)^{th}$ timeslot is the same as a start frequency domain resource block location of a frequency domain resource block area occupied by the S-PCFICH of the $(N+1)^{th}$ timeslot in the $(N+1)^{th}$ timeslot.

S606d: The user equipment determines, according to an S-CFI carried in the S-PCFICH of the $(N+1)^{th}$ timeslot, the length of the frequency domain resource block area occupied by the control area of the $(N+1)^{th}$ timeslot in the $(N+1)^{th}$ timeslot and time domain control indication information.

The S-CFI carried in the S-PCFICH of the $(N+1)^{th}$ timeslot may include the time domain control indication information and indication information of the length of the frequency domain resource block area occupied by the control area of the $(N+1)^{th}$ timeslot in the $(N+1)^{th}$ timeslot.

S607: The user equipment determines the control area of the $(N+1)^{th}$ timeslot according to the control area indication information of the $(N+1)^{th}$ timeslot.

S608: The user equipment receives, in the control area of the $(N+1)^{th}$ timeslot, the physical control channel of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where k≥4.

It should be noted that, for specific content of the physical control channel of the $(N+1)^{th}$ timeslot, the physical data channel of the $(N+1)^{th}$ timeslot, the physical data channel of the $(N+1+k)^{th}$ timeslot (k≥4), the $N^{th}$ timeslot, the $(N+1)^{th}$ timeslot, and N in this embodiment, reference may be made to related description in another embodiment of the present invention, and details are no longer described here in this embodiment.

For the method for transmitting a downlink control channel according to this embodiment of the present invention, compared with the prior art, in this solution, a base station may indicate, to user equipment by using an S-PCFICH of an $(N+1)^{th}$ timeslot and resource element location information of the S-PCFICH of the $(N+1)^{th}$ timeslot, control area indication information of the $(N+1)^{th}$ timeslot of a time domain resource and a frequency domain resource that are occupied by a control area of the $(N+1)^{th}$ timeslot in the $(N+1)^{th}$ timeslot; and then send, in the control area indicated by the control area indication information of the $(N+1)^{th}$ timeslot, a physical control channel of the $(N+1)^{th}$ timeslot to the user equipment. That is, the base station may indicate, to the user equipment, the control area of the $(N+1)^{th}$ timeslot (a timeslot corresponding to an S-TTI-1), so that the physical control channel of the $(N+1)^{th}$ timeslot may be transmitted by using the control area of the $(N+1)^{th}$ timeslot, so as to transmit a physical data channel of the $(N+1)^{th}$ timeslot.

Moreover, in this solution, the control area of the $N^{th}$ timeslot (a timeslot corresponding to a first TTI, that is, a timeslot corresponding to an S-TTI-0) is a control area of an N-TTI, that is, the control area of the N-TTI is still reused for the first TTI. That is, in this solution, the base station may indicate, to the user equipment, the $(N+1)^{th}$ timeslot (a timeslot corresponding to a second TTI, that is, a timeslot corresponding to a control area of the S-TTI-1) by using the control area of the N-TTI. That is, by means of this solution, compatibility between a 1-ms N-TTI and a 0.5-ms S-TTI can be implemented, and impact of transmission of the control area of the $(N+1)^{th}$ timeslot on transmission of a physical data channel of the 1-ms N-TTI can be avoided.

Figure 17:
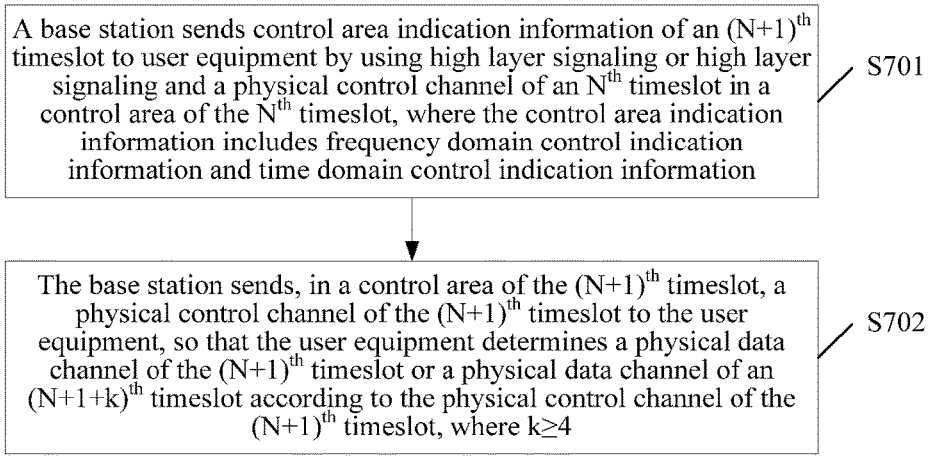
FIG. 17 is a flowchart of a method for transmitting a downlink control channel according to an embodiment of the present invention.

An embodiment of the present invention provides a method for transmitting a downlink control channel. In the method for transmitting a downlink control channel, as shown in FIG. 3a or FIG. 3b, a subframe includes an $N^{th}$ timeslot and an $(N+1)^{th}$ timeslot, the $N^{th}$ timeslot corresponds to a first TTI, and the $(N+1)^{th}$ timeslot corresponds to a second TTI. As shown in FIG. 17, the method for transmitting a downlink control channel includes:

S701: A base station sends control area indication information of the $(N+1)^{th}$ timeslot to user equipment by using high layer signaling or high layer signaling and a physical control channel of the $N^{th}$ timeslot in a control area of the $N^{th}$ timeslot, where the control area indication information includes frequency domain control indication information and time domain control indication information.

The frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the control area of the $(N+1)^{th}$ timeslot is used to transmit a physical control channel of the $(N+1)^{th}$ timeslot.

Optionally, the method of sending, by a base station, control area indication information of the $(N+1)^{th}$ timeslot to user equipment by using high layer signaling and a physical control channel of the $N^{th}$ timeslot in a control area of the $N^{th}$ timeslot may include:

sending, by the base station, the frequency domain control indication information to the user equipment by using the high layer signaling; and sending, by the base station, the time domain control indication information to the user equipment by using the physical control channel of the $N^{th}$ timeslot in the control area of the $N^{th}$ timeslot; or sending, by the base station, the frequency domain control indication information to the user equipment by using the physical control channel of the $N^{th}$ timeslot in the control area of the $N^{th}$ timeslot; and sending, by the base station, the time domain control indication information to the user equipment by using the high layer signaling.

Optionally, the method of sending, by a base station, control area indication information of the $(N+1)^{th}$ timeslot to user equipment by using high layer signaling and a physical control channel of the $N^{th}$ timeslot in a control area of the $N^{th}$ timeslot may include:

sending, by the base station to the user equipment by using the physical control channel of the $N^{th}$ timeslot in the control area of the $N^{th}$ timeslot, a start frequency domain resource block location of a frequency domain resource block area occupied by the control area of the $(N+1)^{th}$ timeslot in the $(N+1)^{th}$ timeslot; sending, by the base station to the user equipment by using the high layer signaling, a length of the frequency domain resource block area occupied by the control area of the $(N+1)^{th}$ timeslot in the $(N+1)^{th}$ timeslot; and sending, by the base station, the time domain control indication information to the user equipment by using the physical control channel of the $N^{th}$ timeslot in the control area of the $N^{th}$ timeslot;

or, sending, by the base station to the user equipment by using the high layer signaling, a start frequency domain resource block location of a frequency domain resource block area occupied by the control area of the $(N+1)^{th}$ timeslot in the $(N+1)^{th}$ timeslot; sending, by the base station to the user equipment by using the physical control channel of the $N^{th}$ timeslot in the control area of the $N^{th}$ timeslot, a length of the frequency domain resource block area occupied by the control area of the $(N+1)^{th}$ timeslot in the $(N+1)^{th}$ timeslot; and sending, by the base station, the time domain control indication information to the user equipment by using the physical control channel of the $N^{th}$ timeslot in the control area of the $N^{th}$ timeslot;

or, sending, by the base station to the user equipment by using the physical control channel of the $N^{th}$ timeslot in the control area of the $N^{th}$ timeslot, a start frequency domain resource block location of a frequency domain resource block area occupied by the control area of the $(N+1)^{th}$ timeslot in the $(N+1)^{th}$ timeslot; sending, by the base station to the user equipment by using the high layer signaling, a length of the frequency domain resource block area occupied by the control area of the $(N+1)^{th}$ timeslot in the $(N+1)^{th}$ timeslot; and sending, by the base station, the time domain control indication information to the user equipment by using the high layer signaling;

or, sending, by the base station to the user equipment by using the high layer signaling, a start frequency domain resource block location of a frequency domain resource block area occupied by the control area of the $(N+1)^{th}$ timeslot in the $(N+1)^{th}$ timeslot; sending, by the base station to the user equipment by using the physical control channel of the $N^{th}$ timeslot in the control area of the $N^{th}$ timeslot, a length of the frequency domain resource block area occupied by the control area of the $(N+1)^{th}$ timeslot in the $(N+1)^{th}$ timeslot; and sending the time domain control indication information to the user equipment the base station by using the high layer signaling.

S702: The base station sends, in a control area of the $(N+1)^{th}$ timeslot, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4.

The high layer signaling is RRC configuration signaling or MAC layer configuration signaling.

It should be noted that, for specific content of the physical control channel of the $(N+1)^{th}$ timeslot, the physical data channel of the $(N+1)^{th}$ timeslot, and the physical data channel of the $(N+1+k)^{th}$ timeslot (k≥4), the $N^{th}$ timeslot, the $(N+1)^{th}$ timeslot, and N in this embodiment, reference may be made to related description in another embodiment of the present invention, and details are no longer described here in this embodiment.

It should be noted that, for specific content of the frequency domain control indication information in this embodiment, reference may be made to related description in another embodiment of the present invention, and details are no longer described here in this embodiment.

For the method for transmitting a downlink control channel according to this embodiment of the present invention, compared with the prior art, in this solution, a base station may send control area indication information of an $(N+1)^{th}$ timeslot to user equipment by using high layer signaling or high layer signaling and a physical control channel of an $N^{th}$ timeslot in a control area of the $N^{th}$ timeslot, and send, in a control area of the $(N+1)^{th}$ timeslot, a physical control channel of the $(N+1)^{th}$ timeslot to the user equipment. That is, the base station may indicate, to the user equipment, the control area of the $(N+1)^{th}$ timeslot (a timeslot corresponding to an S-TTI-1), and may further send the physical control channel of the $(N+1)^{th}$ timeslot to the user equipment by using the control area of the $(N+1)^{th}$ timeslot, so that a physical data channel of the $(N+1)^{th}$ timeslot can be transmitted.

Figure 18:
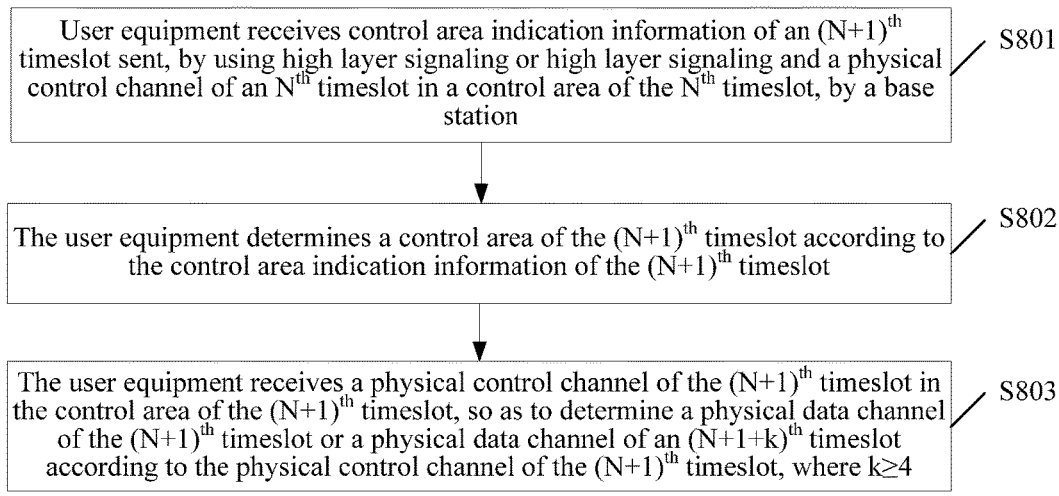
FIG. 18 is a flowchart of a method for transmitting a downlink control channel according to an embodiment of the present invention.

Another embodiment of the present invention provides a method for transmitting a downlink control channel. In the method for transmitting a downlink control channel, as shown in FIG. 3a or FIG. 3b, a subframe includes an $N^{th}$ timeslot and an $(N+1)^{th}$ timeslot, the $N^{th}$ timeslot corresponds to a first TTI, and the $(N+1)^{th}$ timeslot corresponds to a second TTI. As shown in FIG. 18, the method for transmitting a downlink control channel includes:

S801: User equipment receives control area indication information of the $(N+1)^{th}$ timeslot sent, by using high layer signaling or high layer signaling and a physical control channel of the $N^{th}$ timeslot in a control area of the $N^{th}$ timeslot, by a base station.

Optionally, the method of receiving, by user equipment, control area indication information of the $(N+1)^{th}$ timeslot sent, by using high layer signaling or high layer signaling and a physical control channel of the $N^{th}$ timeslot in a control area of the $N^{th}$ timeslot, by a base station may include:

receiving, by the user equipment, frequency domain control indication information sent, by using the high layer signaling, by the base station; and receiving, by the user equipment, time domain control indication information sent, by using the physical control channel of the $N^{th}$ timeslot in the control area of the $N^{th}$ timeslot, by the base station; or receiving, by the user equipment, frequency domain control indication information sent, by using the physical control channel of the $N^{th}$ timeslot in the control area of the $N^{th}$ timeslot, by the base station; and receiving, by the user equipment, time domain control indication information sent, by using the high layer signaling, by the base station.

Optionally, the method of receiving, by user equipment, control area indication information of the $(N+1)^{th}$ timeslot sent, by using high layer signaling or high layer signaling and a physical control channel of the $N^{th}$ timeslot in a control area of the $N^{th}$ timeslot, by a base station may include:

receiving, by the user equipment, a start frequency domain resource block location that is of a frequency domain resource block area occupied by a control area of the $(N+1)^{th}$ timeslot in the $(N+1)^{th}$ timeslot and that is sent by the base station by using the physical control channel of the $N^{th}$ timeslot in the control area of the $N^{th}$ timeslot; receiving, by the user equipment, a length that is of a frequency domain resource block area occupied by the control area of the $(N+1)^{th}$ timeslot in the $(N+1)^{th}$ timeslot and that is sent by the base station by using the high layer signaling; and receiving, by the user equipment, the time domain control indication information sent, by using the physical control channel of the $N^{th}$ timeslot in the control area of the $N^{th}$ timeslot, by the base station; or, receiving, by the user equipment, a start frequency domain resource block location that is of a frequency domain resource block area occupied by the control area of the $(N+1)^{th}$ timeslot in the $(N+1)^{th}$ timeslot and that is sent by the base station by using the high layer signaling; receiving, by the user equipment, a length that is of the frequency domain resource block area occupied by the control area of the $(N+1)^{th}$ timeslot in the $(N+1)^{th}$ timeslot and that is sent by the base station by using the physical control channel of the $N^{th}$ timeslot in the control area of the $N^{th}$ timeslot; and receiving, by the user equipment, the time domain control indication information sent, by using the physical control channel of the $N^{th}$ timeslot in the control area of the $N^{th}$ timeslot, by the base station; or, receiving, by the user equipment, a start frequency domain resource block location that is of a frequency domain resource block area occupied by the control area of the $(N+1)^{th}$ timeslot in the $(N+1)^{th}$ timeslot and that is sent by the base station by using the physical control channel of the $N^{th}$ timeslot in the control area of the $N^{th}$ timeslot; receiving, by the user equipment, a length that is of the frequency domain resource block area occupied by the control area of the $(N+1)^{th}$ timeslot in the $(N+1)^{th}$ timeslot and that is sent by the base station by using the high layer signaling; and receiving, by the user equipment, the time domain control indication information that is sent by the base station by using the high layer signaling; or, receiving, by the user equipment, a start frequency domain resource block location that is of a frequency domain resource block area occupied by the control area of the $(N+1)^{th}$ timeslot in the $(N+1)^{th}$ timeslot and that is sent by the base station by using the high layer signaling; receiving, by the user equipment, a length that is of the frequency domain resource block area occupied by the control area of the $(N+1)^{th}$ timeslot in the $(N+1)^{th}$ timeslot and that is sent by the base station by using the physical control channel of the $N^{th}$ timeslot in the control area of the $N^{th}$ timeslot; and receiving, by the user equipment, the time domain control indication information sent, by using the high layer signaling, by the base station.

S802: The user equipment determines the control area of the $(N+1)^{th}$ timeslot according to the control area indication information of the $(N+1)^{th}$ timeslot.

S803: The user equipment receives a physical control channel of the $(N+1)^{th}$ timeslot in the control area of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where $k\geq4$.

The high layer signaling is RRC configuration signaling or MAC layer configuration signaling.

It should be noted that, for specific content of the physical control channel of the $(N+1)^{th}$ timeslot, the physical data channel of the $(N+1)^{th}$ timeslot, the physical data channel of the $(N+1+k)^{th}$ timeslot ($k\geq4$), the $N^{th}$ timeslot, the $(N+1)^{th}$ timeslot, and N in this embodiment, reference may be made to related description in another embodiment of the present invention, and details are no longer described here in this embodiment.

For the method for transmitting a downlink control channel according to this embodiment of the present invention, compared with the prior art, in this solution, user equipment may receive control area indication information of an $(N+1)^{th}$ timeslot sent, by using high layer signaling or high layer signaling and a physical control channel of an $N^{th}$ timeslot in a control area of the $N^{th}$ timeslot, by a base station, determine a control area of the $(N+1)^{th}$ timeslot according to the control area indication information of the $(N+1)^{th}$ timeslot, and then receive a physical control channel of the $(N+1)^{th}$ timeslot in the control area of the $(N+1)^{th}$ timeslot. That is, the user equipment may determine the control area of the $(N+1)^{th}$ timeslot (a timeslot corresponding to an S-TTI-1) according to according to an indication of the base station, and may receive the physical control channel of the $(N+1)^{th}$ timeslot sent, by using the control area of the $(N+1)^{th}$ timeslot, by the base station, so that a physical data channel of the $(N+1)^{th}$ timeslot can be transmitted.

Figure 19:
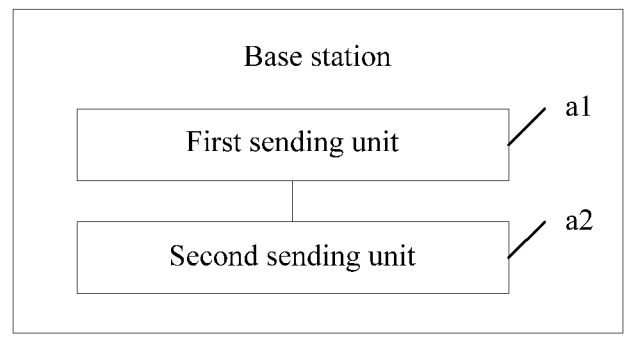
FIG. 19 is a schematic structural composition diagram of a base station according to an embodiment of the present invention.

Another embodiment of the present invention provides a base station. As shown in FIG. 3a or FIG. 3b, a subframe includes an $N^{th}$ timeslot and an $(N+1)^{th}$ timeslot, the $N^{th}$ timeslot corresponds to a first TTI, and the $(N+1)^{th}$ timeslot corresponds to a second TTI. As shown in FIG. 19, the base station includes: a first sending unit a1 and a second sending unit a2.

The first sending unit a1 is configured to send control area indication information of the $(N+1)^{th}$ timeslot to user equipment by using a physical control channel of the $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot.

The second sending unit a2 is further configured to: send, in the control area of the $(N+1)^{th}$ timeslot indicated by the control area indication information of the $(N+1)^{th}$ timeslot sent by the first sending unit a1, and send a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where $k\geq4$.

Optionally, in a first application scenario, the physical control channel of the $N^{th}$ timeslot is a physical downlink control channel PDCCH of the $N^{th}$ timeslot.

In the first application scenario, the first sending unit a1 is specifically configured to send the frequency domain control indication information and the time domain control indication information to the user equipment by using downlink control indicator DCI carried in the PDCCH of the $N^{th}$ timeslot in the control area of the $N^{th}$ timeslot.

Further optionally, in a second application scenario, the physical control channel of the $N^{th}$ timeslot includes: a PDCCH of the $N^{th}$ timeslot and a physical control format indicator channel PCFICH of the $N^{th}$ timeslot.

In the second application scenario, the first sending unit a1 is specifically configured to:

send the frequency domain control indication information to the user equipment by using a DCI carried in the PDCCH of the $N^{th}$ timeslot in the control area of the $N^{th}$ timeslot; and send the time domain control indication information to the user equipment by using a control format indicator CFI carried in the PCFICH of the $N^{th}$ timeslot in the control area of the $N^{th}$ timeslot.

The CFI carried in the PCFICH of the $N^{th}$ timeslot includes indication information indicating a time domain time unit area occupied by the control area of the $N^{th}$ timeslot in the $N^{th}$ timeslot, and the time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot.

Further optionally, in a third application scenario, the physical control channel of the $N^{th}$ timeslot includes: a PDCCH of the $N^{th}$ timeslot and a PCFICH of the $N^{th}$ timeslot.

In the third application scenario, the first sending unit a1 is specifically configured to:

notify the user equipment of the frequency domain control indication information by using a DCI carried in the PDCCH of the $N^{th}$ timeslot in the control area of the $N^{th}$ timeslot; and send the time domain control indication information to the user equipment by using the DCI carried in the PDCCH of the $N^{th}$ timeslot in the control area of the $N^{th}$ timeslot and a CFI carried in the PCFICH of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot, a reference time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot, and the DCI carried in the PDCCH of the $N^{th}$ timeslot includes time unit area offset indication information of the control area of the $(N+1)^{th}$ timeslot, so that the user equipment determines the time domain time unit area of the control area of the $(N+1)^{th}$ timeslot according to the time unit area offset indication information of the control area of the $(N+1)^{th}$ timeslot and the reference time domain time unit area occupied by the control area of the $(N+1)^{th}$ timeslot in the $(N+1)^{th}$ timeslot.

It should be noted that, in this embodiment of the present invention, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot.

A resource block RB or a resource block group RBG is used as a unit for the length of the frequency domain resource block area.

Further, in the foregoing three application scenarios, the first sending unit a1 is specifically configured to send the frequency domain control indication information to the user equipment by using a cell-radio network temporary identifier C-RNTI allocated to the user equipment and by using the DCI carried in the PDCCH of the $N^{th}$ timeslot in the control area of the $N^{th}$ timeslot.

Further, the first sending unit a1 is specifically configured to send the frequency domain control indication information to the user equipment by using one common Common C-RNTI allocated to different user equipments and by using the DCI that is transmitted in the control area of the $N^{th}$ timeslot and that is carried in the PDCCH of the $N^{th}$ timeslot in the control area.

Figure 20:
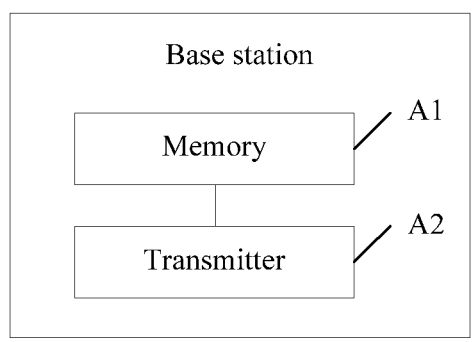
FIG. 20 is a schematic structural composition diagram of a base station according to an embodiment of the present invention.

In hardware implementation, various units in this embodiment may be built in or independent from a processor of the base station in a hardware form, or may be stored in a memory of the base station in a software form, for invoking by the processor to perform operations corresponding to the foregoing various units. The processor may be a central processing unit (CPU), a microprocessor, a single-chip microcomputer, and the like. As shown in FIG. 20, the base station includes: a memory A1 and a transmitter A2.

The memory A1 is configured to store a group of program code, where the memory A1 is a computer storage medium of the base station, and the computer storage medium includes: a non-volatile storage medium.

The transmitter A2 is configured to perform the following operations according to the program code stored in the memory A1:

sending control area indication information of an $(N+1)^{th}$ timeslot to user equipment by using a physical control channel of an $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot; and sending, in the control area of the $(N+1)^{th}$ timeslot, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4.

Optionally, in a first application scenario, the physical control channel of the $N^{th}$ timeslot is a physical downlink control channel PDCCH of the $N^{th}$ timeslot.

In the first application scenario, the transmitter is specifically configured to send the frequency domain control indication information and the time domain control indication information to the user equipment by using downlink control indicator DCI carried in the PDCCH of the $N^{th}$ timeslot in the control area of the $N^{th}$ timeslot.

Further optionally, in a second application scenario, the physical control channel of the $N^{th}$ timeslot includes: a PDCCH of the $N^{th}$ timeslot and a physical control format indicator channel PCFICH of the $N^{th}$ timeslot.

In the second application scenario, the transmitter A2 is specifically configured to:

send the frequency domain control indication information to the user equipment by using a DCI carried in the PDCCH of the $N^{th}$ timeslot in the control area of the $N^{th}$ timeslot; and send the time domain control indication information to the user equipment by using a control format indicator CFI carried in the PCFICH of the $N^{th}$ timeslot in the control area of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot, and the time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot.

Further optionally, in a third application scenario, the physical control channel of the $N^{th}$ timeslot includes: a PDCCH of the $N^{th}$ timeslot and a PCFICH of the $N^{th}$ timeslot.

The transmitter A2 is specifically configured to:

notify the user equipment of the frequency domain control indication information by using a DCI carried in the PDCCH of the $N^{th}$ timeslot in the control area of the $N^{th}$ timeslot; and send the time domain control indication information to the user equipment by using the DCI carried in the PDCCH of the $N^{th}$ timeslot in the control area of the $N^{th}$ timeslot and a CFI carried in the PCFICH of the $N^{th}$ timeslot, where the CFI carried in the PCFICH of the $N^{th}$ timeslot includes indication information indicating a time domain time unit area occupied by the control area of the $N^{th}$ timeslot in the $N^{th}$ timeslot, a reference time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot, and the DCI carried in the PDCCH of the $N^{th}$ timeslot includes time unit area offset indication information of the control area of the $(N+1)^{th}$ timeslot, so that the user equipment determines the time domain time unit area of the control area of the $(N+1)^{th}$ timeslot according to the time unit area offset indication information of the control area of the $(N+1)^{th}$ timeslot and the reference time domain time unit area occupied by the control area of the $(N+1)^{th}$ timeslot in the $(N+1)^{th}$ timeslot.

It should be noted that, in this embodiment of the present invention, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot.

A resource block RB or a resource block group RBG is used as a unit for the length of the frequency domain resource block area.

Further, the transmitter is specifically configured to send the frequency domain control indication information to the user equipment by using a cell-radio network temporary identifier C-RNTI allocated to the user equipment and by using the DCI carried in the PDCCH of the $N^{th}$ timeslot in the control area of the $N^{th}$ timeslot.

Further, the transmitter is specifically configured to send the frequency domain control indication information to the user equipment by using one common Common C-RNTI allocated to different user equipments and by using the DCI that is transmitted in the control area of the $N^{th}$ timeslot and that is carried in the PDCCH of the $N^{th}$ timeslot in the control area.

It should be noted that, for specific description of some of the functional modules in the base station according to this embodiment of the present invention, reference may be made to corresponding content in the method embodiments, and details are no longer described here in this embodiment.

For the base station according to this embodiment of the present invention, compared with the prior art, in this solution, the base station may send control area indication information of an $(N+1)^{th}$ timeslot to user equipment by using a physical control channel of an $N^{th}$ timeslot in a control area of the $N^{th}$ timeslot, where the control area indication information of the $(N+1)^{th}$ timeslot is used to indicate a time domain resource and a frequency domain resource that are occupied by a control area of the $(N+1)^{th}$ timeslot in the $(N+1)^{th}$ timeslot, that is, the control area of the $N^{th}$ timeslot is used to indicate, to the user equipment, the time domain resource and the frequency domain resource that are occupied by the control area of the $(N+1)^{th}$ timeslot in the $(N+1)^{th}$ timeslot, and then send, in the control area indicated by the control area indication information of the $(N+1)^{th}$ timeslot, a physical control channel of the $(N+1)^{th}$ timeslot to the user equipment. That is, the base station may indicate, to the user equipment, the control area of the $(N+1)^{th}$ timeslot (a timeslot corresponding to an S-TTI-1), and may further send the physical control channel of the $(N+1)^{th}$ timeslot to the user equipment by using the control area of the $(N+1)^{th}$ timeslot, so that a physical data channel of the $(N+1)^{th}$ timeslot can be transmitted.

Figure 21:
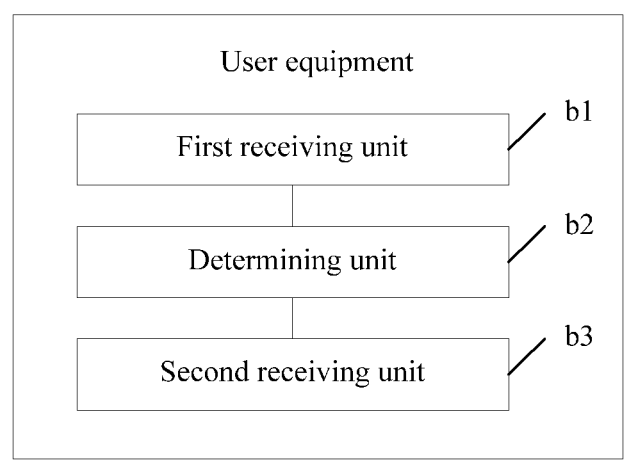
FIG. 21 is a schematic structural composition diagram of user equipment according to an embodiment of the present invention.

Another embodiment of the present invention provides user equipment. As shown in FIG. 3a or FIG. 3b, a subframe includes an $N^{th}$ timeslot and an $(N+1)^{th}$ timeslot, and the $N^{th}$ timeslot corresponds to a first TTI, the $(N+1)^{th}$ timeslot corresponds to a second TTI. As shown in FIG. 21, the user equipment includes: a first receiving unit b1, a determining unit b2, and a second receiving unit b3.

The first receiving unit b1 is configured to receive control area indication information of the $(N+1)^{th}$ timeslot by using a physical control channel of the $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot.

The determining unit b2 is configured to determine the control area of the $(N+1)^{th}$ timeslot according to the control area indication information of the $(N+1)^{th}$ timeslot received by the first receiving unit b1.

The second receiving unit b3 is configured to receive, in the control area of the $(N+1)^{th}$ timeslot determined by the determining unit b2, a physical control channel of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where $k \geq 4$.

Optionally, in a first application scenario, the physical control channel of the $N^{th}$ timeslot is a physical downlink control channel PDCCH of the $N^{th}$ timeslot.

In the first application scenario, the first receiving unit b1 is specifically configured to receive the frequency domain control indication information and the time domain control indication information by using downlink control indicator DCI carried in the PDCCH of the $N^{th}$ timeslot in the control area of the $N^{th}$ timeslot.

Further optionally, in a second application scenario, the physical control channel of the $N^{th}$ timeslot includes: a PDCCH of the $N^{th}$ timeslot and a physical control format indicator channel PCFICH of the $N^{th}$ timeslot.

In the second application scenario, the first receiving unit b1 is specifically configured to:

receive the frequency domain control indication information by using a DCI carried in the PDCCH of the $N^{th}$ timeslot in the control area of the $N^{th}$ timeslot; and receive the time domain control indication information by using a control format indicator CFI carried in the PCFICH of the $N^{th}$ timeslot in the control area of the $N^{th}$ timeslot.

The CFI carried in the PCFICH of the $N^{th}$ timeslot includes indication information indicating a time domain time unit area occupied by the control area of the $N^{th}$ timeslot in the $N^{th}$ timeslot, and the time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot.

Further optionally, in a third application scenario, the physical control channel of the $N^{th}$ timeslot includes: a PDCCH of the $N^{th}$ timeslot and a PCFICH of the $N^{th}$ timeslot.

In the third application scenario, the first receiving unit b1 is specifically configured to:

receive the frequency domain control indication information by using a DCI carried in the PDCCH of the $N^{th}$ timeslot in the control area of the $N^{th}$ timeslot; and receive the time domain control indication information by using the DCI carried in the PDCCH of the $N^{th}$ timeslot in the control area of the $N^{th}$ timeslot and a CFI carried in the PCFICH of the $N^{th}$ timeslot.

The CFI carried in the PCFICH of the $N^{th}$ timeslot includes indication information indicating a time domain time unit area occupied by the control area of the $N^{th}$ timeslot in the $N^{th}$ timeslot, a reference time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot, and the DCI carried in the PDCCH of the $N^{th}$ timeslot includes time unit area offset indication information of the control area of the $(N+1)^{th}$ timeslot.

It should be noted that, in the foregoing three application scenarios, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot.

A resource block RB or a resource block group RBG is used as a unit for the length of the frequency domain resource block area.

Furthermore, the first receiving unit b1 is specifically configured to receive the frequency domain control indication information by using a common Common cell-radio network temporary identifier C-RNTI and by using the DCI carried in the PDCCH of the $N^{th}$ timeslot in the control area of the $N^{th}$ timeslot.

Figure 22:
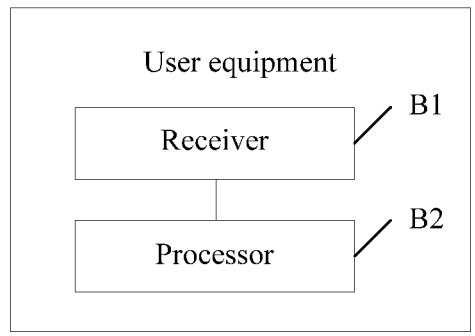
FIG. 22 is a schematic structural composition diagram of user equipment according to an embodiment of the present invention.

In hardware implementation, various units in this embodiment may be built in or independent from a processor of the user equipment in a hardware form, or may be stored in a memory of the user equipment in a software form, for invoking by the processor to perform operations corresponding to the foregoing various units. The processor may be a central processing unit (CPU), a microprocessor, a single-chip microcomputer, and the like. As shown in FIG. 22, the user equipment includes: a receiver B1 and a processor B2.

The receiver B1 is configured to receive control area indication information of an $(N+1)^{th}$ timeslot by using a physical control channel of an $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot.

The processor B2 is configured to determine the control area of the $(N+1)^{th}$ timeslot according to the control area indication information of the $(N+1)^{th}$ timeslot received by the receiver B1.

The receiver B1 is further configured to receive, in the control area of the $(N+1)^{th}$ timeslot determined by the processor B2, a physical control channel of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where k≥4.

Optionally, in a first application scenario, the physical control channel of the $N^{th}$ timeslot is a physical downlink control channel PDCCH of the $N^{th}$ timeslot.

In the first application scenario, the receiver B1 is further configured to receive the frequency domain control indication information and the time domain control indication information by using downlink control indicator DCI carried in the PDCCH of the $N^{th}$ timeslot in the control area of the $N^{th}$ timeslot.

Further optionally, in a second application scenario, the physical control channel of the $N^{th}$ timeslot includes: a PDCCH of the $N^{th}$ timeslot and a physical control format indicator channel PCFICH of the $N^{th}$ timeslot.

In the second application scenario, the receiver B1 is further configured to: receive the frequency domain control indication information by using a DCI carried in the PDCCH of the $N^{th}$ timeslot in the control area of the $N^{th}$ timeslot; and receive the time domain control indication information by using a control format indicator CFI carried in the PCFICH of the $N^{th}$ timeslot in the control area of the $N^{th}$ timeslot.

The CFI carried in the PCFICH of the $N^{th}$ timeslot includes indication information indicating a time domain time unit area occupied by the control area of the $N^{th}$ timeslot in the $N^{th}$ timeslot, and the time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot.

Further optionally, in a third application scenario, the physical control channel of the $N^{th}$ timeslot includes: a PDCCH of the $N^{th}$ timeslot and a PCFICH of the $N^{th}$ timeslot.

In the third application scenario, the receiver B1 is further configured to: receive the frequency domain control indication information by using a DCI carried in the PDCCH of the $N^{th}$ timeslot in the control area of the $N^{th}$ timeslot; and receive the time domain control indication information by using the DCI carried in the PDCCH of the $N^{th}$ timeslot in the control area of the $N^{th}$ timeslot and a CFI carried in the PCFICH of the $N^{th}$ timeslot.

The CFI carried in the PCFICH of the $N^{th}$ timeslot includes indication information of the time domain time unit area occupied by the control area of the $N^{th}$ timeslot in the $N^{th}$ timeslot.

The processor B2 is further configured to determine the time domain time unit area of the control area of the $(N+1)^{th}$ timeslot according to the time domain control indication information received by the receiver B1, where a reference time domain time unit area occupied by the control area of the $(N+1)^{th}$ timeslot in the $(N+1)^{th}$ timeslot is the same as the time domain time unit area occupied by the control area of the $N^{th}$ timeslot in the $N^{th}$ timeslot, and the DCI carried in the PDCCH of the $N^{th}$ timeslot includes time unit area offset indication information of the control area of the $(N+1)^{th}$ timeslot.

It should be noted that, in this embodiment of the present invention, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot.

A resource block RB or a resource block group RBG is used as a unit for the length of the frequency domain resource block area.

Further, the receiver B1 is further configured to receive the frequency domain control indication information by using a common Common cell-radio network temporary identifier C-RNTI and by using the DCI carried in the PDCCH of the $N^{th}$ timeslot in the control area of the $N^{th}$ timeslot.

It should be noted that, for specific description of some of the functional modules in the user equipment according to this embodiment of the present invention, reference may be made to corresponding content in the method embodiments, and details are no longer described here in this embodiment.

For the user equipment according to this embodiment of the present invention, compared with the prior art, in this solution, the user equipment may determine, from a control area of an $N^{th}$ timeslot, a time domain resource and a frequency domain resource that are occupied in a control area of an $(N+1)^{th}$ timeslot in the $(N+1)^{th}$ timeslot, and receive, on the determined time domain resource and frequency domain resource, a physical control channel of the $(N+1)^{th}$ timeslot. That is, the user equipment may determine the control area of the $(N+1)^{th}$ timeslot (a timeslot corresponding to an S-TTI-1) according to an indication of a base station, and may receive the physical control channel of the $(N+1)^{th}$ timeslot sent, by using the control area of the $(N+1)^{th}$ timeslot, by the base station, so that a physical data channel of the $(N+1)^{th}$ timeslot can be transmitted.

Figure 23:
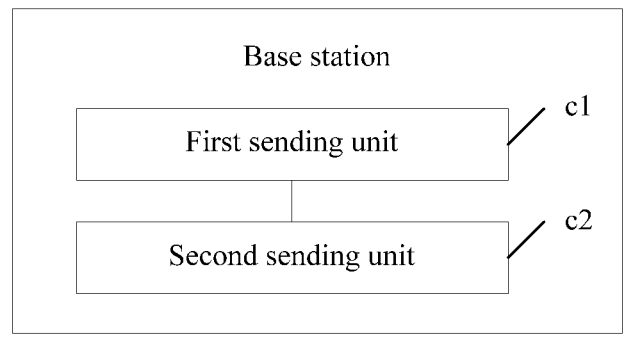
FIG. 23 is a schematic structural composition diagram of a base station according to an embodiment of the present invention.

Another embodiment of the present invention provides a base station. As shown in FIG. 3a or FIG. 3b, a subframe includes an $N^{th}$ timeslot and an $(N+1)^{th}$ timeslot, the $N^{th}$ timeslot corresponds to a first TTI, and the $(N+1)^{th}$ timeslot corresponds to a second TTI. As shown in FIG. 23, the base station includes: a first sending unit c1 and a second sending unit c2.

The first sending unit c1 is configured to send a secondary-physical control format indicator channel S-PCFICH of the $(N+1)^{th}$ timeslot to user equipment, so that the user equipment determines control area indication information of the $(N+1)^{th}$ timeslot according to the S-PCFICH of the $(N+1)^{th}$ timeslot and resource element location information of the S-PCFICH of the $(N+1)^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the resource element location information is predefined or is sent by the base station to the user equipment by using high layer signaling.

The second sending unit c2 is configured to send, in the control area of the $(N+1)^{th}$ timeslot indicated by the control area indication information sent by the first sending unit c1, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4.

Further, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot.

A resource block RB or a resource block group RBG is used as a unit for the length of the frequency domain resource block area.

Optionally, in an application scenario, the first sending unit c1 is specifically configured to send the S-PCFICH of the $(N+1)^{th}$ timeslot to the user equipment at a resource element location indicated by the resource element location information, where the S-PCFICH of the $(N+1)^{th}$ timeslot carries the time domain control indication information.

The resource element location information includes a start frequency domain resource block location of a frequency domain resource block area occupied by the S-PCFICH of the $(N+1)^{th}$ timeslot in the $(N+1)^{th}$ timeslot and a length of the frequency domain resource block area occupied by the S-PCFICH of the $(N+1)^{th}$ timeslot in the $(N+1)^{th}$ timeslot.

The start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot, the length of the frequency domain resource block area occupied by the control area of the $(N+1)^{th}$ timeslot in the $(N+1)^{th}$ timeslot is equal to L plus a length of the frequency domain resource block area in the $(N+1)^{th}$ timeslot at which the S-PCFICH of the $(N+1)^{th}$ timeslot is located, and L is an integer greater than or equal to 0.

Further optionally, in another application scenario, the first sending unit c1 is specifically configured to send the S-PCFICH of the $(N+1)^{th}$ timeslot to the user equipment at a resource element location indicated by the resource element location information, and the S-PCFICH of the $(N+1)^{th}$ timeslot carries frequency domain resource length information and the time domain control indication information.

The frequency domain resource length information is used to indicate the length of the frequency domain resource block area occupied by the control area of the $(N+1)^{th}$ timeslot in the $(N+1)^{th}$ timeslot, the resource element location information includes a start frequency domain resource block location of the S-PCFICH of the $(N+1)^{th}$ timeslot in the $(N+1)^{th}$ timeslot, and the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot.

Figure 24:
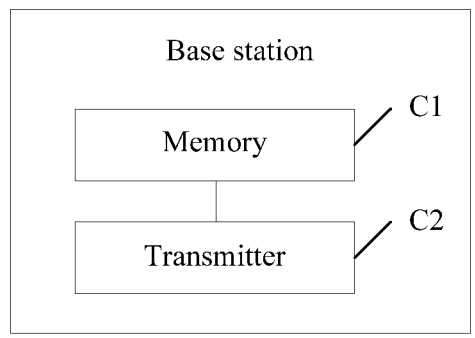
FIG. 24 is a schematic structural composition diagram of a base station according to an embodiment of the present invention.

In hardware implementation, various units in this embodiment may be built in or independent from a processor of the base station in a hardware form, or may be stored in a memory of the base station in a software form, for invoking by the processor to perform operations corresponding to the foregoing various units. The processor may be a central processing unit (CPU), a microprocessor, a single-chip microcomputer, and the like. As shown in FIG. 24, the base station includes: a memory C1 and a transmitter C2.

The memory C1 is configured to store a group of program code, where the memory C1 is a computer storage medium of the base station, and the computer storage medium includes: a non-volatile storage medium.

The transmitter C2 is configured to perform the following operations according to the program code stored in the memory C1:

sending a secondary-physical control format indicator channel S-PCFICH of an $(N+1)^{th}$ timeslot to the user equipment, so that the user equipment determines control area indication information of the $(N+1)^{th}$ timeslot according to the S-PCFICH of the $(N+1)^{th}$ timeslot and resource element location information of the S-PCFICH of the $(N+1)^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the resource element location information is predefined or is sent by the base station to the user equipment by using high layer signaling; and sending, in the control area of the $(N+1)^{th}$ timeslot, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4.

Further, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot.

A resource block RB or a resource block group RBG is used as a unit for the length of the frequency domain resource block area.

Further, the transmitter C2 is further configured to send the S-PCFICH of the $(N+1)^{th}$ timeslot to the user equipment at a resource element location indicated by the resource element location information, where the S-PCFICH of the $(N+1)^{th}$ timeslot carries the time domain control indication information.

The resource element location information includes a start frequency domain resource block location of a frequency domain resource block area occupied by the S-PCFICH of the $(N+1)^{th}$ timeslot in the $(N+1)^{th}$ timeslot and a length of the frequency domain resource block area occupied by the S-PCFICH of the $(N+1)^{th}$ timeslot in the $(N+1)^{th}$ timeslot.

The start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot, the length of the frequency domain resource block area occupied by the control area of the $(N+1)^{th}$ timeslot in the $(N+1)^{th}$ timeslot is equal to L plus a length of the frequency domain resource block area in the $(N+1)^{th}$ timeslot at which the S-PCFICH of the $(N+1)^{th}$ timeslot is located, and L is an integer greater than or equal to 0.

Further, the transmitter C2 is further configured to send the S-PCFICH of the $(N+1)^{th}$ timeslot to the user equipment at a resource element location indicated by the resource element location information, where the S-PCFICH of the $(N+1)^{th}$ timeslot carries frequency domain resource length information and the time domain control indication information.

The frequency domain resource length information is used to indicate the length of the frequency domain resource block area occupied by the control area of the $(N+1)^{th}$ timeslot in the $(N+1)^{th}$ timeslot, the resource element location information includes a start frequency domain resource block location of the S-PCFICH of the $(N+1)^{th}$ timeslot in the $(N+1)^{th}$ timeslot, and the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot.

It should be noted that, for specific description of some of the functional modules in the base station according to this embodiment of the present invention, reference may be made to corresponding content in the method embodiments, and details are no longer described here in this embodiment.

For the base station according to this embodiment of the present invention, compared with the prior art, in this solution, the base station may indicate, to user equipment, by using an S-PCFICH of an $(N+1)^{th}$ timeslot and resource element location information of the S-PCFICH of the $(N+1)^{th}$ timeslot, control area indication information of the $(N+1)^{th}$ timeslot of a time domain resource and a frequency domain resource that are occupied by the control area of the $(N+1)^{th}$ timeslot in the $(N+1)^{th}$ timeslot; and then send, in the control area indicated by the control area indication information of the $(N+1)^{th}$ timeslot, a physical control channel of the $(N+1)^{th}$ timeslot to the user equipment. That is, the base station may indicate, to the user equipment, the control area of the $(N+1)^{th}$ timeslot (a timeslot corresponding to an S-TTI-1), and may further send the physical control channel of the $(N+1)^{th}$ timeslot to the user equipment by using the control area of the $(N+1)^{th}$ timeslot, so that a physical data channel of the $(N+1)^{th}$ timeslot can be transmitted.

Figure 25:
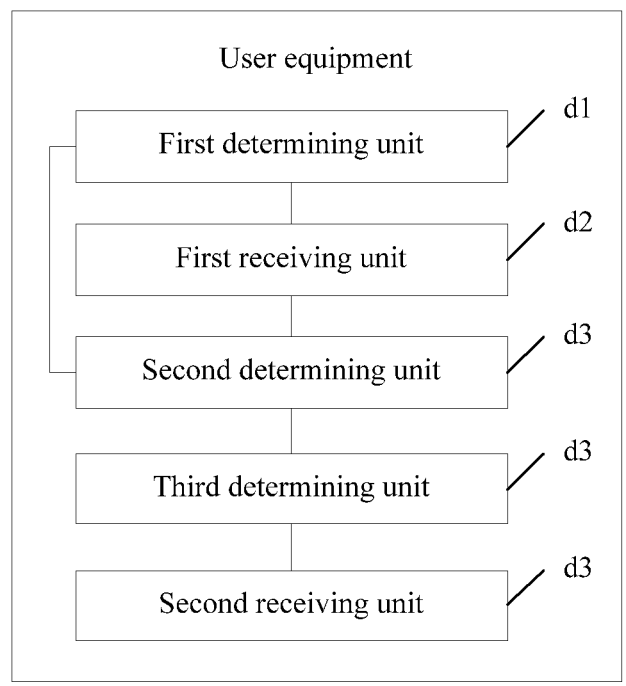
FIG. 25 is a schematic structural composition diagram of user equipment according to an embodiment of the present invention.

Another embodiment of the present invention provides user equipment. As shown in FIG. 3a or FIG. 3b, a subframe includes an $N^{th}$ timeslot and an $(N+1)^{th}$ timeslot, the $N^{th}$ timeslot corresponds to a first TTI, and the $(N+1)^{th}$ timeslot corresponds to a second TTI. As shown in FIG. 25, the user equipment includes: a first determining unit d1, a first receiving unit d2, a second determining unit d3, a third determining unit d4, and a second receiving unit d5.

The first determining unit d1 is configured to determine resource element location information of a secondary-physical control format indicator channel S-PCFICH of the $(N+1)^{th}$ timeslot by using high layer signaling or a predefined manner.

The first receiving unit d2 is configured to receive, a resource element location indicated by the resource element location information of the S-PCFICH of the $(N+1)^{th}$ timeslot determined by the first determining unit d1, the S-PCFICH channel of the $(N+1)^{th}$ timeslot.

The second determining unit d3 is configured to determine, according to the resource element location information of the S-PCFICH of the $(N+1)^{th}$ timeslot determined by the first determining unit d1 and the S-PCFICH of the $(N+1)^{th}$ timeslot received by the first receiving unit d2, control area indication information of the $(N+1)^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot.

The third determining unit d4 is configured to determine the control area of the $(N+1)^{th}$ timeslot according to the control area indication information of the $(N+1)^{th}$ timeslot determined by the second determining unit d3.

The second receiving unit d5 is configured to receive a physical control channel of the $(N+1)^{th}$ timeslot in the control area of the $(N+1)^{th}$ timeslot determined by the third determining unit d4, so as to determine a physical data channel of the $(N+1)^{th}$ timeslot or a physical data channel of an $(N+1+k)^{th}$ timeslot according to the physical control channel of the $(N+1)^{th}$ timeslot, where k≥4.

Further, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot.

A resource block RB or a resource block group RBG is used as a unit for the length of the frequency domain resource block area.

Further, the second determining unit d3 is specifically configured to:

determine the frequency domain control indication information according to the resource element location information, where the resource element location information includes a start frequency domain resource block location of a frequency domain resource block area occupied by the S-PCFICH of the $(N+1)^{th}$ timeslot in the $(N+1)^{th}$ timeslot and a length of the frequency domain resource block area occupied by the S-PCFICH of the $(N+1)^{th}$ timeslot in the $(N+1)^{th}$ timeslot, the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot, the length of the frequency domain resource block area occupied by the control area of the $(N+1)^{th}$ timeslot in the $(N+1)^{th}$ timeslot is equal to L plus a length of the frequency domain resource block area in the $(N+1)^{th}$ timeslot at which the S-PCFICH of the $(N+1)^{th}$ timeslot is located, and L is an integer greater than or equal to 0.

Further, the second determining unit d3 is specifically configured to:

determine, according to the resource element location information, the start frequency domain resource block location of the frequency domain resource block area occupied by the control area of the $(N+1)^{th}$ timeslot in the $(N+1)^{th}$ timeslot, where the resource element location information includes a start frequency domain resource block location of the S-PCFICH of the $(N+1)^{th}$ timeslot in the $(N+1)^{th}$ timeslot, and the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot; and determine, according to the S-CFI carried in the S-PCFICH of the $(N+1)^{th}$ timeslot, the length of the frequency domain resource block area occupied by the control area of the $(N+1)^{th}$ timeslot in the $(N+1)^{th}$ timeslot and the time domain control indication information.

Figure 26:
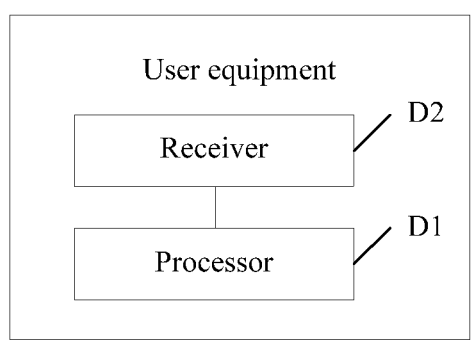
FIG. 26 is a schematic structural composition diagram of user equipment according to an embodiment of the present invention.

In hardware implementation, various units in this embodiment may be built in or independent from a processor of the user equipment in a hardware form, or may be stored in a memory of the user equipment in a software form, for invoking by the processor to perform operations corresponding to the foregoing various units. The processor may be a central processing unit (CPU), a microprocessor, a single-chip microcomputer, and the like. As shown in FIG. 26, the user equipment includes: a processor D1 and a receiver D2.

The processor D1 is configured to determine resource element location information of a secondary-physical control format indicator channel S-PCFICH of an $(N+1)^{th}$ timeslot by using high layer signaling or a predefined manner.

The receiver D2 is configured to determine control area indication information of the $(N+1)^{th}$ timeslot according to the resource element location information of the S-PCFICH of the $(N+1)^{th}$ timeslot determined by the processor D1 and the S-PCFICH of the $(N+1)^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot.

The processor D1 is further configured to determine the control area of the $(N+1)^{th}$ timeslot according to the control area indication information of the $(N+1)^{th}$ timeslot received by the receiver D2.

The receiver D2 is further configured to receive, in the control area of the $(N+1)^{th}$ timeslot determined by the processor D1, a physical control channel of the $(N+1)^{th}$ timeslot, so as to determine a physical data channel of the $(N+1)^{th}$ timeslot or a physical data channel of an $(N+1+k+)^{th}$ timeslot according to the physical control channel of the $(N+1)^{th}$ timeslot, where k≥4.

Further, the frequency domain control indication information includes a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot.

A resource block RB or a resource block group RBG is used as a unit for the length of the frequency domain resource block area.

Further, the processor D1 is further configured to:

determine the frequency domain control indication information according to the resource element location information, where the resource element location information includes a start frequency domain resource block location of a frequency domain resource block area occupied by the S-PCFICH of the $(N+1)^{th}$ timeslot in the $(N+1)^{th}$ timeslot and a length of the frequency domain resource block area occupied by the S-PCFICH of the $(N+1)^{th}$ timeslot in the $(N+1)^{th}$ timeslot, the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot, the length of the frequency domain resource block area occupied by the control area of the $(N+1)^{th}$ timeslot in the $(N+1)^{th}$ timeslot is equal to L plus a length of the frequency domain resource block area in the $(N+1)^{th}$ timeslot at which the S-PCFICH of the $(N+1)^{th}$ timeslot is located, and L is an integer greater than or equal to 0; and determine the time domain control indication information according to secondary-control format indicator information S-CFI carried in the S-PCFICH of the $(N+1)^{th}$ timeslot.

Further, the processor D1 is further configured to:

determine, according to the resource element location information, the start frequency domain resource block location of the frequency domain resource block area occupied by the control area of the $(N+1)^{th}$ timeslot in the $(N+1)^{th}$ timeslot, where the resource element location information includes a start frequency domain resource block location of the S-PCFICH of the $(N+1)^{th}$ timeslot in the $(N+1)^{th}$ timeslot, and the start frequency domain resource block location of the frequency domain resource block area occupied by the control area of the $(N+1)^{th}$ timeslot in the $(N+1)^{th}$ timeslot is the same as the start frequency domain resource block location of the frequency domain resource block area occupied by the S-PCFICH of the $(N+1)^{th}$ timeslot in the $(N+1)^{th}$ timeslot; and determine, according to the S-CFI carried in the S-PCFICH of the $(N+1)^{th}$ timeslot, the length of the frequency domain resource block area occupied by the control area of the $(N+1)^{th}$ timeslot in the $(N+1)^{th}$ timeslot and the time domain control indication information.

It should be noted that, for specific description of some of the functional modules in the user equipment according to this embodiment of the present invention, reference may be made to corresponding content in the method embodiments, and details are no longer described here in this embodiment.

For the user equipment according to this embodiment of the present invention, compared with the prior art, in this solution, the user equipment may receive, at a resource element location indicated by a resource element location information of an S-PCFICH of an $(N+1)^{th}$ timeslot, the S-PCFICH channel of the $(N+1)^{th}$ timeslot, determine control area indication information of the $(N+1)^{th}$ timeslot according to the resource element location information of the S-PCFICH of the $(N+1)^{th}$ timeslot and the S-PCFICH of the $(N+1)^{th}$ timeslot, then determine a control area of the $(N+1)^{th}$ timeslot according to the control area indication information of the $(N+1)^{th}$ timeslot, and receive a physical control channel of the $(N+1)^{th}$ timeslot in the control area of the $(N+1)^{th}$ timeslot. That is, the user equipment may determine the control area of the $(N+1)^{th}$ timeslot (a timeslot corresponding to an S-TTI-1) according to an indication of a base station, and may receive the physical control channel of the $(N+1)^{th}$ timeslot sent, by using the control area of the $(N+1)^{th}$ timeslot, by the base station, so that a physical data channel of the $(N+1)^{th}$ timeslot can be transmitted.

Figure 27:
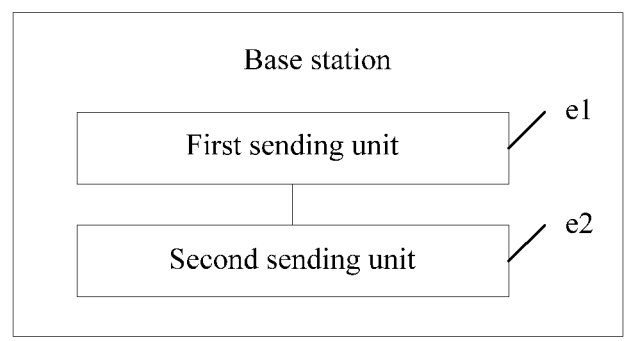
FIG. 27 is a schematic structural composition diagram of a base station according to an embodiment of the present invention.

Another embodiment of the present invention provides a base station. As shown in FIG. 3a or FIG. 3b, a subframe includes an $N^{th}$ timeslot and an $(N+1)^{th}$ timeslot, the $N^{th}$ timeslot corresponds to a first TTI, and the $(N+1)^{th}$ timeslot corresponds to a second TTI. As shown in FIG. 27, the base station includes: a first sending unit e1 and a second sending unit e2.

The first sending unit e1 is configured to send control area indication information of the $(N+1)^{th}$ timeslot to user equipment by using high layer signaling or high layer signaling and a physical control channel of the $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the control area of the $(N+1)^{th}$ timeslot is used to transmit a physical control channel of the $(N+1)^{th}$ timeslot.

The second sending unit e2 is configured to send, in the control area of the $(N+1)^{th}$ timeslot indicated by the control area indication information sent by the first sending unit e1, the physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4.

The high layer signaling is radio resource control RRC configuration signaling or media access control MAC layer configuration signaling.

Figure 28:
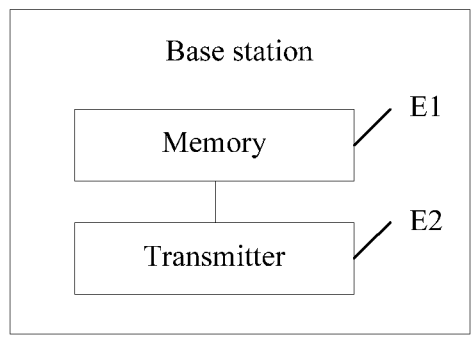
FIG. 28 is a schematic structural composition diagram of a base station according to an embodiment of the present invention.

In hardware implementation, various units in this embodiment may be built in or independent from a processor of the base station in a hardware form, or may be stored in a memory of the base station in a software form, for invoking by the processor to perform operations corresponding to the foregoing various units. The processor may be a central processing unit (CPU), a microprocessor, a single-chip microcomputer, and the like. As shown in FIG. 28, the base station includes: a memory E1 and a transmitter E2.

The memory E1 is configured to store a group of program code, where the memory E1 is a computer storage medium of the base station, and the computer storage medium includes: a non-volatile storage medium.

The transmitter E2 is configured to perform the following operations according to the program code stored in the memory E1:

sending control area indication information of an $(N+1)^{th}$ timeslot to user equipment by using high layer signaling or high layer signaling and a physical control channel of an $N^{th}$ timeslot in a control area of the $N^{th}$ timeslot, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the control area of the $(N+1)^{th}$ timeslot is used to transmit a physical control channel of the $(N+1)^{th}$ timeslot; and sending, in the control area of the $(N+1)^{th}$ timeslot, the physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, where k≥4.

The high layer signaling is radio resource control RRC configuration signaling or media access control MAC layer configuration signaling.

It should be noted that, for specific description of some of the functional modules in the base station according to this embodiment of the present invention, reference may be made to corresponding content in the method embodiments, and details are no longer described here in this embodiment.

For the base station according to this embodiment of the present invention, compared with the prior art, in this solution, the base station may send, by using high layer signaling or high layer signaling and a physical control channel of an $N^{th}$ timeslot in a control area of the $N^{th}$ timeslot, control area indication information of an $(N+1)^{th}$ timeslot to user equipment, and send, in a control area of the $(N+1)^{th}$ timeslot, a physical control channel of the $(N+1)^{th}$ timeslot to the user equipment. That is, the base station may indicate, to the user equipment, the control area of the $(N+1)^{th}$ timeslot (a timeslot corresponding to an S-TTI-1), and may further send the physical control channel of the $(N+1)^{th}$ timeslot to the user equipment by using the control area of the $(N+1)^{th}$ timeslot, so that a physical data channel of the $(N+1)^{th}$ timeslot can be transmitted.

Figure 29:
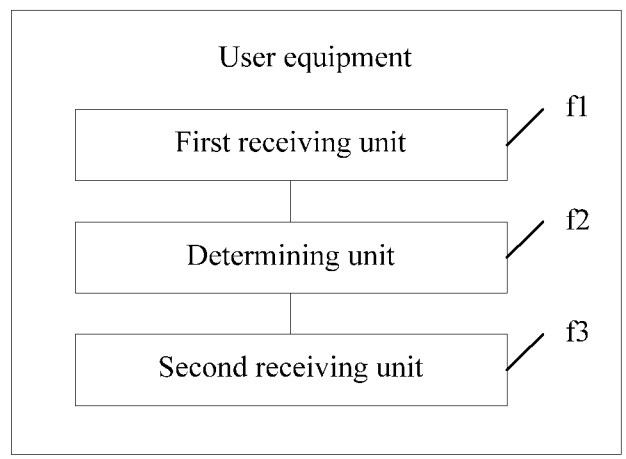
FIG. 29 is a schematic structural composition diagram of user equipment according to an embodiment of the present invention.

Another embodiment of the present invention provides user equipment. As shown in FIG. 3a or FIG. 3b, a subframe includes an $N^{th}$ timeslot and an $(N+1)^{th}$ timeslot, the $N^{th}$ timeslot corresponds to a first TTI, and the $(N+1)^{th}$ timeslot corresponds to a second TTI. As shown in FIG. 29, the base station includes: a first receiving unit f1, a determining unit f2, and a second receiving unit f3.

The first receiving unit f1 is configured to receive control area indication information of the $(N+1)^{th}$ timeslot sent, by using high layer signaling or high layer signaling and a physical control channel of the $N^{th}$ timeslot in a control area of the $N^{th}$ timeslot, by a base station, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the control area of the $(N+1)^{th}$ timeslot is used to transmit a physical control channel of the $(N+1)^{th}$ timeslot.

The determining unit f2 is configured to determine the control area of the $(N+1)^{th}$ timeslot according to the control area indication information of the $(N+1)^{th}$ timeslot received by the first receiving unit f1.

The second receiving unit f3 is configured to receive, in the control area of the $(N±1)^{th}$ timeslot determined by the determining unit f2, the physical control channel of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where k≥4.

The high layer signaling is radio resource control RRC configuration signaling or media access control MAC layer configuration signaling.

Figure 30:
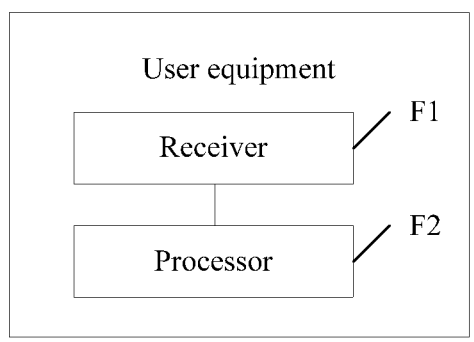
FIG. 30 is a schematic structural composition diagram of user equipment according to an embodiment of the present invention.

In hardware implementation, various units in this embodiment may be built in or independent from a processor of the user equipment in a hardware form, or may be stored in a memory of the user equipment in a software form, for invoking by the processor to perform operations corresponding to the foregoing various units. The processor may be a central processing unit (CPU), a microprocessor, a single-chip microcomputer, and the like. As shown in FIG. 30, the user equipment includes: a receiver F1 and a processor F2.

The receiver F1 is configured to receive control area indication information of an $(N+1)^{th}$ timeslot sent, by using high layer signaling or high layer signaling and a physical control channel of an $N^{th}$ timeslot in a control area of the $N^{th}$ timeslot, by the base station, where the control area indication information includes frequency domain control indication information and time domain control indication information, the frequency domain control indication information is used to indicate a frequency domain resource block area occupied by a control area of the $(N+1)^{th}$ timeslot in the $(N+1)^{th}$ timeslot, the time domain control indication information is used to indicate a time domain time unit area occupied by the control area of the $(N+1)^{th}$ timeslot in the $(N+1)^{th}$ timeslot, and the control area of the $(N+1)^{th}$ timeslot is used to transmit a physical control channel of the $(N+1)^{th}$ timeslot.

The processor F2 is configured to determine the control area of the $(N+1)^{th}$ timeslot according to the control area indication information of the $(N+1)^{th}$ timeslot received by the receiver.

The receiver F1 is further configured to receive, in the control area of the $(N+1)^{th}$ timeslot determined by the processor F2, the physical control channel of the $(N+1)^{th}$ timeslot, so as to determine a physical data channel of the $(N+1)^{th}$ timeslot or a physical data channel of an $(N+1+k)^{th}$ timeslot according to the physical control channel of the $(N+1)^{th}$ timeslot, where $k \geq 4$.

The high layer signaling is radio resource control RRC configuration signaling or media access control MAC layer configuration signaling.

It should be noted that, for specific description of some of the functional modules in the user equipment according to this embodiment of the present invention, reference may be made to corresponding content in the method embodiments, and details are no longer described here in this embodiment.

For the user equipment according to this embodiment of the present invention, compared with the prior art, in this solution, the user equipment may receive control area indication information of an $(N+1)^{th}$ timeslot sent, by using high layer signaling or high layer signaling and a physical control channel of an $N^{th}$ timeslot in a control area of the $N^{th}$ timeslot, by a base station, determine a control area of the $(N+1)^{th}$ timeslot according to control area indication information of the $(N+1)^{th}$ timeslot, and then receive a physical control channel of the $(N+1)^{th}$ timeslot in the control area of the $(N+1)^{th}$ timeslot. That is, the user equipment may determine the control area of the $(N+1)^{th}$ timeslot (a timeslot corresponding to an S-TTI-1) according to an indication of the base station, and may receive the physical control channel of the $(N+1)^{th}$ timeslot sent, by using the control area of the $(N+1)^{th}$ timeslot, by the base station, so that a physical data channel of the $(N+1)^{th}$ timeslot can be transmitted.

The foregoing descriptions about implementation manners allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting a downlink control channel, wherein a subframe comprises an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the method comprises:

sending, by a base station, control area indication information of the $(N+1)^{th}$ timeslot to user equipment by using a physical control channel of the $N^{th}$ timeslot in a control area of the $N^{th}$ timeslot, wherein the control area indication information comprises frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot; and sending, by the base station in the control area of the $(N+1)^{th}$ timeslot, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, wherein k≥4.

2. The method according to claim 1, wherein the physical control channel of the $N^{th}$ timeslot is a physical downlink control channel PDCCH of the $N^{th}$ timeslot; and the sending, by a base station, control area indication information of the $(N+1)^{th}$ timeslot to user equipment by using a physical control channel of the $N^{th}$ timeslot in a control area of the $N^{th}$ timeslot comprises:

sending, by the base station, the frequency domain control indication information and the time domain control indication information to the user equipment by using downlink control indicator DCI carried in the PDCCH of the $N^{th}$ timeslot in the control area of the $N^{th}$ timeslot.

3. The method according to claim 1, wherein the frequency domain control indication information comprises a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, wherein a resource block RB or a resource block group RBG is used as a unit for the length of the frequency domain resource block area.

4. The method according to claim 2, wherein the sending, by the base station, the frequency domain control indication information to the user equipment by using downlink control indicator DCI carried in the PDCCH of the $N^{th}$ timeslot in the control area of the $N^{th}$ timeslot comprises:

sending, by the base station, the frequency domain control indication information to the user equipment by using a cell-radio network temporary identifier C-RNTI allocated to the user equipment and by using the DCI carried in the PDCCH of the $N^{th}$ timeslot in the control area of the $N^{th}$ timeslot.

5. The method according to claim 4, wherein the sending, by the base station, the frequency domain control indication information to the user equipment by using a cell-radio network temporary identifier C-RNTI allocated to the user equipment and by using the DCI carried in the PDCCH of the $N^{th}$ timeslot in the control area of the $N^{th}$ timeslot comprises:

sending, by the base station, the frequency domain control indication information to the user equipment by using one common Common C-RNTI allocated to different user equipments and by using the DCI that is transmitted in the control area of the $N^{th}$ timeslot and that is carried in the PDCCH of the $N^{th}$ timeslot in the control area.

6. A method for transmitting a downlink control channel, wherein a subframe comprises an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the method comprises:

receiving, by user equipment, control area indication information of the $(N+1)^{th}$ timeslot by using a physical control channel of the $N^{th}$ timeslot in a control area of the $N^{th}$ timeslot, wherein the control area indication information comprises frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot;

determining, by the user equipment, the control area of the $(N+1)^{th}$ timeslot according to the control area indication information of the $(N+1)^{th}$ timeslot; and receiving, by the user equipment in the control area of the (N+1)th timeslot, a physical control channel of the (N+1)th timeslot, so as to determine a physical data channel of the $(N+1)^{th}$ timeslot or a physical data channel of an $(N+1+k)^{th}$ timeslot according to the physical control channel of the $(N+1)^{th}$ timeslot, wherein k≥4.

7. The method according to claim 6, wherein the physical control channel of the $N^{th}$ timeslot is a physical downlink control channel PDCCH of the $N^{th}$ timeslot; and the receiving, by user equipment, control area indication information of the $(N+1)^{th}$ timeslot by using a physical control channel of the $N^{th}$ timeslot in a control area of the $N^{th}$ timeslot comprises:

receiving, by the user equipment, the frequency domain control indication information and the time domain control indication information by using downlink control indicator DCI carried in the PDCCH of the $N^{th}$ timeslot in the control area of the $N^{th}$ timeslot.

8. The method according to claim 6, wherein the frequency domain control indication information comprises a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, wherein a resource block RB or a resource block group RBG is used as a unit for the length of the frequency domain resource block area.

9. The method according to claim 7, wherein the receiving, by the user equipment, the frequency domain control indication information by using a DCI carried in the PDCCH of the $N^{th}$ timeslot in the control area of the $N^{th}$ timeslot comprises:

receiving, by the user equipment, the frequency domain control indication information by using a common Common cell-radio network temporary identifier C-RNTI and by using the DCI carried in the PDCCH of the $N^{th}$ timeslot in the control area of the $N^{th}$ timeslot.

10. A base station, wherein a subframe comprises an $N^{th}$ timeslot and an $(N+1)^{th}$ timeslot, the $N^{th}$ timeslot corresponds to a first transmission time interval TTI, the $(N+1)^{th}$ timeslot corresponds to a second TTI, and the base station comprises:

a transmitter, configured to send control area indication information of the $(N+1)^{th}$ timeslot to user equipment by using a physical control channel of the $N^{th}$ timeslot in a control area of the $N^{th}$ timeslot, wherein the control area indication information comprises frequency domain control indication information and time domain control indication information, the frequency domain control indication information is used to indicate a frequency domain resource block area occupied by a control area of the $(N+1)^{th}$ timeslot in the $(N+1)^{th}$ timeslot, and the time domain control indication information is used to indicate a time domain time unit area occupied by the control area of the $(N+1)^{th}$ timeslot in the $(N+1)^{th}$ timeslot; and the transmitter, further configured to send, in the control area of the $(N+1)^{th}$ timeslot indicated by the control area indication information of the $(N+1)^{th}$ timeslot sent by the transmitter, a physical control channel of the $(N+1)^{th}$ timeslot to the user equipment, so that the user equipment determines a physical data channel of the $(N+1)^{th}$ timeslot or a physical data channel of an $(N+1+k)^{th}$ timeslot according to the physical control channel of the $(N+1)^{th}$ timeslot, wherein k≥4.

11. The base station according to claim 10, wherein the physical control channel of the $N^{th}$ timeslot is a physical downlink control channel PDCCH of the $N^{th}$ timeslot; and the transmitter is specifically configured to send the frequency domain control indication information and the time domain control indication information to the user equipment by using downlink control indicator DCI carried in the PDCCH of the $N^{th}$ timeslot in the control area of the $N^{th}$ timeslot.

12. The base station according to claim 10, wherein the frequency domain control indication information comprises a start frequency domain resource block location of the frequency domain resource block area occupied by the control area of the $(N+1)^{th}$ timeslot in the $(N+1)^{th}$ timeslot and a length of the frequency domain resource block area occupied by the control area of the $(N+1)^{th}$ timeslot in the $(N+1)^{th}$ timeslot, wherein a resource block RB or a resource block group RBG is used as a unit for the length of the frequency domain resource block area.

13. The base station according to claim 11, wherein the transmitter is specifically configured to send the frequency domain control indication information to the user equipment by using a cell-radio network temporary identifier C-RNTI allocated to the user equipment and by using the DCI carried in the PDCCH of the $N^{th}$ timeslot in the control area of the $N^{th}$ timeslot.

14. The base station according to claim 13, wherein the transmitter is specifically configured to send the frequency domain control indication information to the user equipment by using one common Common C-RNTI allocated to different user equipments and by using the DCI that is transmitted in the control area of the $N^{th}$ timeslot and that is carried in the PDCCH of the $N^{th}$ timeslot in the control area.

* * * * *